(12) United States Patent
Atkins et al.

(10) Patent No.: US 8,161,384 B2
(45) Date of Patent: Apr. 17, 2012

(54) ARRANGING GRAPHIC OBJECTS ON A PAGE WITH TEXT

(75) Inventors: C. Brian Atkins, Mountain View, CA (US); Xuemei Zhang, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 432 days.

(21) Appl. No.: 12/428,599

(22) Filed: Apr. 23, 2009

(65) Prior Publication Data

US 2010/0275152 A1 Oct. 28, 2010

(51) Int. Cl.
*G06F 17/00* (2006.01)

(52) U.S. Cl. ......................................................... 715/273

(58) Field of Classification Search .................. 715/251, 715/253, 254, 273, 243, 244, 245, 246, 247, 715/256
See application file for complete search history.

(56) References Cited

U.S. PATENT DOCUMENTS

| | | | |
|---|---|---|---|
| 5,136,686 A | 8/1992 | Koza | |
| 5,475,805 A * | 12/1995 | Murata | 715/201 |
| 5,499,366 A | 3/1996 | Rosenberg et al. | |
| 5,552,982 A * | 9/1996 | Jackson et al. | 715/210 |
| 5,555,362 A | 9/1996 | Yamashita et al. | |
| 5,659,770 A * | 8/1997 | Yamada | 715/209 |
| 5,712,995 A | 1/1998 | Cohn | |
| 5,729,254 A | 3/1998 | Marks et al. | |
| 5,760,786 A | 6/1998 | Marks et al. | |
| 5,796,401 A * | 8/1998 | Winer | 345/619 |
| 5,920,315 A | 7/1999 | Santos-Gomez | |
| 5,956,738 A | 9/1999 | Shirakawa | |
| 6,005,560 A | 12/1999 | Gill | |
| 6,008,809 A | 12/1999 | Brooks | |
| 6,055,522 A * | 4/2000 | Krishna et al. | 715/205 |
| 6,057,842 A * | 5/2000 | Knowlton et al. | 715/788 |
| 6,081,262 A | 6/2000 | Gill | |
| 6,111,586 A | 8/2000 | Ikeda | |
| 6,121,970 A | 9/2000 | Guedalia | |
| 6,256,108 B1 * | 7/2001 | Dziesietnik et al. | 358/1.18 |
| 6,301,586 B1 | 10/2001 | Yang et al. | |
| 6,380,954 B1 | 4/2002 | Gunther | |

(Continued)

FOREIGN PATENT DOCUMENTS

EP 1186992 A2 3/2002

(Continued)

OTHER PUBLICATIONS

Joe Geigel et al., "Automatic page layout using genetic algorithms for electronic albuming," Proceedings of Electronic Imaging 2001 (Jan. 2001).

(Continued)

*Primary Examiner* — Laurie Ries

(57) ABSTRACT

A candidate layout of frames on a page is ascertained, where the frames define respective size dimensions and positions of respective views of the graphic objects (including at least one block of text) on the page. If the target size dimensions are not accommodated by the size dimensions of the frame of the text block presentation, the candidate layout is modified by changing the size dimensions of the frame of the text block presentation to accommodate the target size dimensions and adjusting the size dimensions of the other frames in the candidate layout based on the changed size dimensions of the frame of the text block presentation. Also, different layouts of the frames on a page are determined from a different respective set of aspect ratios and nominal sizes subject to a set of layout constraints.

25 Claims, 27 Drawing Sheets

U.S. PATENT DOCUMENTS

| | | | |
|---|---|---|---|
| 6,415,306 B2 | 7/2002 | Seaman | |
| 6,448,956 B1 | 9/2002 | Berman et al. | |
| 6,563,602 B1 | 5/2003 | Uratani et al. | |
| 6,596,032 B2 | 7/2003 | Nojima | |
| 6,636,648 B2 * | 10/2003 | Loui et al. | 382/284 |
| 6,636,650 B1 | 10/2003 | Long et al. | |
| 6,701,306 B1 | 3/2004 | Kronmiller et al. | |
| 6,727,909 B1 | 4/2004 | Matsumura | |
| 6,771,292 B2 | 8/2004 | Sharp | |
| 6,771,801 B1 | 8/2004 | Fisher et al. | |
| 6,977,665 B2 | 12/2005 | Yokouchi | |
| 7,013,432 B2 | 3/2006 | Taylor et al. | |
| 7,019,864 B2 | 3/2006 | Delhoune | |
| 7,093,263 B1 | 8/2006 | Sexton et al. | |
| 7,096,445 B1 | 8/2006 | Pucci et al. | |
| 7,124,360 B1 | 10/2006 | Drenttel et al. | |
| 7,145,674 B2 | 12/2006 | Hayes | |
| 7,148,990 B2 | 12/2006 | Atkins et al. | |
| 7,149,968 B1 | 12/2006 | Ackerschewski et al. | |
| 7,184,167 B1 | 2/2007 | Ito | |
| 7,207,735 B2 | 4/2007 | Narusawa | |
| 7,281,199 B1 | 10/2007 | Nicol et al. | |
| 7,290,006 B2 * | 10/2007 | Xie et al. | 1/1 |
| 7,900,149 B2 * | 3/2011 | Hatcher et al. | 715/760 |
| 2001/0033296 A1 | 10/2001 | Fullerton et al. | |
| 2002/0051208 A1 | 5/2002 | Venable | |
| 2002/0059322 A1 | 5/2002 | Miyazaki | |
| 2002/0070982 A1 | 6/2002 | Hill et al. | |
| 2002/0122067 A1 | 9/2002 | Geigel et al. | |
| 2003/0001879 A1 | 1/2003 | Lin et al. | |
| 2005/0071781 A1 | 3/2005 | Atkins | |
| 2005/0071783 A1 * | 3/2005 | Atkins | 715/851 |
| 2005/0138570 A1 | 6/2005 | Good et al. | |
| 2005/0168782 A1 * | 8/2005 | Kobashi et al. | 358/1.18 |
| 2005/0240865 A1 | 10/2005 | Atkins et al. | |
| 2006/0026515 A1 * | 2/2006 | Balinsky | 715/530 |
| 2006/0103667 A1 | 5/2006 | Amit | |
| 2006/0136839 A1 * | 6/2006 | Makela | 715/786 |
| 2006/0195784 A1 * | 8/2006 | Koivisto et al. | 715/523 |
| 2006/0200758 A1 | 9/2006 | Atkins | |
| 2006/0279566 A1 | 12/2006 | Atkins | |
| 2007/0208996 A1 * | 9/2007 | Berkner et al. | 715/521 |
| 2008/0082912 A1 * | 4/2008 | Atkins | 715/243 |
| 2008/0313533 A1 | 12/2008 | Hoyer et al. | |

FOREIGN PATENT DOCUMENTS

| | | |
|---|---|---|
| EP | 1503336 A2 | 2/2005 |
| GB | 2378340 A | 2/2003 |
| JP | 01-191270 | 1/1989 |
| JP | 09-185728 | 7/1997 |
| JP | 10-293838 | 11/1998 |
| JP | 2002-288669 | 4/2002 |
| JP | 2002-142092 | 5/2002 |
| JP | 2003-101749 | 4/2003 |
| JP | 2003-274139 | 9/2003 |
| WO | WO 98/10356 A2 | 3/1998 |
| WO | WO 01/39019 A2 | 5/2001 |
| WO | WO02/37939 A2 | 5/2002 |
| WO | WO 02/084582 | 10/2002 |

OTHER PUBLICATIONS

Eldan Goldenberg, "Automatic layout of variable-content print data," MCs Dissertation, School of Cognitive & Computing Sciences, Univeristy of Sussex, Brighton, UK (2002).

D.F. Wong et al., "A new algorithm for floorplan design," Proc. Design Automation Conference, pp. 101-107, 1986.

C. Brian Atkins, "Adaptive Photo Collection Page Layout," HP Labs, Palo Alto, CA 94304, 2004 Intl Conference, Oct. 24, 2004; <http://www.hpl.hp.com/researchlisl/layout>.

Jun Xiao et al., "Mixed-Initiative Photo Collage Authoring," ACMMM 2008, Vancouver, BC, Canada, Oct. 27-31, 2008.

Joe Geigel et al., "Using Genetic Algorithms for Album Page Layouts," Multimedia, IEEE, vol. 10, Issue: 4, pp. 16-27 (Oct.-Dec. 2003).

Andreas Girgensohn and Patrick Chiu, "Stained Glass Photo Collages," UIST '04, Oct. 24-27, 2004, Santa Fe, New Mexico, USA.

C. Brian Atkins, "Blocked Recursive Image Composition," MM'08, Oct. 26-31, 2008, Vancouver, British Columbia, Canada.

Carsten Rother et al. "AutoCollage," ACM Transactions on Grahics (TOG), vol. 25, Issue 3 (Jul. 2006).

* cited by examiner

ARRANGING GRAPHIC OBJECTS ON A PAGE WITH TEXT

CROSS-REFERENCE TO RELATED APPLICATIONS

This application relates to the following co-pending patent applications, the entirety of each of which is incorporated herein by reference:

U.S. patent application Ser. No. 10/675,724, filed Sep. 30, 2003;
U.S. patent application Ser. No. 10/675,823, filed Sep. 30, 2003;
U.S. patent application Ser. No. 11/127,326, filed May 12, 2005;
U.S. patent application Ser. No. 11/128,543, filed May 12, 2005;
U.S. patent application Ser. No. 10/831,436, filed Apr. 23, 2004;
U.S. patent application Ser. No. 11/126,637, filed Apr. 15, 2005;
U.S. patent application Ser. No. 11/151,167, filed Jun. 10, 2005;
U.S. patent application Ser. No. 11/069,512, filed Mar. 1, 2005;
U.S. patent application Ser. No. 10/987,288, filed Nov. 12, 2004;
U.S. patent application Ser. No. 11/364,933, filed Mar. 1, 2006;
U.S. patent application Ser. No. 11/093,473, filed Mar. 30, 2005;
U.S. patent application Ser. No. 11/769,671, filed Jun. 27, 2007;
U.S. application Ser. No. 12/366,616, filed Feb. 5, 2009; and
U.S. patent application Ser. No. 11/865,112, filed Oct. 1, 2007.

BACKGROUND OF THE INVENTION

Individuals and organizations are rapidly accumulating large collections of digital image content, including still images, text, graphics, animated graphics, and full-motion video images. This content may be presented individually or combined in a wide variety of different forms, including documents, catalogs, presentations, still photographs, commercial videos, home movies, and metadata describing one or more associated digital content files. As these collections grow in number and diversity, individuals and organizations increasingly will require systems and methods for organizing and presenting the digital content in their collections. To meet this need, a variety of different systems and methods for organizing and presenting digital image content have been proposed.

For example, there are several digital image albuming systems that enable users to create digital photo albums manually. These systems typically provide tools for organizing a collection of images and laying out these images on one or more pages. Among the common types of tools for manually creating a digital photo album are tools for selecting a subset of images in the collection that will appear on a page of an album, a graphical user interface for manually rearranging the images on the page, and basic image editing tools for modifying various characteristics, such as size and orientation, of the images that will appear in the album. Users typically find the process of generating a digital photo album using fully manual digital image albuming systems to be tedious and time consuming.

Some automated digital image albuming systems allow users to organize digital images into album pages in accordance with dates and times specified in the metadata associated with the images. These systems also typically allow users to annotate the images appearing in the digital photo album pages. Some automated digital image albuming systems provide various predefined layout templates that a user may select to create a digital photo album. In these systems, the user assigns images from the collection to various predefined image locations on a selected layout template, and the system automatically adjusts the size, placement, rotation, and framing of the images in accordance with parameters specified for the various predefined image locations on the selected template. Other digital image albuming systems are designed to produce album pages automatically with minimal input from the user.

One exemplary photo albuming system dynamically lays out images and associated text using pre-defined layouts that are stored in a layout definition file. The images and associated text are laid out based on the contents of the layout definition file. A user interface provides a canvas and a layout gallery. The user places one or more images on the canvas and selects a pre-defined layout from the gallery that is applied dynamically to images that are placed on the canvas. Once the layout has been dynamically generated and displayed, the user can modify the layout by adding additional images or completing the text annotations in the layout. The user may also modify the size or position of elements in the layout. In response to modification of the layout, the layout is regenerated based on contents of the layout definition file in view of the modification. For example, if a new image is added, the layout is regenerated to appropriately incorporate the new image into the layout.

What are needed are improved systems and methods of automatically arranging images and text on a page.

BRIEF SUMMARY OF THE INVENTION

In one aspect, the invention features a method in accordance with which a user interface responsive to user input requesting a layout of graphic objects on a page is presented on a display. At least one of the graphic objects is a text block. A text block presentation corresponding to an arrangement of a block of text that has a text layout and target size dimensions that accommodate an output text rendering style is determined. A candidate layout of frames on the page is ascertained. The frames define respective size dimensions and positions of respective views of the graphic objects on the page. In response to a determination that the target size dimensions are not accommodated by the size dimensions of the frame of the text block presentation, the candidate layout is modified by changing the size dimensions of the frame of the text block presentation to accommodate the target size dimensions and adjusting the size dimensions of the other frames in the candidate layout based on the changed size dimensions of the frame of the text block presentation. On the display, the modified candidate layout is presented in the user interface.

In another aspect the invention features a method in accordance with which a first layout of frames on a page is determined from a first set of aspect ratios and nominal sizes subject to a set of layout constraints. The frames in the first layout define respective sizes and positions of respective views of graphic objects that respectively are associated with the aspect ratios and nominal sizes in the first set. At least one of the graphic objects is a block of text. The frame of the text block in the first layout has size dimensions that accommodate an output text rendering style. A user interface is presented on a display. The user interface shows a graphic representation of the first layout of frames containing the views of the associated graphic objects and provides user controls enabling a user to modify one or more of the graphic objects in the first layout in terms of size, aspect ratio, and position on the page. At least one user command to modify the first layout in relation to a selected one of the graphic objects is received via the user interface. The first set of aspect ratios and sizes is modified pursuant to the user command to produce a second set of aspect ratios and nominal sizes. A second layout of frames on the page is ascertained from the second set of aspect ratios and nominal sizes subject to the set of layout constraints. The frames in the second layout define respective sizes and positions of respective views of graphic objects that respectively are associated with the aspect ratios and nominal sizes in the second set. The size dimensions of the frame of the text block in the second layout accommodate the output text rendering style. A graphic representation of the second layout of frames containing the views of the associated graphic objects is depicted on the display. The invention also features apparatus operable to implement the inventive methods described above and computer-readable media storing computer-readable instructions causing a computer to implement the inventive methods described above.

Other features and advantages of the invention will become apparent from the following description, including the drawings and the claims.

BRIEF DESCRIPTION OF THE DRAWINGS

FIG. 22

DETAILED DESCRIPTION OF THE INVENTION

Figure 1:
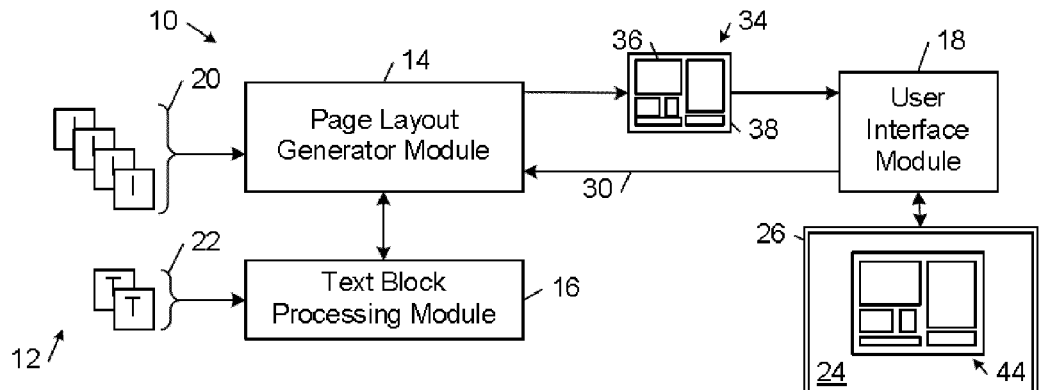
FIG. 1 is a block diagram of an embodiment of a graphic object arrangement system generating a user interface on a display.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. DEFINITION OF TERMS

As used herein, the term "page" refers to any type of discrete area in which graphic objects may be laid out, including a physical page embodied by a discrete physical medium (e.g., a piece of paper) on which a layout of graphic objects may be printed, and a virtual, digital or electronic page containing a layout of graphic objects that may be presented to a user by, for example, an electronic display device.

The term "graphic object" refers broadly to any type of visually perceptible content that may be rendered on a physical or virtual page, including images and text. Image-based graphic objects (or simply "images") may be complete or partial versions of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image. The term "graphic object" encompasses both a single-element graphic object and a multi-element graphic object formed from a cohesive group or collection of one or more graphic objects. The assignment of single-element graphic objects to a particular multi-element graphic object signifies that the constituent single-element graphic objects are related. In general, the type of single-element graphic objects in a multi-element graphic object may be the same or different.

A "text block" is a graphic object that consists of a formatted or unformatted string of text characters that is associated with an output text rendering style. An "output text rendering style" is a mode of rendering text that is defined by a specified set of text rendering parameters (e.g., font, point-size, line leading). A "text block presentation" is an arrangement of a block of text that has a text layout and size dimensions that accommodate an output text rendering style. The word "accommodate" means able to contain.

In the illustrated embodiments, each of the graphic objects is associated with a respective aspect ratio, which is defined as the ratio of image height to image width. Each graphic object also typically is associated with a respective positive scalar-valued nominal size. The term "nominal size" refers to a designated size that may or may not vary from the actual or rendered size. The "size" of a graphic object refers to the amount of area of a page that is occupied by the graphic object. In some embodiments, the user is allowed to set the nominal size values that are assigned to the images. In other embodiments, the graphic object arrangement system automatically assigns the nominal size values to the graphic objects. In some implementations, image-based graphic objects (e.g., images, such as photographs) may be designated as fixed-area images or variable-area images. In these implementations, the areas or sizes of the fixed area images are not changed in the generated layouts, whereas the sizes of the variable-area images are permitted to change. Variable-area images may or may not have constraints associated with the relative areas of images rendered on the same page.

In general, graphic objects may be laid out on a page in accordance with a "strict area" style or a "brick" style. In a strict area style layout, the relative areas of graphic objects on the same page may meet pre-specified proportions. For example, a user may specify that all graphic objects on the same page have the same area. In a brick style layout, the relative areas of graphic objects on the same page are selected so that the spacing between adjacent images meets specified criteria. Additional details regarding strict area style layouts and brick style layouts may be obtained from U.S. patent application Ser. No. 10/675,724, filed Sep. 30, 2004, and U.S. patent application Ser. No. 10/675,823, filed Sep. 30, 2004.

As used herein, the term "includes" means includes but not limited to, the term "including" means including but not limited to. The term "based on" means based at least in part on.

II. INTRODUCTION

The embodiments that are described herein provide a fully automatic method for arranging an arbitrary number of graphic objects, including one or more image-based graphic objects and one or more text blocks of arbitrary length, on a page. In this way, graphic object layout can be created that reserves an appropriate amount of space for one or more text blocks. The amount of space reserved is determined on the fly based on the length of the text block and the output text rendering parameters that are associated with the text block. As a result, in the final layout small text blocks (e.g., text blocks with a small point size, or relatively little text) take up relatively little space on a page, whereas large text blocks occupy a greater fraction of the page, providing a more visually appealing layout of images and text.

III. OVERVIEW

A. Introduction

FIG. 1 shows an embodiment of a system 10 for arranging graphic objects 12 on one or more pages. The system 10 includes a page layout generator module 14, a text block processing module 16, and a user interface module 18 through which a user interacts with the graphic object arrangement system 10. The graphic objects 12 include one or more image-based graphic objects 20 (e.g., digital photographs) and one or more text blocks 22, which may be stored in one or more local or remote computer-readable media.

Figure 2:
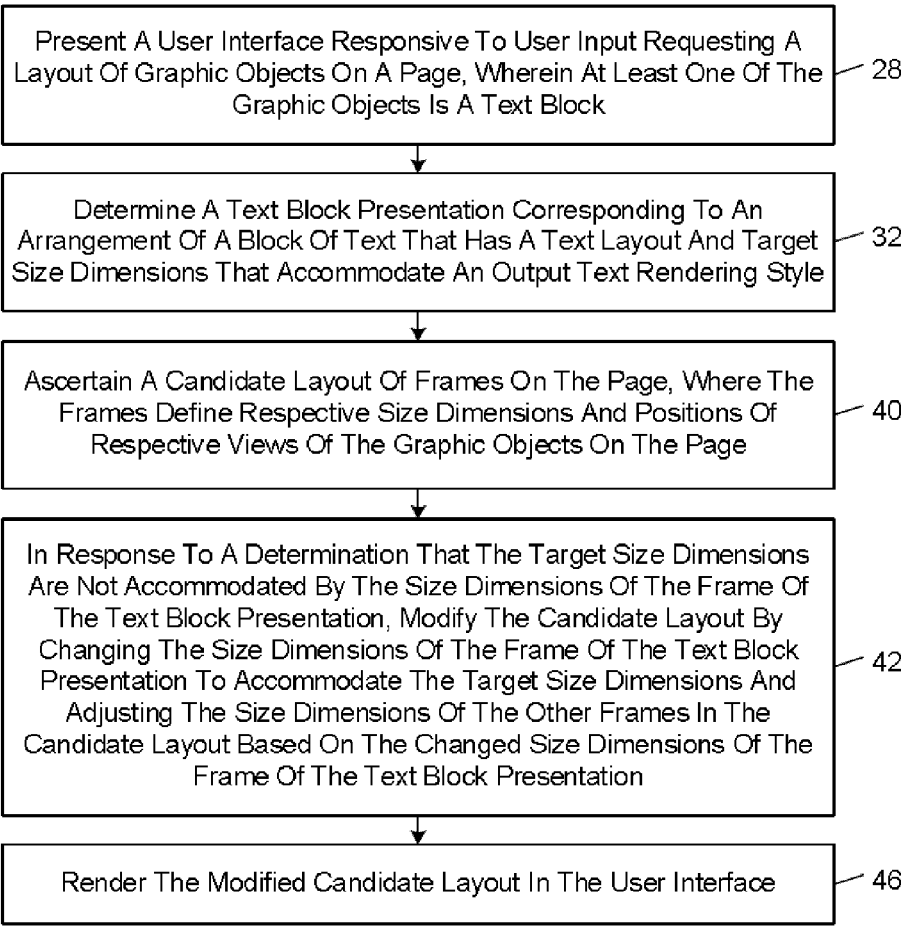
FIG. 2 is a flow diagram of an embodiment of a method of arranging graphic objects on a page with text.

FIG. 2 shows an embodiment of a method by which the graphic object arrangement system 10 generates a respective layout of ones of the graphic objects 12 on a page.

In accordance with the method of FIG. 2, the user interface module 18 presents a user interface 24 on a display 26 (FIG. 2, block 28). The user interface 24 is responsive to user input requesting a layout of ones of the graphic objects 12 on a page. In this process, the user interface 24 receives user input designating ones of the graphic objects 12—including one or more of the text blocks 22—for inclusion in the layout. In some cases, the user may enter a text string corresponding to the text block directly into an input component of the user interface 24. The user interface module 18 sends instructions 30 that correspond to the user request to the page layout generator module 14. The page layout generator module 14 parses the instructions 30 and sends instructions to the text processing module 16 for processing the one or more text blocks designated by the user for inclusion in the page layout.

For each of the designated text blocks, the text processing module 16 determines at least one text block presentation that corresponds to an arrangement of a block of text that has a respective text layout and respective target size dimensions that accommodate an output text rendering style (FIG. 2, block 32). Each text block presentation corresponds to a different respective layout of text that accommodates the output text rendering style. As explained in detail below, there are a variety of different ways in which the text processing module 16 can determine text block presentations. In some embodiments, the text processing module 16 determines to the text block presentations based on a standard text rendering function (e.g., the TextRenderer.MeasureText method provided in the Microsoft®.NET Framework 2.0) that returns the corresponding height dimension of presentation. In some embodiments, the text processing module 16 determines the text block presentations based on sampling between maximal and minimal values for the widths and the heights of the presentations, as described below in connection with FIG. 17.

The page layout generator module 14 ascertains a candidate layout of frames on a page, where the frames define respective size dimensions and positions of respective views of the graphic objects on the page (FIG. 2, block 40). In response to a determination that the target size dimensions are not accommodated by the size dimensions of the frame of the text block presentation, the page layout generator module 14 modifies the candidate layout by changing the size dimensions of the frame of the text block presentation to accommodate the target size dimensions and adjusting the size dimensions of the other frames in the candidate layout based on the changed size dimensions of the frame of the text block presentation (FIG. 2, block 42). The page layout generator module 14 sends an output layout specification 34 to the user interface module 18, which renders a layout 44 of the graphic objects in the user interface 24 on the display 26 (FIG. 2, block 46).

Figure 3:
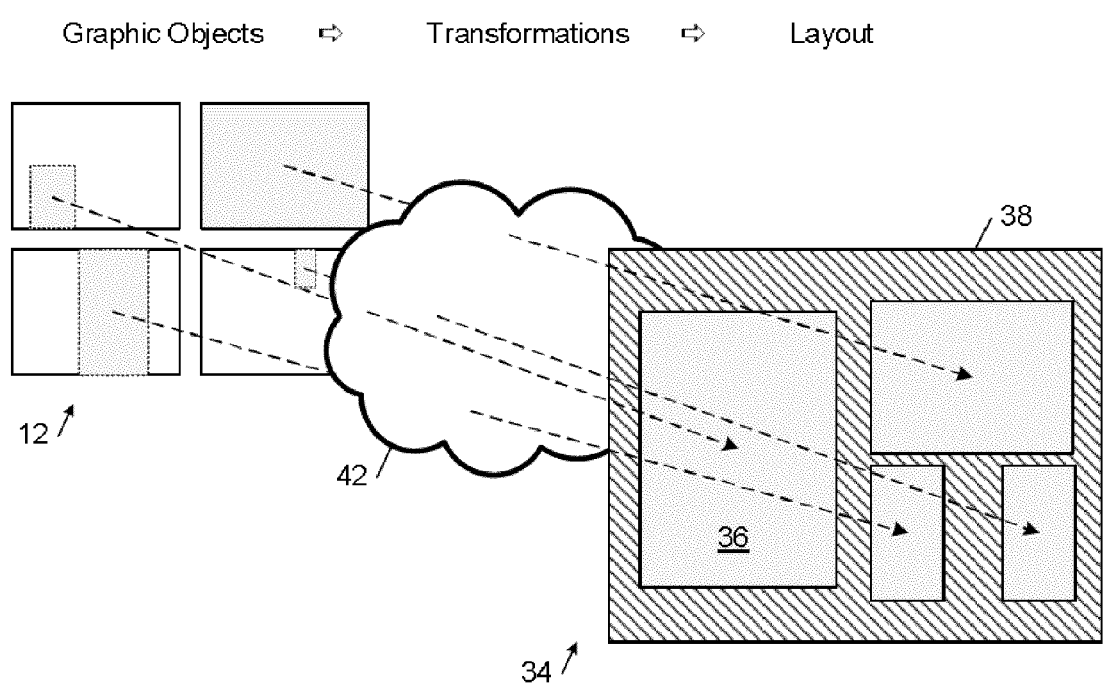
FIG. 3 is a diagrammatic illustrative view of images undergoing transformation and projection onto a layout of frames on a page.

Referring to FIG. 3, each frame 36 defines a respective view of at least a portion (shown shaded) of a respective one of the graphic objects 12. The user interface module projects the views of the graphic objects onto the frames 36 to produce the graphic object layout 44 in the user interface 24 shown in FIG. 1. As shown diagrammatically in FIG. 3, the image content in each view is subjected to zero or more transformations 43 (e.g., scaling, cropping, and filtering operations) before being projected onto the frames 36. The layout specification 34 includes a specification of size dimensions and positions of the frames 36 on the page 38 and an association between each of the frames 36 and a respective view of a respective one of the graphic objects 12.

In some embodiments, the page layout generator module 14 determines respective aspect ratios of each of the text block presentations and the other graphic objects 20, and ascertains the candidate layout based on the determined aspect ratios. In these embodiments, the process of ascertaining the candidate layout involves setting the size dimensions of the frames such that the frame of the text block presentation and the other frames have aspect ratios that respectively match the aspect ratios of the presentation and the other graphic objects. In response to the determination that the target size dimensions are not accommodated by the size dimensions of the frame of the text block presentation (FIG. 2, block 42), the page layout generator module 14 adjusts the size dimensions of the other frames by altering the aspect ratios of the other frames to accommodate the changed size dimensions of the frame of the text block presentation. In some exemplary embodiments, this process involves reducing height dimensions without changing width dimensions of the other frames in response to an increase in the height dimension of the presentation, and reducing width dimensions without changing height dimensions of the other frames in response to an increase in the width dimension of the presentation. Thus, for each of the modified frames, the rendering process performed in block 46 of FIG. 2 involves rendering a respective view of a cropped version of the respective graphic object through the modified frame.

The modules 14-18 of the graphic object arrangement system 10 are not limited to a specific hardware or software configuration, but rather they may be implemented in any computing or processing environment, including in digital electronic circuitry or in computer hardware, firmware, device driver, or software. For example, in some implementations, these modules may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants). In some implementations, computer process instructions for implementing the modules 14-18 and the data generated by the modules 14-18 are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and CD-ROM.

IV. EXEMPLARY EMBODIMENTS OF THE PAGE LAYOUT GENERATOR MODULE

A. Introduction

Figure 4:
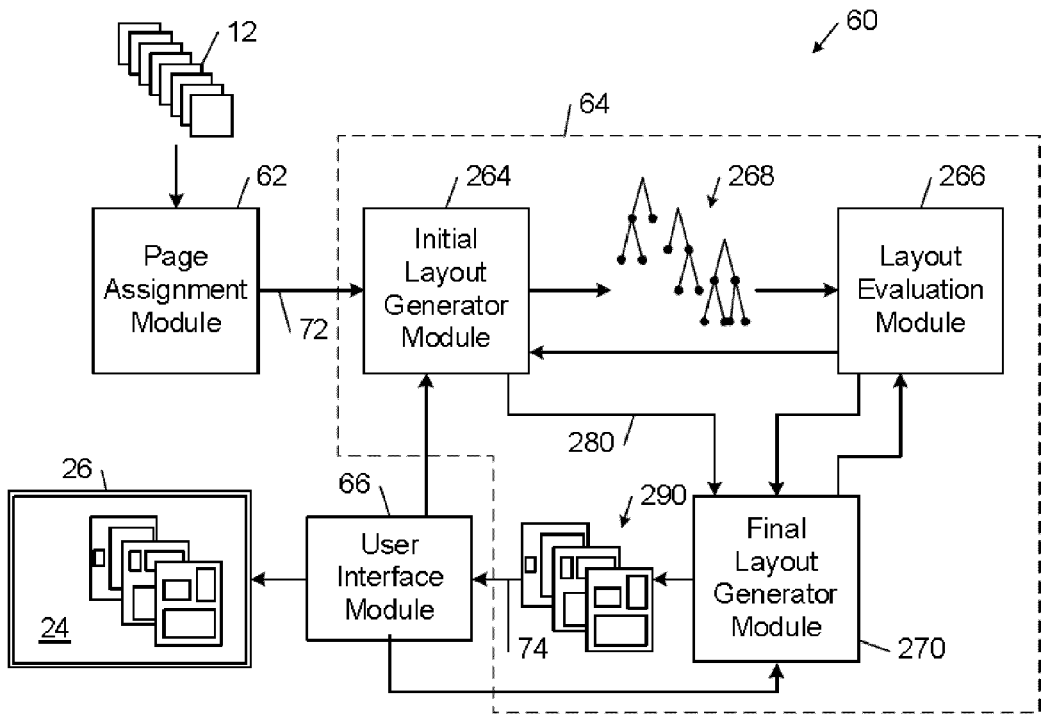
FIG. 4 is a block diagram of an embodiment of a system for arranging graphic objects on one or more pages.

FIG. 4 shows an embodiment 60 of the graphic object arrangement system 10 that includes a page assignment module 62, an embodiment 64 of the page layout generator module 14, and an embodiment 66 of the user interface module 18 through which a user interacts with the graphic object arrangement system 60.

In operation, the page assignment module 62 assigns graphic objects to one or more pages. The page assignment module 62 operates on a collection of the graphic objects 12, which may be designated by the user or may be identified automatically by the graphic object arrangement system 60. The page assignment module 62 assigns the graphic objects 12 to the one or more pages using any one of a wide variety of page assignment methods. In some approaches, the page assignment module 62 assigns the graphic objects 12 to pages based on a page-filling criterion, such as a user-specified or default maximum number of graphic objects 12 that may be laid out on a page, or a user-specified or default fixed number of pages. In these approaches, the page assignment module 62 may assign the graphic objects 12 to pages in accordance with one or more arrangement criteria, such as a user-specified arrangement of graphic objects or a default arrangement rule that is specified in terms of metadata that is associated with the graphic objects 12. For example, the page assignment module 62 may assign graphic objects 12 to pages chronologically based on date and time metadata that is associated with the graphic objects 12. Alternatively, the page assignment module 62 may assign graphic objects 12 to pages based on an event-based analysis of the graphic objects 12. The page assignment module 62 passes graphic object page assignment data 72, which specifies the assignments of the graphic objects 12 to the pages, to the initial layout generator module 64.

The page layout generator module 64 outputs final or determinate layouts 74 of the respective graphic objects on each of the pages in accordance with the graphic object assignment data 72. As used herein, the terms "determinate layout" and "final layout" are used synonymously to refer to a layout of graphic objects on a page in which the positions and dimensions of the graphic objects are specified. In some embodiments, the page layout generator module 64 determines a final layout for a given one of the pages based on a scoring, evaluation, or fitness function that promotes the production of final layouts in which the sizes of the views of the graphic objects are closer to the nominal sizes assigned to the graphic objects and the views of the text blocks accommodate the target size dimensions of the text block. Such a scoring, evaluation, or fitness function may be utilized in a wide variety of different layout generation embodiments. In some implementations, the page layout generator module 64 outputs the final layouts 74 in the form of a specification that is arranged in a particular file format (e.g., PDF or XML).

The page layout generator module 64 outputs the final layouts 74 of the graphic objects 12 on the one or more pages to the user interface module 66, which presents (or renders) the final layouts on the display 26. In some implementations, the user interface module 66 allows a user to interactively browse the pages that are generated automatically by the graphic object arrangement system 60. The user interface module 66 also allows a user to specify edits to the pages. Any specified edits to a given page are interpreted by the user interface module 66. The user interface module 66 transmits the interpreted user command instructions to the page layout generator module 64. The page layout generator module 64 repeats one or more aspects of the layout generation method to determine revised final layouts 74 of one or more pages in accordance with the edits received from the user interface module 66. The user interface module 66 presents the revised final layouts 74 to the user in the user interface 24. The user then may browse the revised pages, specify edits to the one or more revised pages, or command the system 60 to render some or all of the pages.

As shown in FIG. 4, the page layout generator module 64 includes an initial layout generator module 264, a layout evaluation module 266, and a final layout generator module 270.

In general, the modules 264-270 of the page layout generator module 64 are not limited to any particular hardware or software configuration, but rather they may be implemented in any computing or processing environment, including in digital electronic circuitry or in computer hardware, firmware, device driver, or software. For example, in some implementations, these modules may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants). In some implementations, computer process instructions for implementing the modules 264-270 and the data generated by the modules 264-270 are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and CD-ROM.

Figure 5:
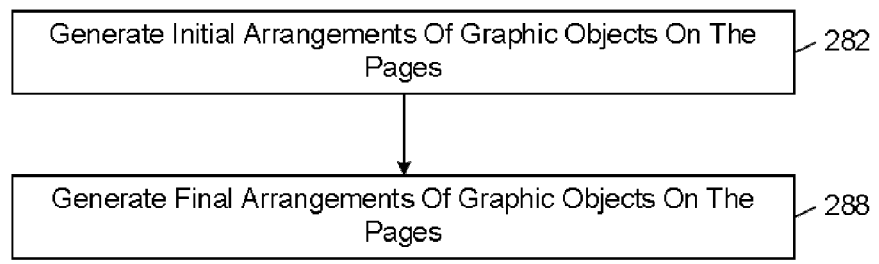
FIG. 5 is a flow diagram of an embodiment of a method of arranging graphic objects on pages.

FIG. 5 shows an embodiment of a method by which the initial layout generator module 264, the layout evaluation module 266, and the final layout generator module 270 cooperatively generate a layout of graphic objects on one or more pages.

The initial layout generator module 264 generates an initial arrangement 280 (or initial relative layout) of the graphic objects 12 on each page based on the graphic object assignment data 78 (FIG. 5, block 282). In some implementations, the initial layout generator module 264 stores the specifications of each relative page layout in a respective data structure 268 that represents a binary tree, which has leaf nodes corresponding to graphic objects and interior nodes corresponding to divisions of the corresponding page. The initial layout generator module 264 passes the initial arrangements 280 of graphic objects 12 on the pages to the final layout generator module 270.

The final layout generator module 270 generates final arrangements of graphic objects on the pages from the arrangements received from the initial layout generator module 264 (FIG. 5, block 288). In this process, the final layout generator module 270 determines respective determinate layouts 290 of the graphic objects on the one or more pages. As used herein, the term "determinate layout" or "final layout" refers to a layout of graphic objects on a page in which the positions and dimensions of the graphic objects are specified. The final layout generator module 270 outputs the final determinate layouts 290 of the graphic objects on the one or more pages to the user interface module 66.

In the processes of generating the initial arrangements 280 and the final arrangements 290 of graphic objects on the one or more pages (FIG. 5, blocks 282, 288), the initial layout generator 264 and the final layout generator module 270 generate various candidate arrangements and one set of final arrangements of graphic objects 12 on the one or more pages. The initial layout generator 264 and the final layout generator module 270 pass specifications of these arrangements to the layout evaluation module 266, which determines layout feasibility, computes various layout dimensions for the graphic objects on the pages, and computes scores for the candidate arrangements. As explained in detail below, the feasibility test results, dimensions, and scores are used by the initial layout generator 264 and the final layout generator module 270 to select the initial arrangements 280 and the final arrangements 290 of graphic objects from the various candidate arrangements that are generated.

B. Tree Structures

Figure 6:
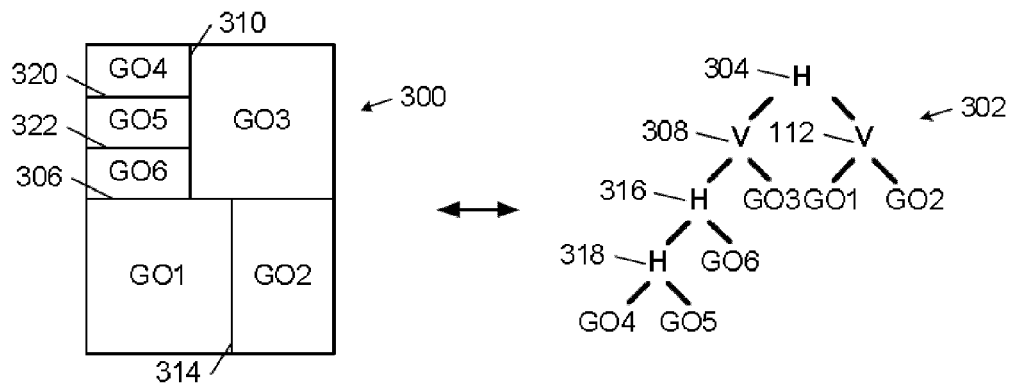
FIG. 6 is a diagrammatic view of a partition of a page and a hierarchical tree structure corresponding to the page partition.

Referring to FIG. 6, the initial layout generator module 264 divides each page 300 in accordance with a respective candidate relative layout, which is represented by a corresponding tree structure 302. Each leaf node of the tree structure 302 corresponds to a respective graphic object (GO1, GO2, GO3, GO4, GO5, and GO6) on the page 300. Each interior node (H, V) of the tree structure 302 corresponds to one of either a horizontal or a vertical division on the corresponding page 300. In the exemplary candidate relative layout of page 300 and the corresponding tree structure 302, the root H node 104 represents the horizontal division 306 of page 300. The left interior V node 308 represents the upper vertical division 310 of page 300, and the right interior V node 312 represents the lower vertical division 314 of page 300. The interior H nodes 316, 318 respectively represent the horizontal divisions 322, 320 of page 300. The positions of leaf nodes in the tree structure 302 specify the unique relative locations of the corresponding graphic objects (GO1, GO2, GO3, GO4, GO5, and GO6) on the page 300.

C. Candidate Layout Evaluation

Candidate layout evaluation may include one or more of the following steps: determining whether a candidate layout is feasible; computing dimensions for the graphic objects; and computing a layout score. The layout evaluation module 266 has at its disposal a number of distinct evaluation methods. Which method is selected can depend upon the desired layout style and the requirements of the module issuing the request for the layout to be evaluated. Other factors, such as method runtime, computational resources and memory constraints can also influence the choice of layout evaluation method.

Figure 7A:
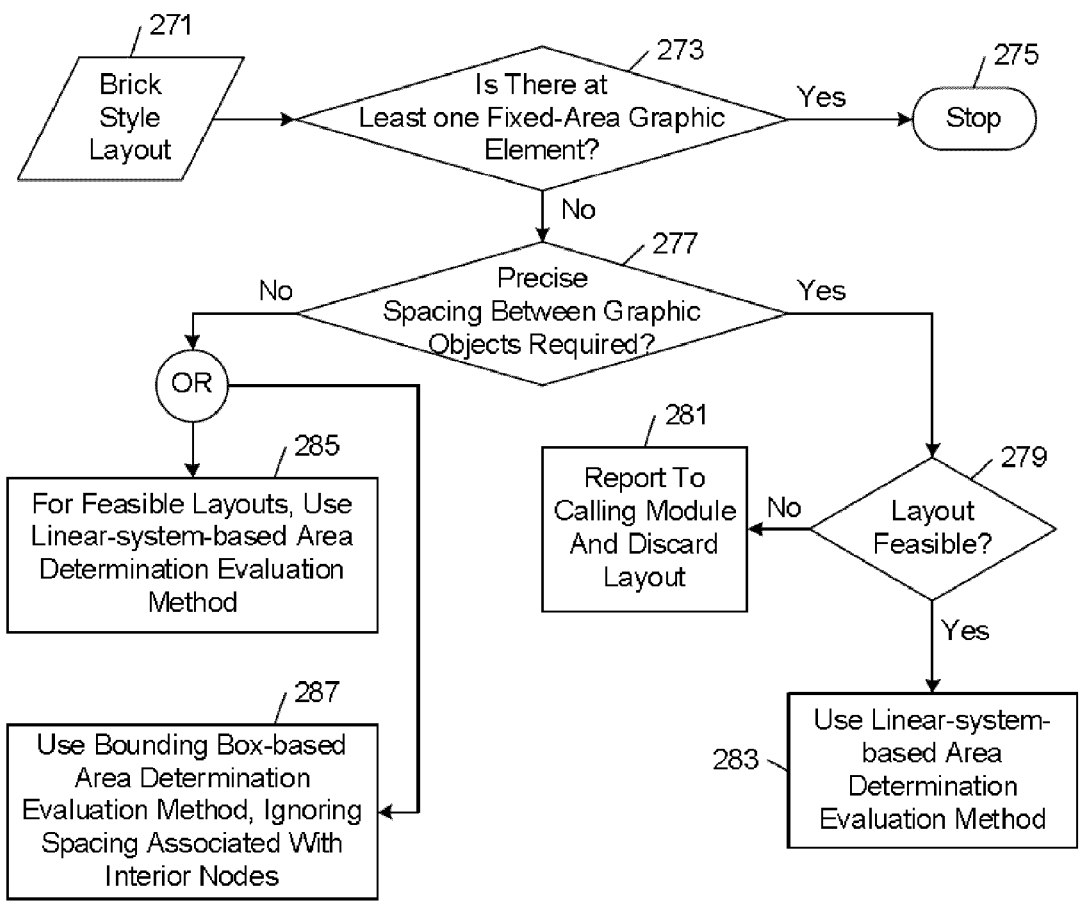
FIGS. 7A and 7B are flow diagrams of embodiments of methods of evaluating a layout of graphic objects on a page.
Figure 7B:
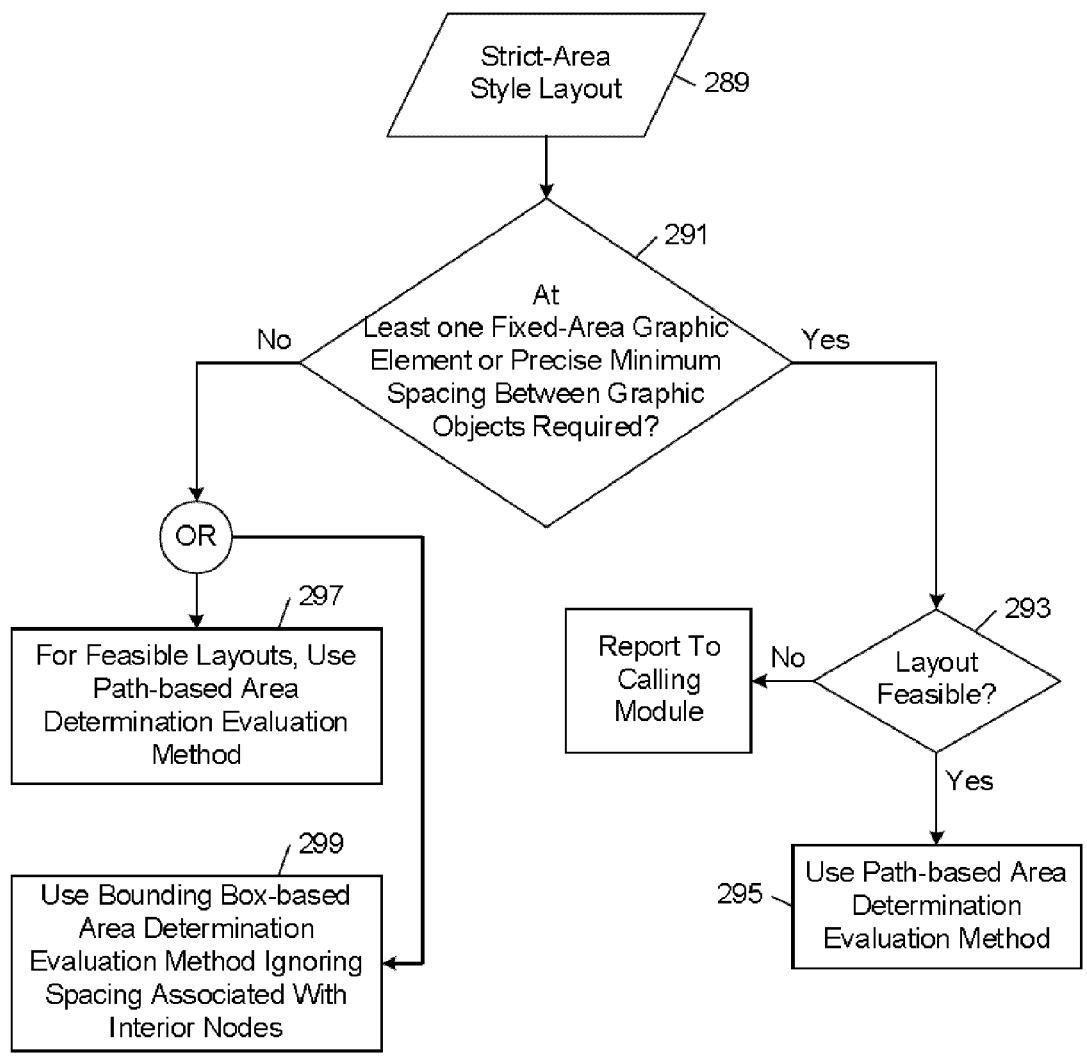

The processes for selecting a layout evaluation method are shown in FIGS. 7A and 7B.

Referring to FIG. 7A, if brick layout style is desired (block 271), then a determination is made whether there is at least one fixed-area graphic object in the set of graphic objects to be laid out on the page (block 273). In the illustrated embodiment, a brick style layout is considered feasible only if all the graphic objects are of variable area. Therefore, if there is at least one fixed-area graphic object in the layout (block 273), the execution of the layout evaluation process terminates (block 275).

Assuming all graphic objects are of type variable-area, a second determination is made as to whether the calling module requires computation of graphic object areas subject to explicit constraints on spacing between adjacent graphic objects (block 277). If the response is in the affirmative, a check is first made as to whether the candidate tree represents a feasible layout as described in detail below (block 279). If the layout is infeasible (block 279), then the calling module is so informed and the candidate layout is discarded (block 281). If the layout is feasible (block 279), the calling module is so informed (if necessary) and the linear-system-based area determination evaluation method described in detail below is used to evaluate the layout (block 283).

If the calling module does not require adherence to constraints associated with spacing between graphic objects (block 277), then one of two procedures is executed by the layout evaluation module 266. In the first procedure, the layout evaluation module 266 verifies that the candidate layout is feasible and employs a linear-system-based area determination evaluation process (block 285). In the second procedure, the layout evaluation module 66 employs a bounding-box-based area determination evaluation process without testing layout feasibility (block 287). In a typical implementation, the second procedure (block 287) is faster than the first (block 285). In some embodiments, the following rule is used to select which one of the first and second procedures to use for evaluating a layout: if the calling module is the initial layout generator module 64 then the second procedure (block 287) is used; and if the calling module is the final layout generator module 270, the first procedure (block 285) is used.

Referring to FIG. 7B, if strict area layout style is desired (block 289), then a determination is made as to whether the following is true: either there is at least one fixed-area graphic object in the candidate layout, or the calling module requires computation of graphic object areas subject to explicit constraints on spacing between adjacent graphic objects (block 291).

If there is at least one fixed-area graphic object in the candidate layout or the calling module requires computation of graphic object areas subject to explicit constraints on spacing between adjacent graphic objects (block 291), then a check is first made as to whether the candidate tree represents a feasible layout as described in detail below (block 293). If the layout is infeasible, then the calling module is so informed. If the layout is feasible, the calling module is so informed (if necessary) and the path-based area determination evaluation process described in detail below is used to evaluate the layout (block 295).

If there are no fixed-area objects in the candidate layout and the calling module does not require computation of graphic object areas subject to explicit constraints on spacing between adjacent graphic objects (block 291), then one of two available procedures can be followed. In the first procedure, the layout evaluation module 66 verifies that the candidate layout is feasible and employs a path-based area determination evaluation process (block 297) In the second procedure, the layout evaluation module 66 employs a bounding-box-based area determination evaluation process without testing layout feasibility (block 299). In a typical implementation, the second procedure (block 299) is faster than the first (block 297). In some embodiments, the following rule is used to select which of the first and second procedures to use for evaluating a layout: if the calling module is the initial layout generator module 264 then the second procedure (block 299) is used; and if the calling module is the final layout generator module 270, the first procedure (block 297) is used.

1. Feasibility of Candidate Tree Structures a. Overview

In some embodiments, the layout evaluation module 66 first determines whether a current candidate tree structure represents a feasible candidate relative layout.

A candidate relative layout is feasible if the constituent graphic objects fit within the space available on the page, including consideration of fixed-area graphic objects and any user-specified and system-specified fixed spacing between graphic objects. In the embodiments described above, if there are no fixed-area graphic objects on the page and there is no constraint on spacing between adjacent graphic objects, then any layout is feasible. Thus, as can be deduced from FIGS. 23A and 23B, layout feasibility is only considered if the selected area determination module is either the path-based area determination module or the linear-system-based area determination module. Layout feasibility is not considered if the selected area determination module is the bounding-box-based area determination.

b. Determining Feasibility of Candidate Tree Structures

Figure 8:
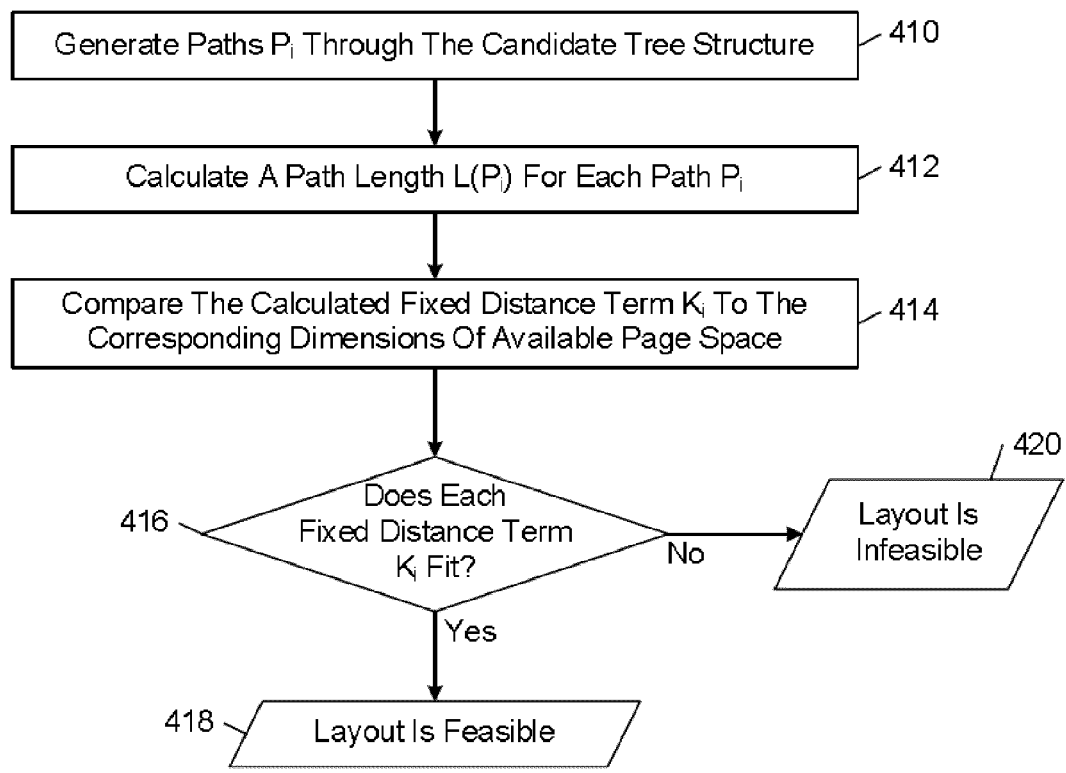
FIG. 8 is a flow diagram of an embodiment of a method of determining feasibility of paths through a tree structure.

FIG. 8 shows an embodiment by which the layout evaluation module 66 determines the feasibility of a candidate tree structure.

The layout evaluation module 66 generates paths $P_i$ through the candidate structure in accordance with the path generation process described below in connection with FIGS. 9-10J (FIG. 8, block 410).

The layout evaluation module 66 calculates a path length $L(P_i)$ for each path $P_i$ (FIG. 8, block 412). If path $P_i$ is vertical, then its length is $$L(P_i) = \text{sum(fixed distances through divisions along } P_i\text{)} + \text{sum(heights of fixed-area graphic objects on } P_i\text{)} + \text{sum(heights of variable-area graphic objects on } P_i\text{)} \quad (2)$$

The height ($H_{GO}$) of a graphic object can be written as follows:

$$H_{GO} = \sqrt{a \cdot A} = \sqrt{a} \cdot \sqrt{A} = Q \cdot \sqrt{a} \quad (3)$$

where A is the area of the graphic object, a is the aspect ratio defined as the ratio of the height divided by the width, and Q is the square root of the area. Therefore, if $P_i$ is a vertical path, its length can be written $$L(P_i) = K_i + \sum_{j \in G_i} Q_{i,j} \cdot \sqrt{a_{i,j}} \quad (4)$$

where $K_i$ is the sum of the first two terms in equation (2) (i.e., all the fixed distances along path $P_i$); $Q_{i,j}$ is the square root of the area of the j-th variable area object on path $P_i$; and $a_{i,j}$ is the aspect ratio of the j-th variable area object on path $P_i$. Note that the summation term corresponds to the sum of the heights of variable area graphic objects on path $P_i$.

From a similar derivation, the length of horizontal path $P_i$ can be written $$L(P_i) = K_i + \sum_{j \in G_i} \frac{Q_{i,j}}{\sqrt{a_{i,j}}} \quad (5)$$

where $K_i$ is a sum of horizontal fixed distances and widths of fixed-area graphic objects along path $P_i$.

The layout evaluation module 266 compares the fixed-distance terms of the paths $K_i$ to the corresponding dimensions of the available page space (FIG. 8, block 414).

If each fixed-distance term fits within the available page space (i.e., $K_i \leq$ corresponding page space dimension for each path Pi) (FIG. 8, block 416), the layout evaluation module 266 designates the layout as feasible (FIG. 8, block 418). Otherwise, the layout evaluation module 266 designates the layout as infeasible (FIG. 8, block 420).

c. Generating Paths (i) Overview of Path Generation Method

Figure 9:
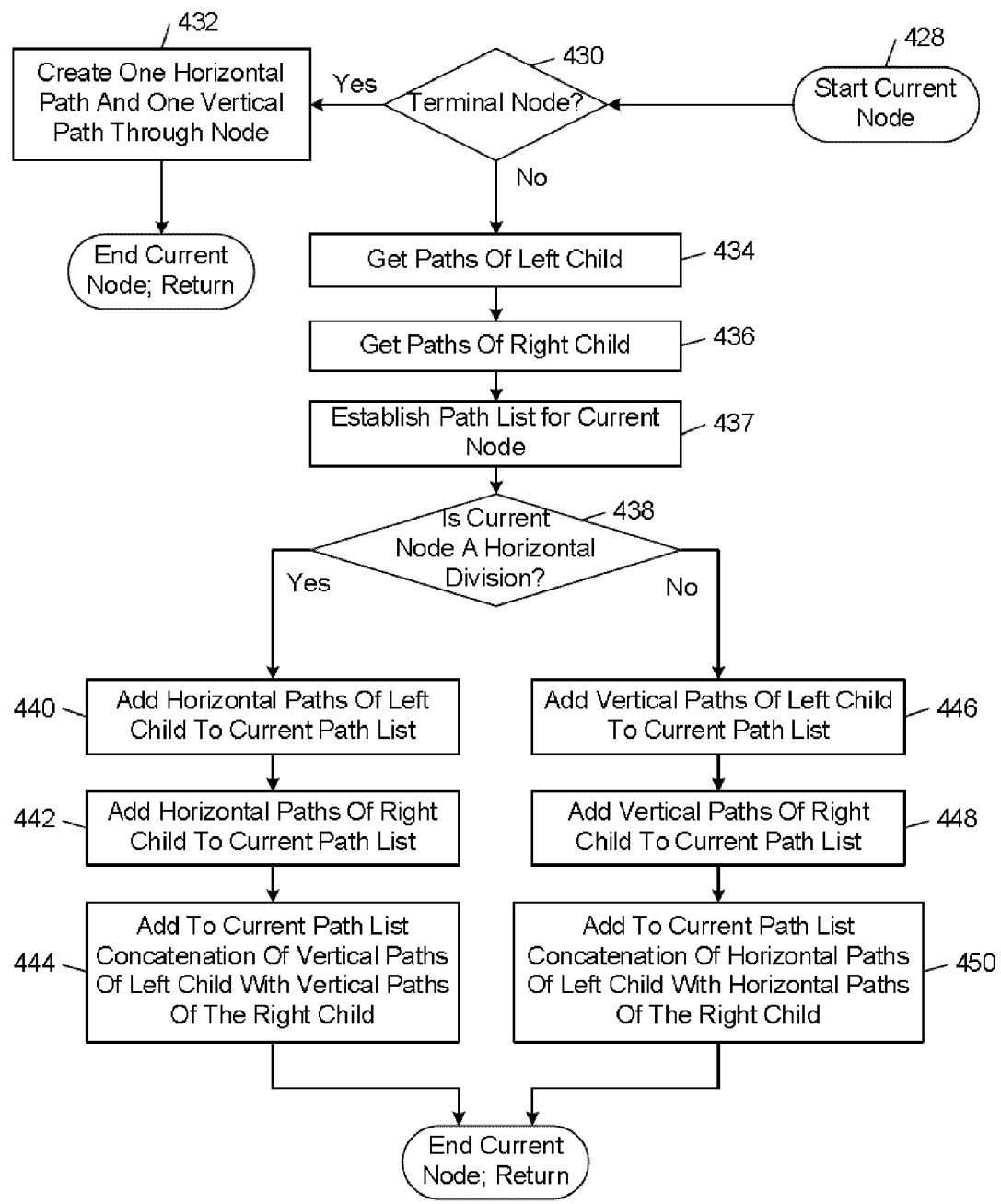
FIG. 9 is a flow diagram of an embodiment of a method of generating a set of paths through relative layouts of graphic objects on a page.

FIG. 9 shows a flow diagram of an embodiment of a method of generating a set of paths through a relative layout of graphic objects on a page.

Briefly, the path generation method of FIG. 9 is executed once for each node in the tree structure corresponding to the relative layout. That is, each node is in its turn the "current node" with respect to which a respective instance of the path generation method begins at block 428. The output of each instance of the path generation method is a set of paths that correspond to the current node. When a current node is a terminal node (i.e., a leaf node), two new paths are established for the current node in block 432. When a current node is an interior node, the current instance of the method is divided into two stages. In the first stage, respective instances of the method are executed for the left and right child nodes of the current node in blocks 434 and 436. In the second stage, the paths for the left and right child nodes are combined to form the paths of the current node in blocks 438-450. When a node is the root node, the paths that result from the corresponding instance of the path generation method are a complete set of paths for the relative layout being processed.

(ii) Detailed Description of Path Generation Method

Initially, the path generation method begins at block 428 of FIG. 9 with the root node of a given candidate relative layout. The path generation method recursively determines the paths for each of the interior and terminal nodes to obtain a complete set of paths through the current candidate relative layout. In the recursive process, the current node is input into the process and a decision is made at block 430 whether or not the current node is a terminal node.

If the current node is a terminal node, two new paths are started at block 432: a horizontal path with a single step traveling through the graphic object associated with the terminal node (e.g., from left to right), and a vertical path with a single step traveling through the graphic object (e.g., from top to bottom). After block 432, the instance of the path generation method that is associated with the current terminal node is complete.

If the current node is not a terminal node (block 430), blocks 434 and 436 submit the two child nodes of the current internal node (i.e., the left child node and the right child node) as current nodes that are processed beginning at node 428 in respective instances of the path generation method. The instance of the method being executed for the current parent node is on hold during the execution of the instances of the method for the child nodes. In the illustrated embodiment, the instance of the path generation method for the right child is executed after the instance of the path generation method for the left child is completed. The results of the instances of the path generation method that are executed for the left and right child nodes are two sets of paths.

In blocks 437-450, the paths that are determined for the two child nodes are combined. Block 437 establishes a path list for the current node. Block 438 determines if the current internal node represents a horizontal division or a vertical division. If the internal node represents a horizontal division, then the node inherits the horizontal paths of its children (blocks 440, 442) and combines the vertical paths of its children (block 444). In particular, if the current internal node represents a horizontal division, then the current internal node inherits each of the $N_{LH}$ horizontal paths of its left child (block 440), and each of the $N_{RH}$ horizontal paths of its right child (block 442). At block 444, the current internal node obtains a new set of vertical paths by concatenating each of the $N_{LV}$ vertical paths of the left-hand child in its turn with each of the $N_{RV}$ vertical paths of the right-hand child to form ($N_{LV}*N_{RV}$) vertical paths of the current node. The total number of paths is equal to $N_{LH}+N_{RH}+(N_{LV} \times N_{RV})$.

If the internal node represents a vertical division, then the node inherits the vertical paths of its children (blocks 446, 448), and combines the horizontal paths of its children (block 450). In particular, if the internal node represents a vertical division, then the node inherits each of the $N_{LV}$ vertical paths of its left child (block 446), and each of the $N_{RV}$ vertical paths of its right child (block 448). At block 450, the node obtains a new set of horizontal paths by concatenating each of the $N_{LH}$ horizontal paths of the left-hand child in its turn with each of the $N_{RH}$ horizontal paths of the right-hand child, to form ($N_{LH} \times N_{RH}$) horizontal paths of the current node. The number of paths is thus equal to $N_{LV}+N_{RV}+(N_{LH} \times N_{RH})$.

When a given instance of the path generation method that is being executed for a node is completed (e.g., after blocks 432, 444, and 450), process control returns to the instance that invoked the given instance. When the instance initiated for the root node is completed, the set of paths associated with the root node is the complete set of paths for the relative layout and the path generation method terminates.

2. Evaluating Candidate Tree Structures

In the embodiments that are described in this section of the application, the score that is used to evaluate a candidate relative layout depends on measures of area occupied by the graphic objects on the page.

a. Determining Areas of Graphic Objects

The layout evaluation module 266 calculates the areas occupied by the graphic objects that are specified in a given instance of a candidate relative layout in accordance with a bounding-box-based determination process, a path-based determination process or a linear-system based determination process.

(i) Bounding-Box-Based Determination of Graphic Object Areas

In the illustrated embodiments, the objective of the bounding box determination process is to compute an aspect ratio value and nominal size value for each interior node in a given tree structure. Each bounding box is determined by the boxes it encloses.

As will be described in greater detail below, the bounding boxes are computed using the nominal sizes of the graphic objects. As described above, these nominal sizes are assumed to be recorded in the page register of the current page. In some implementations, the bounding box characterization process begins at the leaf nodes and works toward the root node, in the order of a depth-first search, as illustrated in FIG. 10.

The formulas for the aspect ratio and nominal size of any interior node are given below. In general, for any image bounding box with an aspect ratio a, and a nominal size, e, the quantities $\sqrt{ae}$ and $\sqrt{e/a}$ are the nominal height and nominal width of the image bounding box, respectively. The aspect ratio, a, and the nominal size, e, for any interior node are functions of the aspect ratios and nominal sizes of its two children. In the following equations, $a_r$ and $e_r$ are the aspect ratio and nominal size of the right-hand child node, and $a_l$ and $e_l$ are the aspect ratio and nominal size of the left-hand child node. Thus, if the right-hand and left-hand child nodes are arranged side-by-side, the aspect ratio and nominal size of the bounding box that encloses them are:

$$a = \frac{\sqrt{a'e'}}{\sqrt{e_1/a_1} + \sqrt{e_r/a_r}} \qquad (6)$$

$$e = \sqrt{a'e'}(\sqrt{e_1/a_1} + \sqrt{e_r/a_r}) \qquad (7)$$

where $$\sqrt{a'e'} = \max_{i \in \{r,1\}}(\sqrt{a_i e_i}) \qquad (8)$$

The aspect ratio in equation (6) is the ratio of the greater nominal height divided by the sum of the two nominal widths, and the nominal size in equation (7) is the product of the greater nominal height and the sum of the two nominal widths. Finding the maximum in equation (8) determines which of the two child node boxes is nominally taller, and therefore governs the height of the parent node box.

If the two child nodes represent boxes that are arranged one on top of the other, the aspect ratio and nominal size of the bounding box that encloses them are:

$$a = \frac{\sqrt{a_1 e_1} + \sqrt{a_r e_r}}{\sqrt{e'/a'}} \qquad (9)$$

$$e = (\sqrt{a_1 e_1} + \sqrt{a_r e_r})\sqrt{e'/a'} \qquad (10)$$

where $$\sqrt{e'/a'} = \max_{i \in \{r,1\}}(\sqrt{e_i/a_i}) \qquad (11)$$

In this case, equation (11) determines which of the two child node boxes is nominally wider, and therefore governs the width of the parent node box.

The bounding box of the root node conveys the shape and nominal size of the entire layout of the page specified by the corresponding tree structure. The bounding box of the root node is referred to herein as the "principal bounding box".

When the aspect ratio and nominal size of the principal bounding box are known, the bounding-box based area $A_i$ for graphic object i is computed as $$A_i = \frac{e_i}{e_{pbb}} A_{pbb} \qquad (12)$$

where $e_i$ and $e_{pbb}$ are the nominal sizes of graphic object i and the principal bounding box respectively, and where $A_{pbb}$ is an area for the principal bounding box, computed as $$A_{pbb} = A_{page} \frac{\min\{a_{pbb}, a_{page}\}}{\max\{a_{pbb}, a_{page}\}} \qquad (13)$$

where $A_{page}$ is the area of the usable page space.

Figure 10:
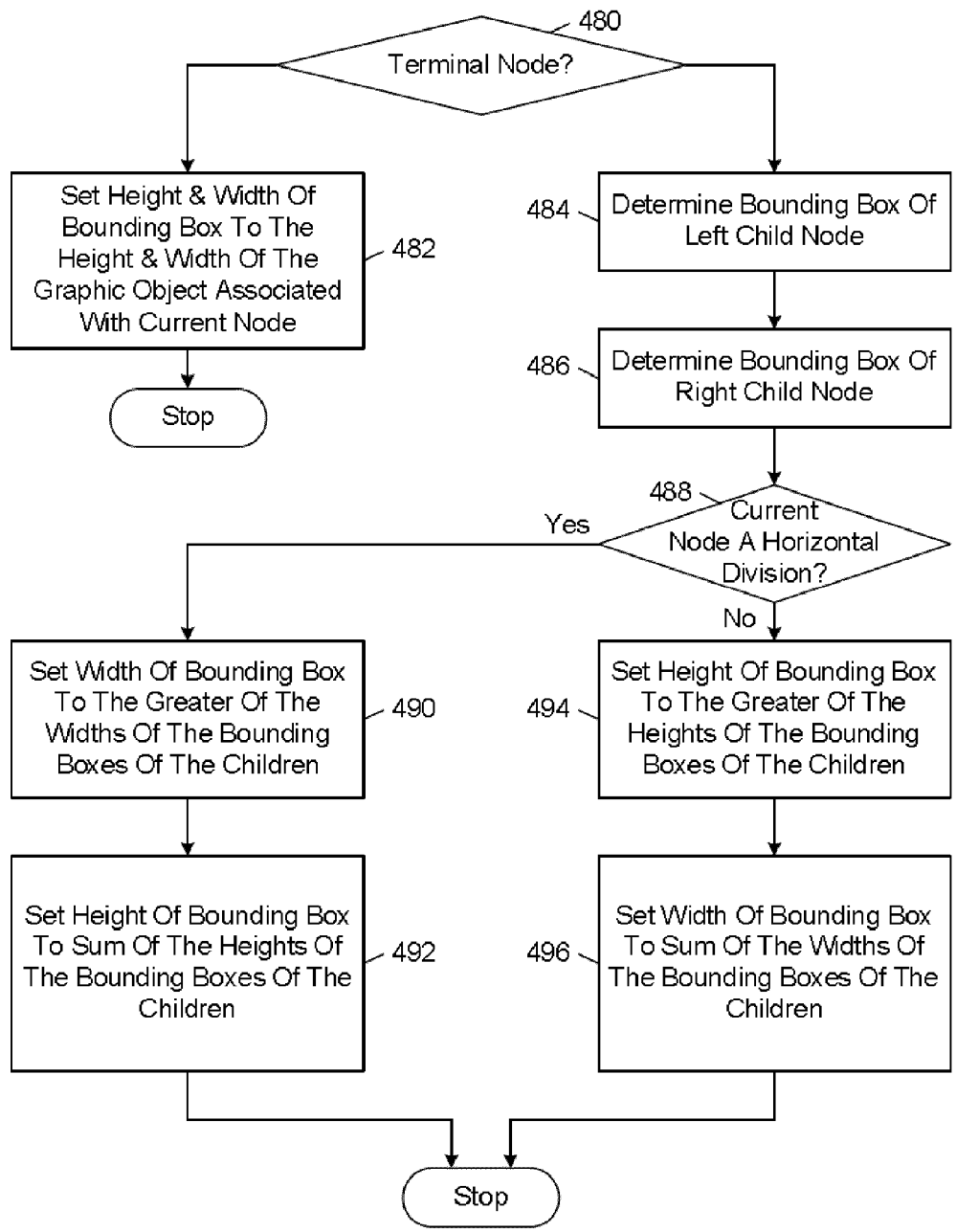
FIG. 10 is a flow diagram of an embodiment of a method of characterizing a bounding box of a node of a tree structure.

FIG. 10 shows a flow diagram of an embodiment of a recursive process by which the layout evaluation module 266 calculates relative height and width dimensions of the bounding boxes for the nodes of a tree structure.

The process begins with the root node as the current node. A decision is made whether the current node is a terminal node (FIG. 10, block 480). If the current node is a terminal node, a bounding box is established that has the nominal height and width of the associated graphic object (FIG. 10, block 482). If the current node is not a terminal node, the two child nodes of the current node (i.e., the left child node and the right child node) are submitted to the same recursive process (FIG. 10, blocks 484, 486). The bounding boxes of the two children are combined to form the bounding box for the current node as follows. The layout evaluation module 266 determines if the current node is a horizontal division or a vertical division (FIG. 10, block 488). If current node represents a horizontal division, then the nominal width of the bounding box is set to the nominal width of the wider of the bounding boxes of the two children (FIG. 10, block 490) and the nominal height of the bounding box is set to the sum of the nominal heights of the bounding boxes of the two children. If the current node represents a vertical division (FIG. 10, block 488), the nominal height of the bounding box is set to the nominal height of the taller of the bounding boxes of the two children (FIG. 10, block 494) and the nominal width of the bounding box is set to the sum of the nominal widths of the bounding boxes of the two children (FIG. 10, block 496). This process continues until the bounding box for the root node has been computed.

(ii) Path-Based Determination of Graphic Object Areas

In strict area style layout, each variable-area graphic assembly has an assigned nominal size, which is denoted by the variable e. In the context of a multi-element graphic object which has more than one constituent single-element graphic object (such as a series of keyframes from a video), a single aggregate nominal size is assigned to the entire graphic object and the nominal sizes of the individual graphic objects in the multi-element graphic object are set to equal the aggregate nominal size divided by the number of graphic objects in the graphic object. In the remainder of this section it is assumed that each graphic object j on a path $P_i$ is a single-element graphic object that has a positive nominal size $e_j$. Since a nominal size is proportional to the actual area, the variable Q, which is defined above, can be generalized to reflect the square root of a nominal size (rather than an absolute area) as follows:

$$Q = g\sqrt{e} \qquad (14)$$

where g is a positive scalar such that $g^2$ multiplied by the nominal size is an absolute measurable area (e.g., square inches). The ratio of Q divided by $\sqrt{e}$ is a constant across all variable-area graphic objects, so that the same value of g is used for all variable-area graphic objects on the page. Thus, in equations (4) and (5) above, when substituting $g \cdot \sqrt{e}$ for Q, g can be pulled out of the summation terms to arrive at:

$$L(P_i) = K_i + g \cdot \sum_{j \in G_i} \sqrt{e_{i,j}} \cdot \sqrt{a_{i,j}} \qquad (15)$$

$$L(P_i) = K_i + g \cdot \sum_{j \in G_i} \frac{\sqrt{e_{i,j}}}{\sqrt{a_{i,j}}} \qquad (16)$$

where $e_{i,j}$ is the nominal size of the $j^{th}$ variable-area graphic object on path $P_i$.

If path $P_i$ is a vertical path and the available area on the page has height $H_{PAGE}$, then solving the following equation for $g_i$ yields the value for which $P_i$ is exactly as long as the available area is high:

$$H_{PAGE} = K_i + g_i \cdot \sum_{j \in G_i} \sqrt{e_{i,j}} \cdot \sqrt{a_{i,j}} \qquad (17)$$

Similarly, if path $P_i$ is a horizontal path and the available area has width $W_{PAGE}$, then solving the following equation for $g_i$ yields the value for which the path fits exactly across the width of the available area:

$$W_{PAGE} = K_i + g_i \cdot \sum_{j \in G_i} \frac{\sqrt{e_{i,j}}}{\sqrt{a_{i,j}}} \qquad (18)$$

In one embodiment, areas for variable-area graphic objects are made as large as possible, while still allowing all the graphic objects to fall completely on the usable area of the page, by (for each path $P_i$) solving for $g_i$ using either equation (17) or (18), depending on whether $P_i$ is a vertical or horizontal path. Because the layout has previously been determined to be feasible, as described above, each solution for $g_i$ will be positive. If $g^*$ is defined to be the smallest solution across all the paths:

$$g^* = \min_i \{g_i\} \qquad (19)$$

then the area $A_j$ of the $j^{th}$ variable-area graphic object is computed as $$A_j = (g^*)^2 \cdot e_j \qquad (20)$$

where $e_j$ is the nominal size assigned to the $j^{th}$ variable-area graphic object.

(iii) Linear-System-Based Determination of Graphic Object Areas

In brick style layouts, graphic element areas are determined by first computing values of Q. Once the values of Q are known, they can be squared to compute absolute, measurable areas (e.g., square inches). Values of Q are computed for two hypothetical scenarios: (I) the height of the area occupied by graphic elements is constrained to equal the height of the usable area on the page; and (II) the width of the area occupied by graphic elements is constrained to equal the width of the usable area on the page. In most cases, only one of scenarios (I) and (II) will yield a feasible solution because in the other scenario, the unconstrained dimension will be greater than the available space. The scenario yielding the feasible solution is selected to produce the final set of graphic element areas.

In either scenario (I) or (II), values of Q are computed as the solution to a linear system of equations having N unknowns, where N is the number of graphic elements. Each of N−1 of the equations comes from an interior node of the complete tree structure, because in a tree accommodating N graphic elements, there are exactly (N−1) interior nodes.

For an interior node that represents a vertical division or cut of the area, the corresponding equation is derived by first obtaining two vertical paths, one path from each of its two children, and setting their lengths to be equal. Referring to equation (15) above, denoting the vertical path from the left-hand child as $P_L$ and from the right-hand child as $P_R$, the corresponding expression is given by:

$$K_R + \sum_{j \in G_R} Q_{R,j} \cdot \sqrt{a_{R,j}} = K_L \sum_{k \in G_L} Q_{L,k} \cdot \sqrt{a_{L,k}} \qquad (21)$$

where the variable j indexes the graphic objects along $P_R$ and k indexes the graphic objects along $P_L$. Rearranging equation (21) yields $$\sum_{j \in G_R} Q_{R,j} \cdot \sqrt{a_{R,j}} - \sum_{k \in G_L} Q_{L,k} \cdot \sqrt{a_{L,k}} = K_L - K_R \qquad (22)$$

The situation is analogous for an interior node that represents a horizontal division or cut of the area. Two horizontal paths are obtained, and their lengths set to be equal, yielding $$\sum_{j \in G_R} \frac{Q_{R,j}}{\sqrt{a_{R,j}}} - \sum_{k \in G_L} \frac{Q_{L,k}}{\sqrt{a_{L,k}}} = K_L - K_R \qquad (23)$$

By constructing an equation of the form of either (22) or (23) for each interior node, N−1 equations are obtained for N unknowns.

For scenario I, the $N^{th}$ equation is obtained by setting the length of any vertical path from the root node equal the height of the available area. For scenario II, the $N^{th}$ equation is obtained by setting the length of any horizontal path from the root node equal the width of the available area.

For both scenarios I and II, the N equations are written in matrix-vector form (Ax=b). The matrix contains only zeros, positive and negative square roots of graphic element aspect ratios, and positive and negative inverses of square roots of graphic element aspect ratios. The N elements of vector x are the Q variables. Among the N elements of vector b, (N−1) are computed as the right-hand side of either equation (21) or equation (22), and the other is equal to the height (scenario I) or width (scenario II) of the available area (minus the fixed distance along the path used to obtain the corresponding row). Computing inverse(A)*b yields the vector of Q values.

b. Scoring Tree Structures

In some embodiments, the initial layout generator module 64 selects candidate layouts by identifying those having the highest fitness or score. These scores are computed by the layout evaluation module 266 using a scoring, evaluation, or fitness function of the type described above. The scoring, evaluation, or fitness function promotes the production of final layouts in which the sizes of the graphic objects are closer to the nominal sizes assigned to the graphic objects. In some embodiments, the layout evaluation module 266 calculates for each of the candidate layouts a respective layout score based on degrees to which actual rendering sizes of the graphic objects in the candidate layout match the respective target rendering sizes. The scoring function typically incorporates a metric that provides an indication of how close the actual sizes of the graphic objects in a given layout are to their assigned nominal sizes. In some of these embodiments, the layout evaluation module 266 calculates a respective graphic object score for each of the graphic objects in each of the candidate layouts based on a ratio of the actual rendering size to the respective target rendering size. The layout evaluation module 266 calculates for each of the candidate layouts a respective layout score from the respective graphic object scores.

In some embodiments, the scoring, evaluation, or fitness function that is used by the layout evaluation module 266 corresponds to the target layout score function described above.

In some embodiments, the scoring, evaluation, or fitness function that is used by the layout evaluation module 266 combines the target layout score function described above with one or more other metrics. Other metrics that may or may not be included in the fitness or scoring function include, but are not limited to, coverage (i.e., the fraction of the page occupied by graphic objects) and consistency (i.e., the variation in the areas occupied by graphic objects on the page).

For example, in embodiments where strict area layout style is desired, the layout evaluation module 266 computes a layout score that combines the target layout score function described above with coverage. In some embodiments, coverage is computed as the sum of the graphic object areas on the page. These areas may have been computed either by the path-based area determination method or by the bounding-box based area determination method.

In embodiments where brick layout style is desired, the layout score combines the target layout score function described above with both coverage and consistency. In some of these embodiments, the combined layout score (Score) is calculated in accordance with equation (24):

$$\text{Score} = a_1 \text{layout\_score} + a_2 \alpha + a_3 \upsilon \quad (24)$$

The parameters $a_1$, $a_2$, and $a_3$ are empirically determined weighting factors. The variable $\alpha$ measures how well the aspect ratio of the usable area on the page agrees with the aspect ratio of the principal bounding box. The variable $\upsilon$ measures consistency. In some embodiments, each of the variables $\alpha$ and $\upsilon$ has a value in the range of 0 and 1, where 0 corresponds to low coverage and consistency and 1 corresponds to high coverage and consistency. In these embodiments, the variable $\alpha$ is computed as follows:

$$\alpha = \frac{\min(\text{page\_aspect}, \text{pbb\_aspect})}{\max(\text{page\_aspect}, \text{pbb\_aspect})} \quad (25)$$

where page_aspect is the aspect ratio of the usable area on the page, and pbb_aspect is the aspect ratio of the principal bounding box (i.e., the bounding box associated with the root node). The variable $\upsilon$ is computed as follows:

$$\upsilon = \frac{\min(\text{area of graphic objects on page})}{\max(\text{area of graphic objects on page})} \quad (26)$$

In equation (26), the graphic object areas may be computed by either the linear-system based area determination method or the bounding-box based area determination method. In these embodiments, the consistency measure $\upsilon$ is defined to be the minimum graphic object area divided by the maximum graphic object area.

Other embodiments may use different scoring functions for brick style layouts. For example, the score computed in accordance with equation (24) may be penalized for values of $\alpha$ and/or $\upsilon$ that are below predetermined thresholds. In some implementations, the values of $\alpha$ and/or $\upsilon$ may take into account any space between graphic objects.

In some embodiments, the scoring function additionally includes a penalty function that reduces the layout score based on the degree to which text block frames differ from the target dimensions of the respective text blocks. In some exemplary embodiments, the scoring function determines a penalty factor based on comparisons of respective thresholds that are associated four categories (i.e., too big, way too big, too small, and way too small) with the smallest of the ratios of the corresponding dimensions (i.e., height and width) of the text box frame and the target text box size, where the penalty factor depends on the degree to which the ratio strays from the respective thresholds.

D. Generating an Initial Arrangement of Graphic Objection a Page

1. Overview of Process of Generating an Initial Arrangement of Graphic Objects

Figure 11:
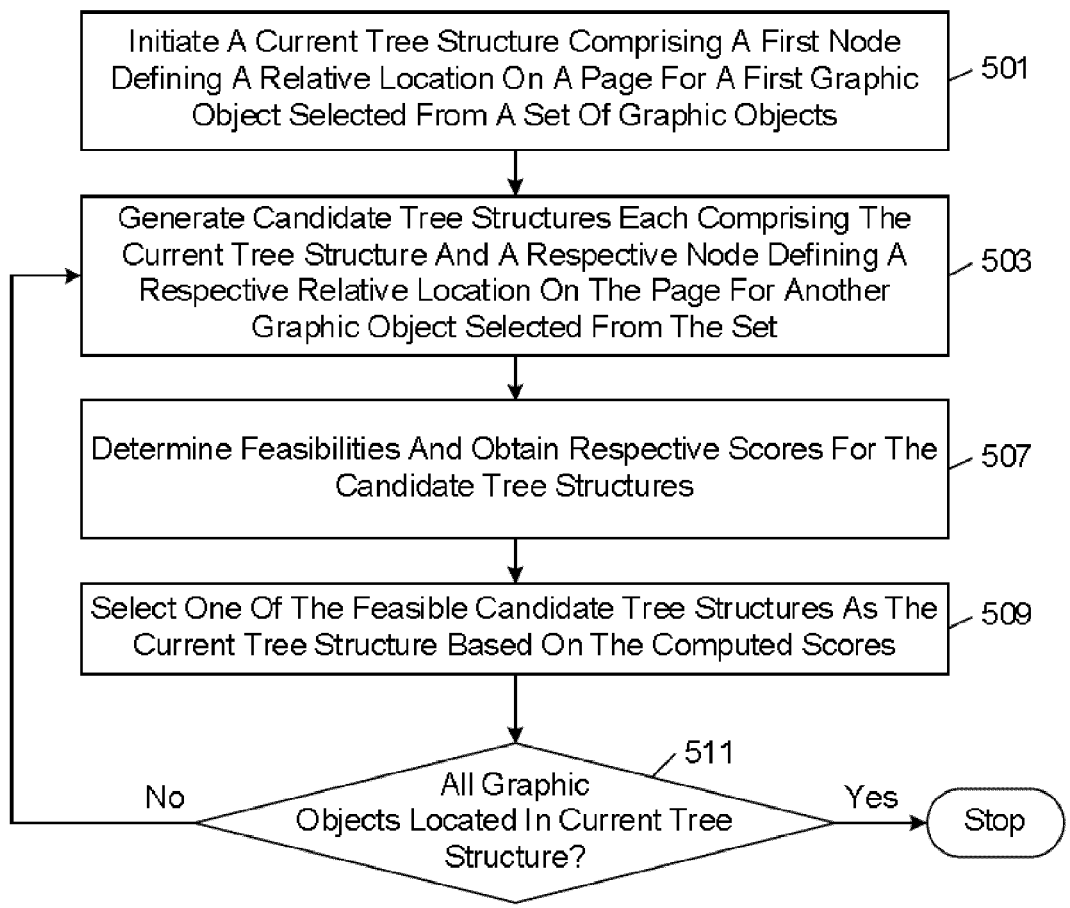
FIG. 11 is a flow diagram of an embodiment of a method of generating an initial arrangement of graphic objects on a page.

FIG. 11 shows a flow diagram of an embodiment of a method by which the initial layout generator module 264 generates a binary tree structure defining an initial arrangement 280 of graphic objects 270 on a page.

The initial layout generator module 264 initiates a current tree structure that includes a first node, which defines a relative location on a selected one of the pages for a first graphic object selected from a set of graphic objects (FIG. 11, block 501).

The initial layout generator module 264 generates candidate tree structures each comprising the current tree structure and a respective node defining a respective relative location on the selected page for another graphic object selected from the set (FIG. 11, block 503). The initial layout generator module 264 generates each candidate tree structure by adding one graphic object to the current tree structure.

After the multi-element graphic objects in the current tree structure have been expanded (using an expansion process described below), the initial layout generator module 264 obtains respective feasibility test results and scores based at least in part on the corresponding initial size dimensions for the candidate tree structures (FIG. 11, block 507). These scores and feasibility test results are obtained from the layout evaluation module 266. Any candidate tree structure deemed infeasible by the layout evaluation module 266 is eliminated from consideration.

The initial layout generator module 264 selects one of the candidate tree structures as the current tree structure based on the computed scores (FIG. 11, block 509).

The initial layout generator module 264 repeats the processes of generating (FIG. 11, block 503), obtaining (FIG. 11, block 507), and selecting (FIG. 11, block 509) until relative locations on the page are defined for all of the graphic objects in the set by respective nodes in the current tree structure (FIG. 11, block 511).

The process of FIG. 11 is repeated for each of the one or more pages on which the graphic objects are to be laid out.

In the process defined in FIG. 11, the tree structure generation process begins with a single graphic object, and additional graphic objects are added to the tree structure one at a time until all of the graphic objects that are assigned to the page have been added. If the total number of graphic objects assigned to a page is M, the layout for the page corresponds to the last in an increasing sequence of binary trees:

$$T(1), T(2), \ldots, T(M) \tag{27}$$

where $T(p)$ for $p \geq 1$ denotes a tree with p terminal nodes. Each of the intermediate trees $\{T\{p\}: 1 \leq p \leq N-1\}$ generates a viable layout.

Figure 12A:
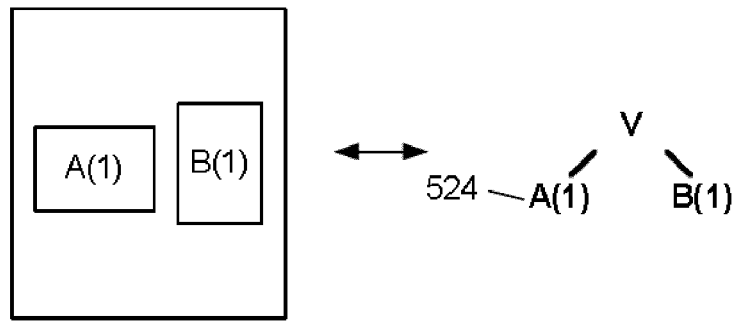
FIGS. 12A-12C are diagrammatic views of different partitions of a page and corresponding hierarchical tree structures.
Figure 12B:
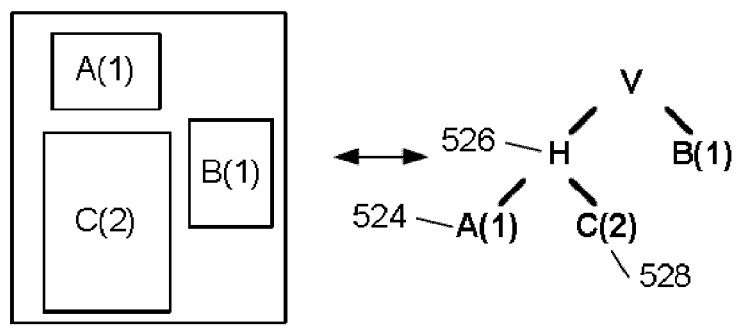
Figure 12C:
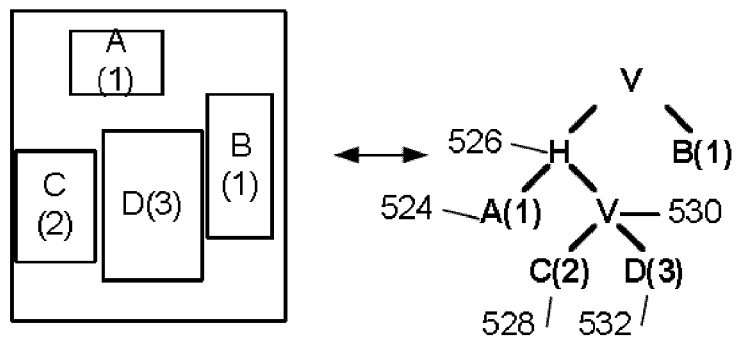

FIGS. 12A-12C show different partitions of a page and corresponding hierarchical tree structures at different stages of the tree structure generation process, where the numbers in parentheses are the nominal sizes assigned to the corresponding graphic objects A, B, C, D. Each node in the tree structure is associated with a bounding box in the layout of a page. Each interior node is associated with a bounding box around the boxes of its two child nodes, and each leaf node is associated with a cell where a respective graphic object is to be placed.

Each new graphic object is added to the tree structure by introducing a new cell to the previous layout. Thus, graphic object C is added to the sub-tree structure 524 shown in FIG. 12A by displacing the sub-tree structure 524 with a new interior H node 526 shown in FIG. 12B. The new interior H node 526 becomes the parent of a new leaf node 528 corresponding to the new cell C(2) and the sub-tree 524 that was displaced. Similarly, the graphic object D is added to the sub-tree structure 528 shown in FIG. 12B by displacing the sub-tree structure 528 with a new internal V node 530 shown in FIG. 12C. The new internal V node 530 becomes the parent of a new leaf node 532 corresponding to the new cell D(3) and the sub-tree 528 that was displaced. In the example illustrated in FIGS. 12A-12C, the selected sub-trees 524 and 528 that are displaced happened to be leaf nodes; in general, however, any sub-trees could have been selected, including sub-trees that are rooted at interior nodes. A sub-tree is defined as a node, designated as the sub-tree root, taken together with all the nodes that emanate from it. If the sub-tree root is an interior node, then the sub-tree includes both interior nodes and the terminal nodes that are its children.

As explained in detail below, the layout generator module 264 selects which cell is introduced into a previous layout by evaluating a collection of candidate relative layouts corresponding to all possible presentations of the new graphic object in each of the available new cell locations. Before each of the candidate relative layouts is evaluated, however, the coarse graphic object tree structures corresponding to the candidate relative layouts of multi-element graphic objects are expanded (or translated) into refined (or complete) tree structures whose leaves correspond to the individual constituent graphic objects of the graphic objects.

Figure 13A:
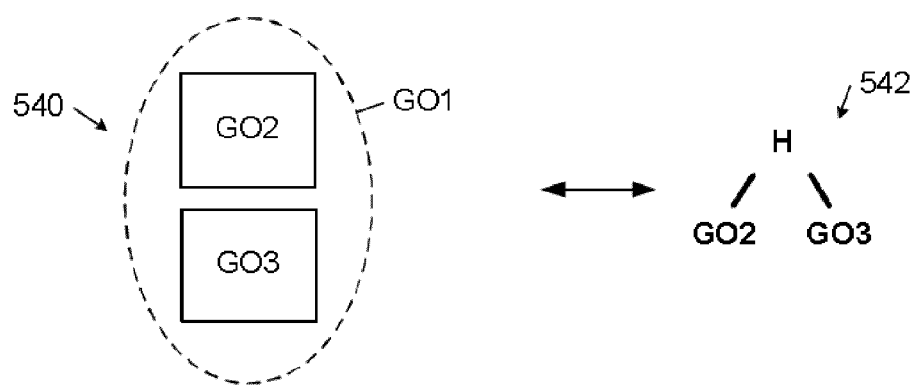
FIG. 13A is a diagrammatic view of a presentation of a first graphic object and a tree structure describing the presentation.
Figure 13B:
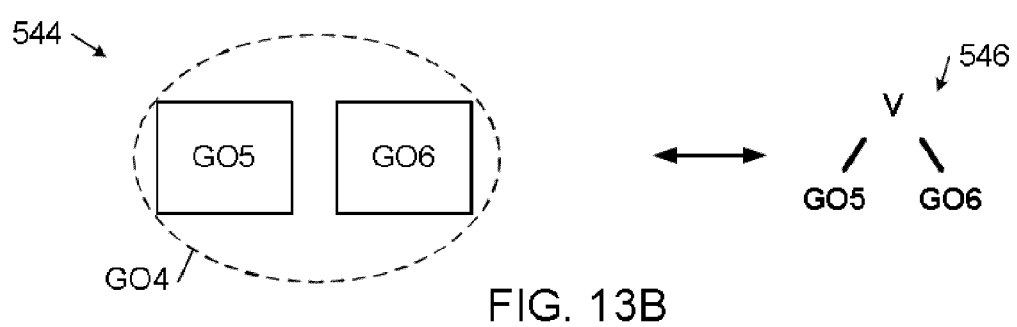
FIG. 13B is a diagrammatic view of a presentation of a second graphic object and a tree structure describing the presentation.
Figure 13C:
FIG. 13C is a diagrammatic view of a coarse tree structure containing leaf nodes corresponding to the first and second graphic objects shown in FIGS. 30A and 30B and a corresponding refined tree structure derived from the coarse tree structure.
Figure 13D:
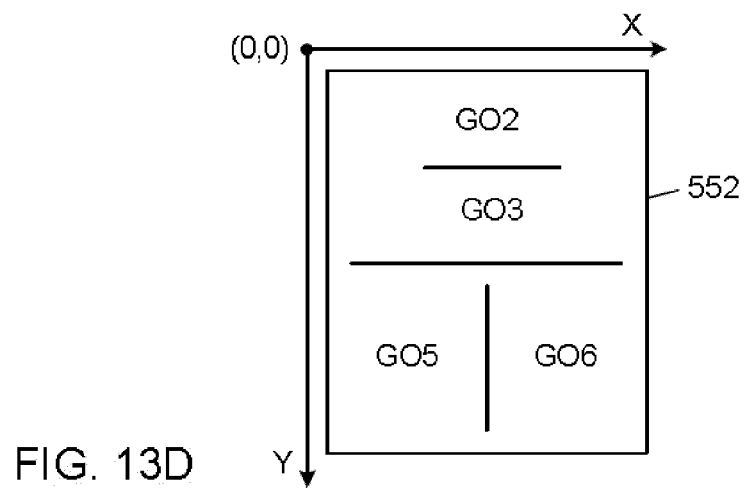
FIG. 13D is a relative layout of graphic objects on a page corresponding to the coarse and refined tree structures shown in FIG. 30C.

In one exemplary illustration, FIG. 13A shows one presentation of a graphic object 540 (GO1) and its corresponding tree structure 542. FIG. 13B shows one presentation of a graphic object 544 (GO4) and its corresponding tree structure 546. FIG. 13C shows a coarse tree structure 348 that consists of a horizontal root node and two terminal nodes corresponding to the graphic object presentations 540, 544 shown in FIGS. 12A and 12B. The coarse tree structure 548 is expanded into a refined tree structure 350 by substituting the tree structures 542, 546 for the terminal nodes representing the graphic object presentations 540, 544, as shown in FIG. 13C. FIG. 13D shows the resulting candidate relative layout corresponding to the refined tree structure 550 in a page 552.

2. Exemplary Process of Generating an Initial Arrangement of Graphic Objects

Figure 14A:
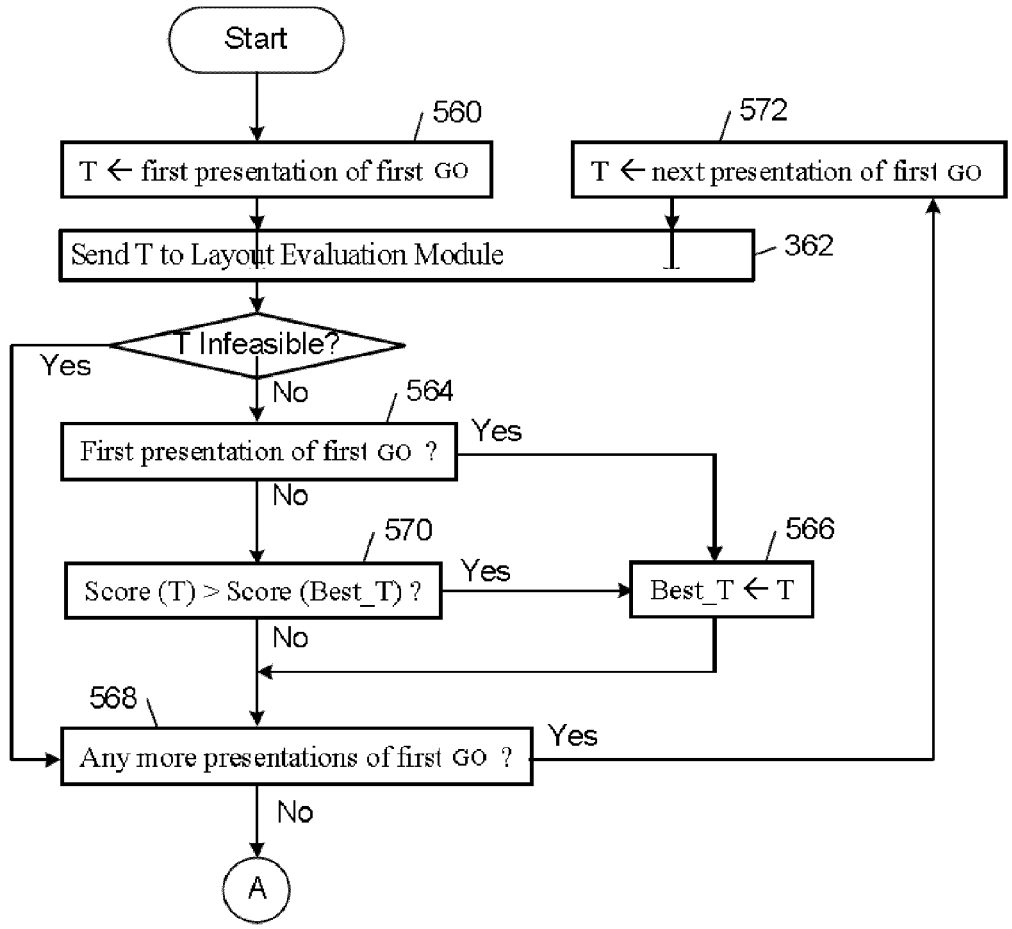
FIGS. 14A and 14B are respective flow diagrams of first and second portions of an embodiment of a method of generating a layout of graphic objects on a page.
Figure 14B:
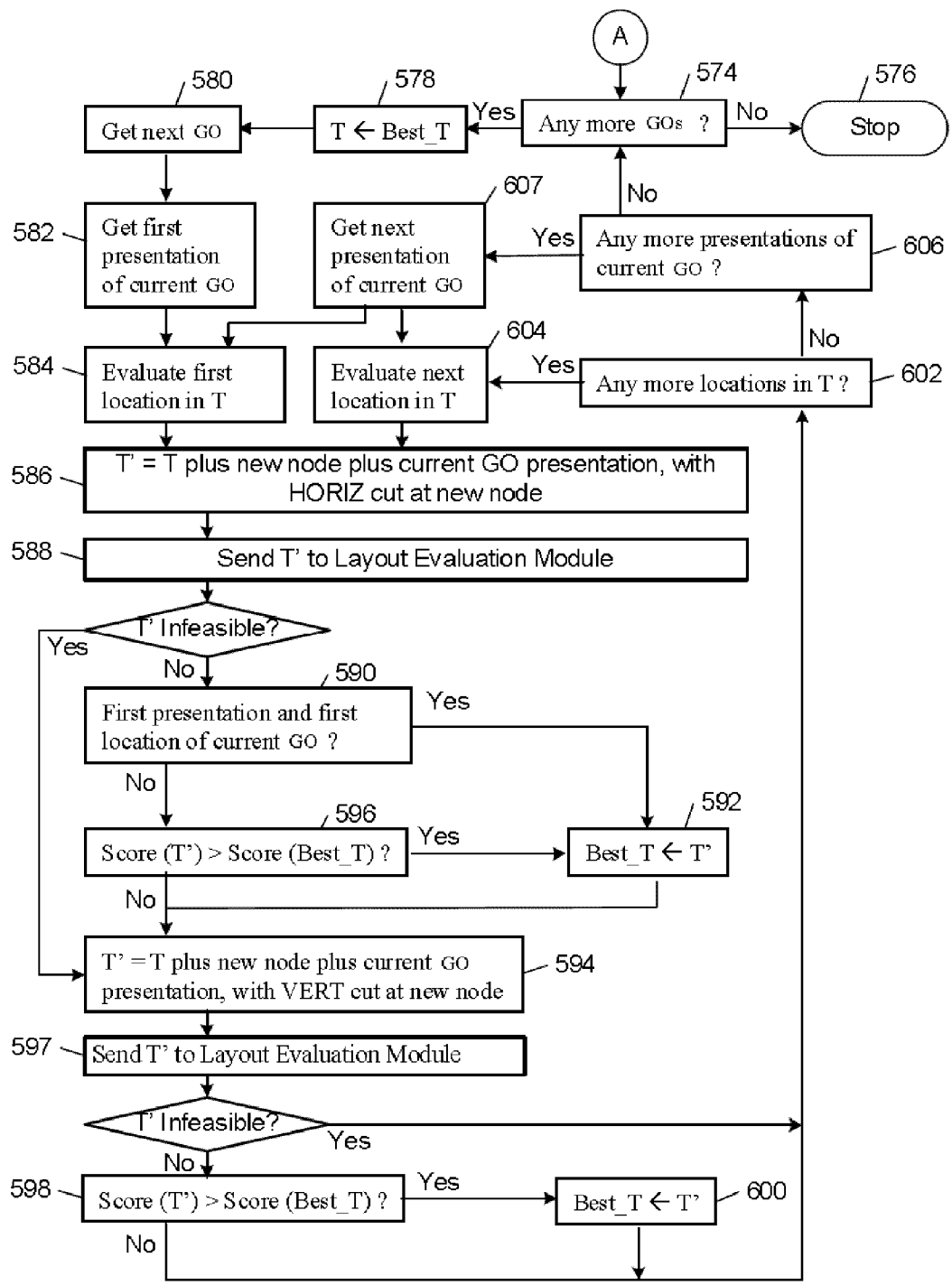

FIGS. 14A and 14B show an embodiment of an exemplary method by which the initial layout generator module 264 generates candidate relative layouts and selects one of the candidate relative layouts as the initial arrangement 80 of graphic objects on a page (see FIG. 4).

Block 560 initiates a current candidate layout T with a first presentation of the first graphic object (GO). Block 362 sends the current candidate layout T to the layout evaluation module 266 (see FIG. 4). As explained in detail above, the layout evaluation module 266 confirms the feasibility of the candidate relative layout, determines initial size dimensions for the graphic objects in the current candidate layout T, and computes a score Score(T) for the current candidate layout T based at least in part on the initial size dimensions.

If the layout evaluation module deems the candidate layout infeasible, the candidate layout is discarded and the process moves directly to block 568.

If the candidate layout is feasible, block 564 determines whether this is the first presentation of the first graphic object. If this is the first presentation of the first graphic object block 566 designates tree T as the current best layout, Best_T, and proceeds to block 568. If this is not the first presentation of the first graphic object, block 570 compares Score(T) to a score, Score(Best_T), for the layout corresponding to the best tree where scoring may be performed in the manner described above. If Score(T) is greater than Score(Best_T), block 566 designates the current candidate layout T as the new Best_T, and proceeds to block 568. If Score(T) is not greater than Score(Best_T), the best current candidate layout designation is not changed, and the process proceeds to block 568.

Block 568 determines whether any additional presentations of the first graphic object are available. If more presentations of the first graphic object are available, block 572 retrieves the next presentation of the first graphic object to form a new current candidate layout T and the process is repeated for the new current candidate layout. If block 568 determines that there are no additional presentations of the first graphic object, the process proceeds to block 574 in FIG. 14B.

Block 574 determines whether there are any more graphic objects to be added to the current candidate layout. If there are no more graphic objects to be added to the current candidate layout, the current Best_T is selected as the final layout from the initial arrangement generation process and the process terminates at block 576.

If block 574 determines there are additional graphic objects to be added to the current candidate layout, then block 578 designates the current best layout, Best_T, as the new current candidate layout T. Block 580 retrieves the next current graphic object. Block 582 retrieves (or determines) the first presentation of the current graphic object. Block 584 selects a first location in the current candidate layout T at which to evaluate the current graphic object presentation. The location may be either an internal node or an external node (i.e., leaf) of the current candidate layout T. At block 586, an alternative candidate layout T' is created by adding a new node at the first location. One child of the new node is the subtree of the current candidate layout T whose root is the location in T. The other child of the new node is the current presentation of the current graphic object being added to the layout. In the alternative current candidate layout T', a horizontal division is assigned to the new node.

Block 588 sends the alternative candidate layout T' to the layout evaluation module 266. As explained in detail above, the layout evaluation module 266 confirms the feasibility of the candidate relative layout, determines initial size dimensions for the graphic objects in the alternative candidate layout T', and computes a score Score(T') for the alternative candidate layout T' based at least in part on the initial size dimensions.

If the layout evaluation module deems the candidate layout infeasible, the candidate layout is discarded and the process moves directly to block 594.

If the candidate layout is feasible, block 590 determines if this is the first location and first presentation of the current graphic object. If this is the first location and first presentation of the current graphic object, block 592 designates the alternative candidate layout T' as the best current layout, Best_T, and proceeds to block 594. If this is not the first location and first presentation of the current graphic object, block 596 compares Score(T') with a score, Score(Best_T), for the layout corresponding to the best current layout where scoring may be performed in the manner described above. If Score (T') is greater than Score(Best_T), (indicating the alternative candidate layout T' is better than the current candidate layout T), then block 592 designates T' as the best current layout, Best_T, and the process proceeds to block 594. If Score(T') is less than or equal to Score(Best_T), the best current layout designation is not changed and operation proceeds to the same block 594.

At block 594, another alternative current layout T' is created by adding a new node in the place of the current location. One child of the new node is the subtree of T whose root is the location of T. The other child of the new node is the current presentation of the graphic object currently being added to the layout. In the alternative current layout T' of block 594, a vertical division is assigned to the new node.

Block 597 sends the alternative candidate layout T' to the layout evaluation module 266. The layout evaluation module 266 confirms the feasibility of the candidate relative layout, determines initial size dimensions for the graphic objects in the alternative candidate layout T', and computes a score Score(T') for the alternative candidate layout T' based at least in part on the initial size dimensions.

If the layout evaluation module deems the candidate layout infeasible, the candidate layout is discarded and the process moves directly to block 602.

If the candidate layout is feasible, block 598 determines a score, Score(T'), for the layout corresponding to the alternative candidate current layout T' and compares Score(T') with Score(Best_T). Blocks 570, 596, 598 may use the same or different scoring methods. If the Score(T') is greater than Score(Best_T), block 600 designates alternative current layout T' as the best current layout, Best_T, and the process proceeds to block 602. If block 598 determines the score of T' is not greater than the score of Best_T, the process proceeds directly to block 602.

Block 602 determines whether there are any additional locations available in the current candidate layout T. If additional locations are available in current candidate layout T, block 604 selects a new location in the current candidate layout T at which to evaluate the current graphic object presentation. Blocks 586 through 602 are repeated using the same current graphic object presentation.

When block 602 determines that no additional locations are available in the candidate layout T, the process proceeds to block 606. Block 606 determines whether there are any additional presentations of the current graphic object to consider. If additional presentations of the graphic object are available, the process proceeds to block 607, which retrieves the next presentation of the current graphic object. Block 584 selects the first location in the current candidate layout T at which to evaluate the current graphic object presentation. Blocks 586-604 evaluate the next presentation of the current graphic object T in each available location in the current candidate layout T.

When block 606 determines that there are no more presentations of the current graphic object to consider, the process proceeds to block 574, which determines if there are any additional graphic objects to be added to the current candidate layout. When block 574 determines there are no more graphic objects to be added to the current candidate layout, the current Best_T is selected as the final determinate layout and the process terminates at block 576.

E. Generating a Final Arrangement of Graphic Objects on a Page

As explained above, final layout generator module 270 receives tree structures representing page partitions from either the initial layout generator module 264 or the layout modification module 68, depending on whether or not the layout modification module 68 is included in the graphic object arrangement system 60. Each leaf node of a tree structure has an aspect ratio value (a) and, if a in the case of strict-area style layout, a nominal size value (e); and each interior node indicates either a horizontal or vertical division on the page. The final layout generator module 270 determines areas of the graphic objects on each page and then allocates a precise region of page space to each node. The allocated regions of the page are nested in the same ay as the corresponding tree structures. The allocated regions are referred to herein as "cells". In some implementations, once a cell is known, the position of a graphic object assigned to the cell is determined by centering the graphic object in the cell.

1. Determining Graphic Object Areas

The areas of the graphic objects are determined by either the bounding-box-based area determination method or the path-based area determination method or the linear-system-based area determination method, depending on the desired accuracy, the desired layout style and the available computing resources. In some cases, the final layout generator module 270 may use the graphic object areas calculated by the layout evaluation module 266 for the immediately preceding upstream layout module using one of the graphic object area determination methods described above. In other cases, the final layout generator module 270 may direct the layout evaluation module 266 to compute the graphic object areas using a different one of the graphic object area determination methods described above.

2. Determining Bounding Boxes Around the Nodes in the Tree Structure

After absolute areas are computed, bounding boxes are characterized around each node in the tree structure. The actual steps required to accomplish this process are perfectly analogous to the process for computing bounding boxes described above in connection with bounding-box-based area determination, as show in FIG. 10, with two exceptions. First, the nominal sizes happen to be actual graphic object areas. Second, the spacing assigned to interior nodes is not ignored, but rather added to the sums in the computations of blocks 492 and 496.

3. Allocating Page Space to Graphic Objects a. Overview of Page Space Allocation Process In some embodiments, the process of allocating regions of page space to nodes involves dividing a page into cells and positioning each graphic object in its respective cell. The page is divided into cells by splitting the page into rectangles, starting with the entire usable area of the page as the first rectangle. Each split is accomplished by drawing a line segment for a respective one of the interior nodes, starting at the root node in order of a breadth-first search.

In the case of an interior node corresponding to a vertical division, the final layout generator module 270 selects a horizontal position x along the width of the available region. In one formulation, $x \in (0,1)$, where $x=0$ represents the leftmost position and $x=1$ represents the rightmost position in the available region. In this case, $$x = \frac{\sqrt{e_l/a_l}}{\sqrt{e_l/a_l} + \sqrt{e_r/a_r}} \tag{28}$$

where $a_l$, $e_l$, and $a_r$, $e_r$ are the aspect ratios and areas of the bounding boxes for the left and right children of the interior node. This formulation makes direct use of widths as proportions. The analogous formula for a horizontal division uses the heights. That is, if the vertical position along the height of the available space is denoted $y \in (0,1)$, where $y=0$ represents the bottom position and $y=1$ represents the top position:

$$x = \frac{\sqrt{e_b a_b}}{\sqrt{e_b a_b} + \sqrt{e_t a_t}} \tag{29}$$

where $a_b$, $e_b$, and $a_t$, $e_t$ are the aspect ratios and areas of the bounding boxes for the bottom and top children of the interior node.

The resulting layouts of the graphic objects on the pages define the final layouts 290 of graphic objects shown in FIG. 4.

b. Detailed Process of Allocating Page Space to Graphic Objects

Figure 15:
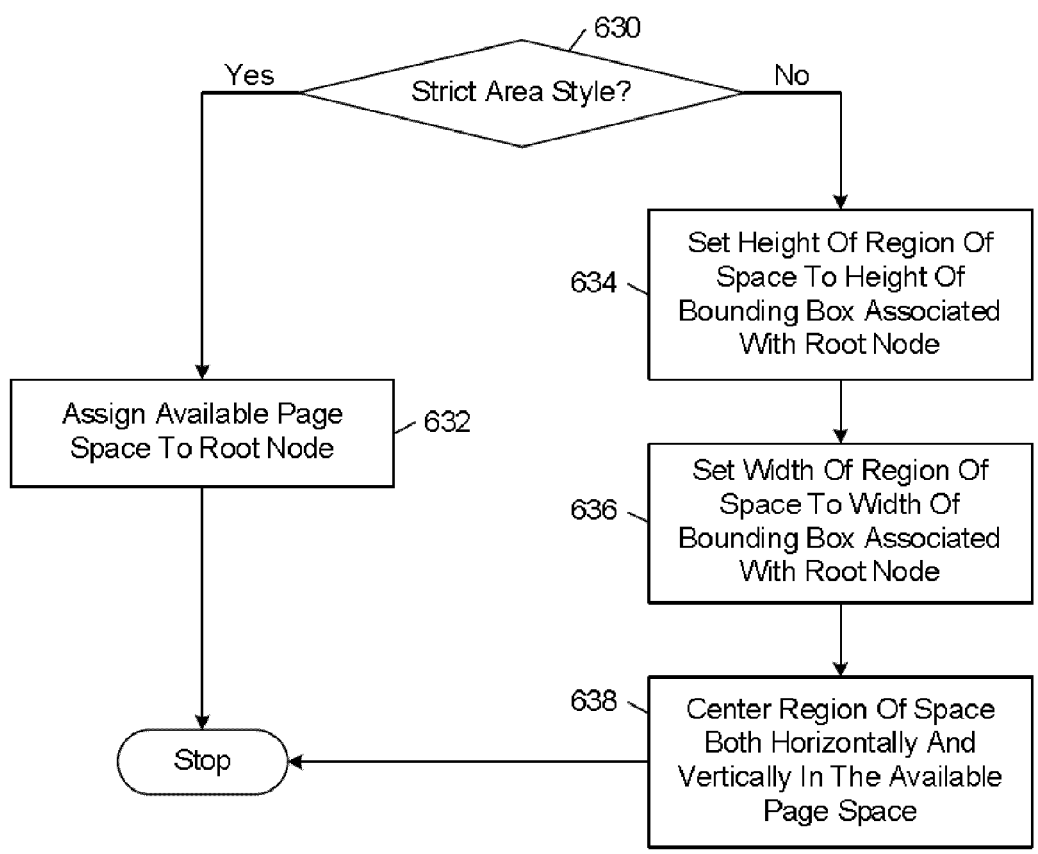
FIG. 15 is a flow diagram of an embodiment of a method of assigning a region of page space to a root node of a tree structure.

FIG. 15 shows an embodiment of a method of allocating a physical region of space on a page to the root node of the current tree structure. In accordance with this method, the layout style is determined (FIG. 15, block 630). For a strict area style layout, the entire usable area of the page is assigned to the root node (FIG. 15, block 632). For brick style layout, the page space assigned to the root node has the height and width of the bounding box associated with the root node (FIG. 15, blocks 634, 636). The region assigned to the root node then is centered in the available page space (FIG. 15, block 638).

Figure 16:
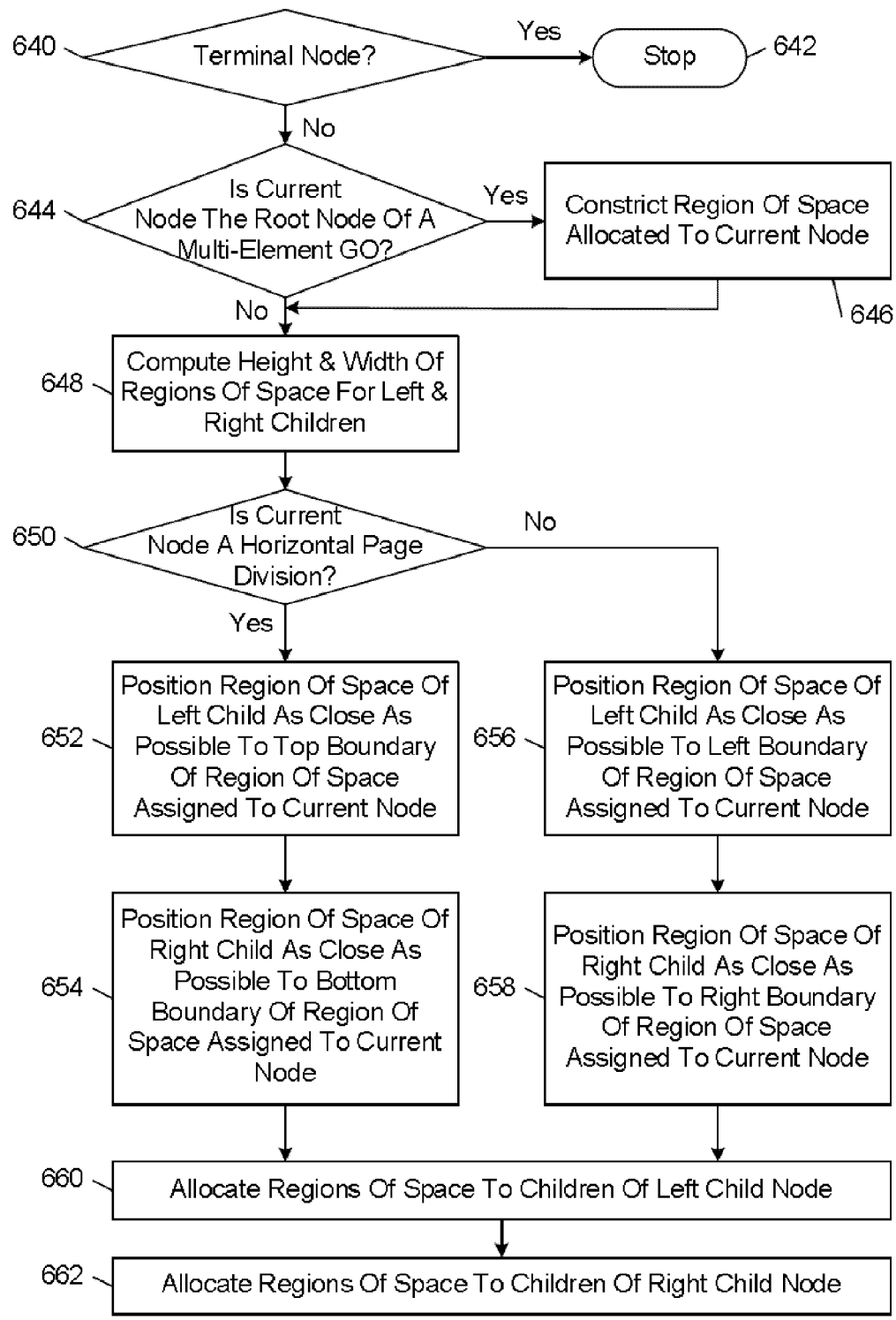
FIG. 16 is a flow diagram of an embodiment of a method of allocating regions of page space to children of a node of a tree structure.

FIG. 16 shows an embodiment of a method of allocating regions of page space to children of a node of a tree structure. In this process, the region of space assigned to each interior node is divided between its two direct children. The division is accomplished by setting the root node of the current tree structure to the current node and implementing a recursive process.

In the recursive process, a decision is made whether the current node is a terminal node (FIG. 16, block 640). If the current node is terminal node (i.e., a leaf node) the process ends (FIG. 16, block 642). If the current node is an interior node, a determination is made whether the current node is the root node of a tree corresponding to a multi-element graphic object (GO) having more than one single-element graphic object (FIG. 16, block 644). If this is the case, then the region assigned to the current node is constricted (FIG. 16, block 646) by reassigning the height and width of the region to be the height and width of the bounding box previously computed for the current node, and the position of the region is centered in the region previously assigned to the current node. In brick style layout this has no effect. In strict area style layout, this has the effect of pulling together the images in a graphic assembly having more than one graphic element (such as a series of keyframes).

If it is determined that the current node is not the root node of a tree corresponding to a multi-element graphic object (FIG. 16, block 644), the height and width of the regions of space for left children and right children of the current node are computed (FIG. 16, block 648).

If the current node is a horizontal page division, the heights ($H_R$, $H_L$) of the regions assigned to the right child and the left is given by:

$$H_R = R \cdot \frac{H_{NODE} - S}{L + R} \tag{30}$$

$$H_L = L \cdot \frac{H_{NODE} - S}{L + R} \tag{31}$$

where $H_{NODE}$ is the height of the current node region of space, S is the node spacing, L is the height of the left child node bounding box, and R is the height of the right child bounding box. The width of the regions assigned to the left and right children are set equal to the width of the region assigned to the current node.

If the current node is a vertical page division, the widths ($W_R$, $W_L$) of the regions assigned to the right child and the left is given by:

$$W_R = R \cdot \frac{W_{NODE} - S}{L + R} \tag{32}$$

$$W_L = L \cdot \frac{W_{NODE} - S}{L + R} \tag{33}$$

where $W_{NODE}$ is the width of the current node region of space. The height of the regions assigned to the left and right children are set equal to the height of the region assigned to the current node.

If the current node is a horizontal page division (FIG. 16, block 650), the region of space of the left child is positioned as close as possible to the top boundary of the region of space assigned to the current node (FIG. 16, block 652). The region of space of the right child is positioned as close as possible to the bottom boundary of the region of space assigned to the current node (FIG. 16, block 654).

If the current node is a vertical division (FIG. 16, block 650), the region of space of the left child is positioned as close as possible to the left boundary of the region of space assigned to the current node (FIG. 16, block 656). The region of space of the right child is positioned as close as possible to the right boundary of the region of space assigned to the current node (FIG. 16, block 658).

The process described above is repeated to allocate regions of space to children of the left child node (FIG. 16, block 660) and to children of the right child node (FIG. 16, block 662). The process is repeated iteratively until regions of page space are assigned to all children (direct or otherwise) of the current node.

4. Determining a Text Block Presentation

As explained above, the page layout generator module 64 determines a text block presentation corresponding to an arrangement of a block of text that has a text layout and target size dimensions that accommodate an output text rendering style (FIG. 2, block 32).

In some embodiments, the text processing module 16 determines a different respective column width for each presentation. For each presentation, the text processing module 16 passes the column width, the text block, and the output text rendering style to a standard text rendering function (e.g., the TextRenderer.MeasureText method provided in the Microsoft®.NET Framework 2.0) that returns the corresponding height dimension of presentation. The text processing module 16 passes the width and height dimensions of each text block presentation to the page layout generator module 14.

Figure 17:
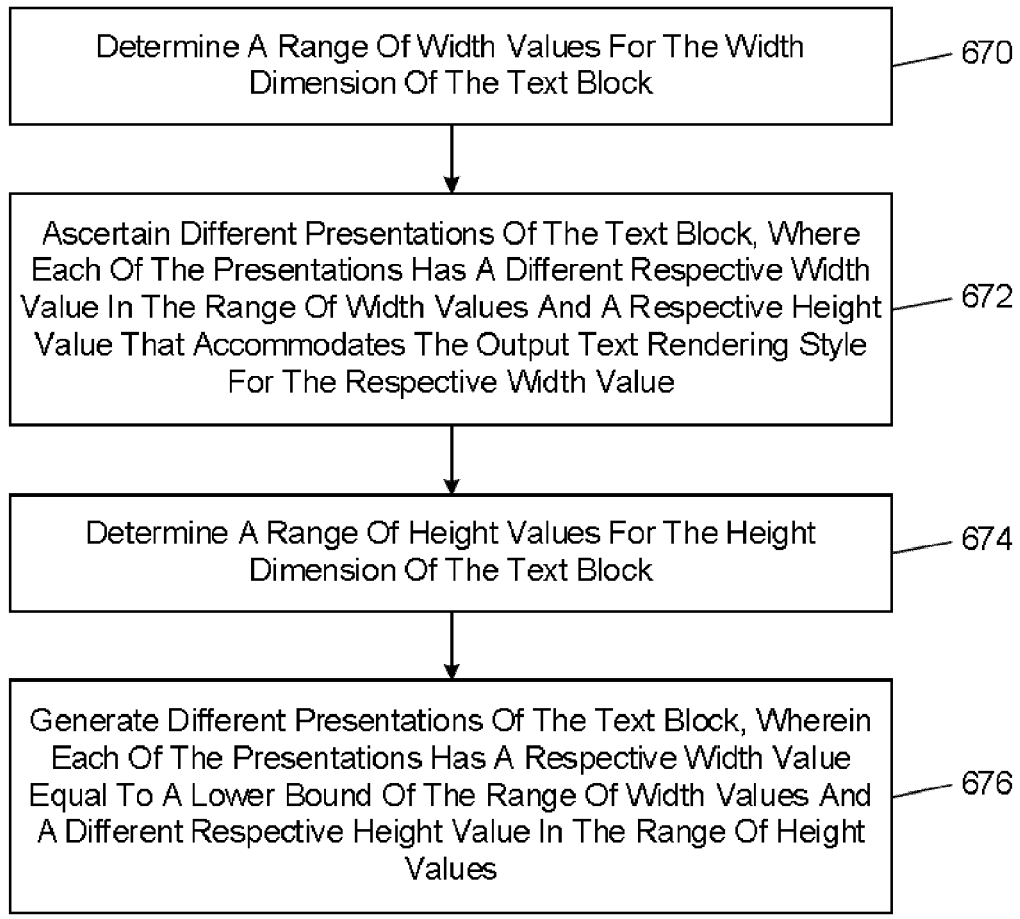
FIG. 17 is a flow diagram of an embodiment of a method of generating different presentations of a text block.

FIG. 17 shows an embodiment of a method by which the text process module 16 determines different presentations of a text block. In accordance with this method, the text process module 16 determines a range of width values for the width dimension of the text block (FIG. 17, block 670). The text process module 16 ascertains different presentations of the text block, where each of the presentations has a different respective width value in the range of width values and a respective height value that accommodates the output text rendering style for the respective width value (FIG. 17, block 672). The text process module 16 determines a range of height values for the height dimension of the text block (FIG. 17, block 674). The text process module 16 generates different presentations of the text block, wherein each of the presentations has a respective width value equal to a lower bound of the range of width values and a different respective height value in the range of height values (FIG. 17, block 676).

In some embodiments, the text processing module 16 generates different presentations (also referred to herein as "versions") for a text block by finely sampling all widths allowable within the page dimensions, and finding out what heights are needed to fit the text content for each width.

Other embodiments generate a limited number of versions (e.g., nine) that samples among the widest possible range of aspect ratios that result in reasonably shaped (defined below) text blocks that fit on the page, without having too many versions (which would slow down the layout generation process) or too few versions (which may result in suboptimal layout solutions). In these embodiments, the text processing module 16 determines maximum width and height values of the text block that are allowable on the page (Wmax and Hmax). These are usually the width and height of the layout area on the page. The text processing module 16 determines a minimum height value of text block (Hmin), which is the height of the rendered text when text block width is set at Wmax. A text rendering function (e.g., the TextRenderer.MeasureText method provided in the Microsoft®.NET Framework 2.0) may be used to determine the height of the rendered text.

The text processing module 16 determines a minimum width value of text block (Wmin), which is the narrowest width at which no single word is wrapped/broken, and the height needed to fit the content does not exceed Hmax. This value typically is determined by splitting the text into single words (words separated by space, line return, or hyphen), then measuring the rendered width of each word. The maximum rendered word length is the candidate Wmin value. Then, the height of the rendered text when its width is set at the candidate Wmin is measured. If this height≦Hmax, then this Wmin is returned. Otherwise, Wmin is increased gradually until the block height≦Hmax. Note that for some Asian languages with block-characters (e.g. Chinese, Japanese, Korean), words can be wrapped between any neighboring Unicode characters, hence Wmin is the width of a single rendered character in these cases.

The text processing module 16 determines a minimum "good" width (or "lower bound") of text block (Wgood). This is a number between Wmin and Wmax. This is the width at which the text block still looks "good", somewhat arbitrarily defined as having either the smallest area (width×height) or the smallest circumference (shaped close to a square). We find this value by gradually reducing the width of the text block from Wmax toward Wmin. If both area (width×height) and circumference (w+h) starts to increase, we stop and choose the text block width at this stage to be Wgood. This will be the actual minimum width used when we generate the different versions. The use of Wgood prevents having text rendered too narrowly, while still allows very short word phrases or poems to be rendered without excessive horizontal space.

The text processing module 16 generates versions of the text block by sampling between Wgood and Wmax, which produces a different respective aspect ratio for each version. To generate $n_1$ number of versions in this manner, the text processing module 16 samples with equal ratios between each level of width to get the different widths. The i-th width value, where i varies from 0 to $n_1-1$, is calculated as:

$$W_i = W_{max} \cdot \left(\frac{W_{good}}{W_{max}}\right)^{i/(n_1-1)} \quad (34)$$

$$H_i = \text{(measured text height, given } W_i\text{, from text rendering function)} \quad (35)$$

In most cases the versions generated this way make a satisfactory input to BRIC. However, for very small amount of text content, such as a single word, the height of rendered text will never exceed one line even at the minimum text block width. This means all versions will be variations of "flat wide" shapes, without any "thin tall" versions. The lack of variety in versions reduces the flexibility given to BRIC to find a most efficient layout. Therefore, in addition to the versions generated using this sampling method, the text processing module 16 also generates additional $n_2$ versions that are forced to be long and tall, even if the heights exceed rendered text height. Here the width of the text is fixed at Wgood, and the text processing module 16 samples evenly on the ratios between Hmax and Hgood, which is the height of rendered text at minimum allowed text width Wgood, to get the height $H_j$ ($0 \leq j \leq n_2-1$) of additional versions:

$$W_j = Wgood \quad (36)$$

$$H_j = H_{max} \cdot \left(\frac{H_{good}}{H_{max}}\right)^{j/(n_2-1)} \quad (37)$$

The $n_1$ normal versions and $n_2$ tall versions are compiled together for a total of $n_1+n_2$ versions for the fixed_dimension text object.

The number of "tall" versions to generate might vary depend on the amount of text as well as the format of the text in the text block. For example, for a long paragraph of text, or a poem of many lines, the minimum height might already be near the full height of the layout area, and thus the "normal" versions will cover both wide versions and tall versions, and there is no need to generate many additional tall versions. To use the total number of versions for each fixed_dimension object most efficiently, the $n_1$ and $n_2$ values typically are set such that the combined versions sample evenly between the total aspect ratio range from Hmax/Wgood to Hmin/Wmax. In some embodiment, n is the total number of versions we wish to generate, and the number of "normal" versions $n_1$ is calculated as:

$$n_1 = \log \cdot \left( \frac{H_{good}}{H_{min}} \cdot \frac{W_{max}}{W_{good}} \right) \bigg/ \log \cdot \left( \frac{H_{max}}{H_{min}} \cdot \frac{W_{max}}{W_{good}} \right) \cdot (n-1) + 1 \quad (38)$$

The number of tall versions to generate is $n_2 = n - n_1$. In this way, any number of versions to generate can be specified, and the text processing module 16 follows the procedures outlined above to get exactly that number of versions, and cover all aspect ratios, while sampling the range of aspect ratios roughly evenly.

5. Modifying the Candidate Layout in Order to Accommodate Size Dimensions of a Selected Graphic Object As explained above, in response to a determination that the target size dimensions are not accommodated by the size dimensions of the frame of the text block presentation, the page layout generator module 64 modifies the candidate layout (see FIG. 2, block 42). This process involves changing the size dimensions of the frame of the text block presentation to accommodate the target size dimensions and adjusting the size dimensions of the other frames in the candidate layout based on the changed size dimensions of the frame of the text block presentation (see FIG. 2, block 42).

Figure 18:
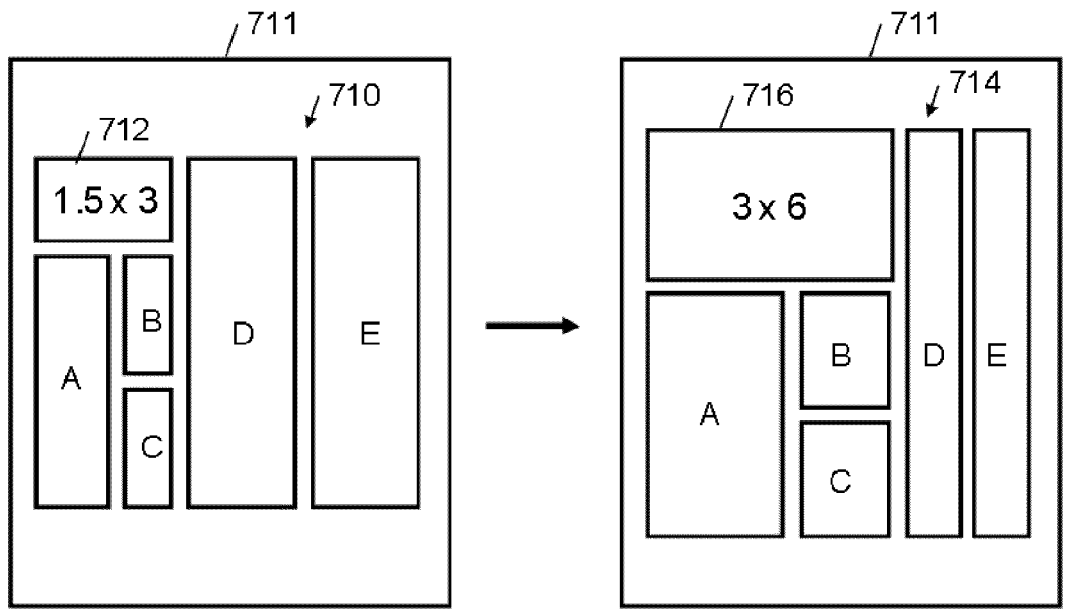
FIG. 18 is a diagrammatic view of a candidate layout of graphic objects on a page and a modified version of the candidate layout.

FIG. 18 shows an example of a candidate layout 710 on a page 711 that is generated by the page layout generator module 64 for a collection of five image-based graphic objects (A, B, C, D, E) and one text block that has a presentation 712 with target dimensions of 3 inches high by 6 inches wide. As shown in FIG. 18, the frame of the text block presentation 712 is 1.5 inches high by 3 inches wide, which cannot accommodate the target dimensions of the text block presentation. It is noted that in the illustrated embodiment the layout 710 fills the page 711 in the horizontal direction but not in the vertical direction.

FIG. 18 also shows an example of a modified version 714 of the candidate layout 710 in which the dimensions of the frame of the text block presentation have been increased to accommodate the target dimensions of the text block presentation 712 (while preserving the aspect ratio of the text block presentation 712) and the aspect ratios of the views of the other graphic objects have been modified to accommodate the changed size dimensions of the frame of the text block presentation 712. In the modified layout 714, the dimensions of the frame of the text block presentation 716 are 3 inches high by 6 inches wide. The modified layout 714 is computed using the BRIC layout generation method described above using a different set of input aspect ratios for the other graphic objects. These aspect ratios are determined so that when BRIC layout generation method is executed, the dimensions of the frame of the text block presentation 716 in the layout 714 match the target size dimensions, in addition to the other constraints of prescribed aspect ratios and object spacing. In this example, all the other graphic objects have had their aspect ratios changed and dimensions of the principal bounding box of the layout 710 has increased in height. This increase in height is exactly the height increase dictated for the frame of the text block presentation 712. The width of the principal bounding box of the layout 710 has not changed.

In some embodiments, a selected graphic object (e.g., a text block presentation) can be made larger or smaller in the context of a layout by manipulating the aspect ratios of all the other photos. To invoke the method for changing the size of a graphic object, the page layout generator module is supplied with an identifier for the selected photo and a positive side-length factor. A side-length factor greater (less) than one indicates growing (shrinking) the selected graphic object. Since the side-length factor is applied to the height and width of the selected graphic object, the aspect ratio of the selected graphic object is preserved in this operation. This process involves determining target dimensions for the selected graphic object by multiplying the current height and width of the graphic object by the side-length factor. The changes to the dimensions of the selected graphic object then are translated into target dimensions for the root bounding box. Once target dimensions are known for both the selected graphic object and the root bounding box, new heights and widths for all the remaining photos are determined such that the target dimensions for both selected graphic object and root bounding box will be realized upon reflow. For example, in the case of growing the selected photo, if aspect ratio is defined as height/width then photos separated from the selected photo by a horizontal (vertical) partition will have their aspect ratios reduced (increased).

Figure 19:
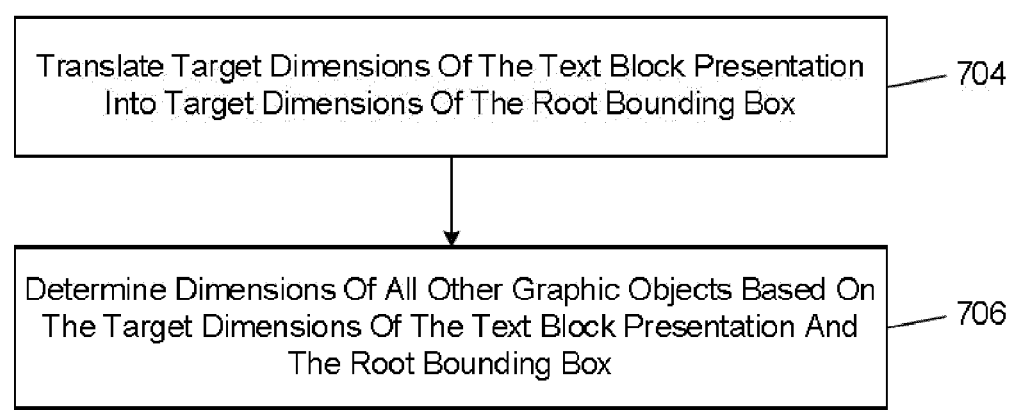
FIG. 19 is a flow diagram of an embodiment of a method of modifying a candidate layout.

FIG. 19 shows an exemplary embodiment of a method of changing the size dimensions of the frame of the text block presentation to accommodate the target size dimensions and adjusting the size dimensions of the other frames in the candidate layout. In accordance with the method of FIG. 19, the page layout generator module 64 translates the target dimensions of the text block presentation into target dimensions of the root bounding box (FIG. 19, block 704). The page layout generator module 64 then determines the dimensions of all other graphic objects based on the target dimensions of the text block presentation and the root bounding box (FIG. 19, block 706).

Figure 20:
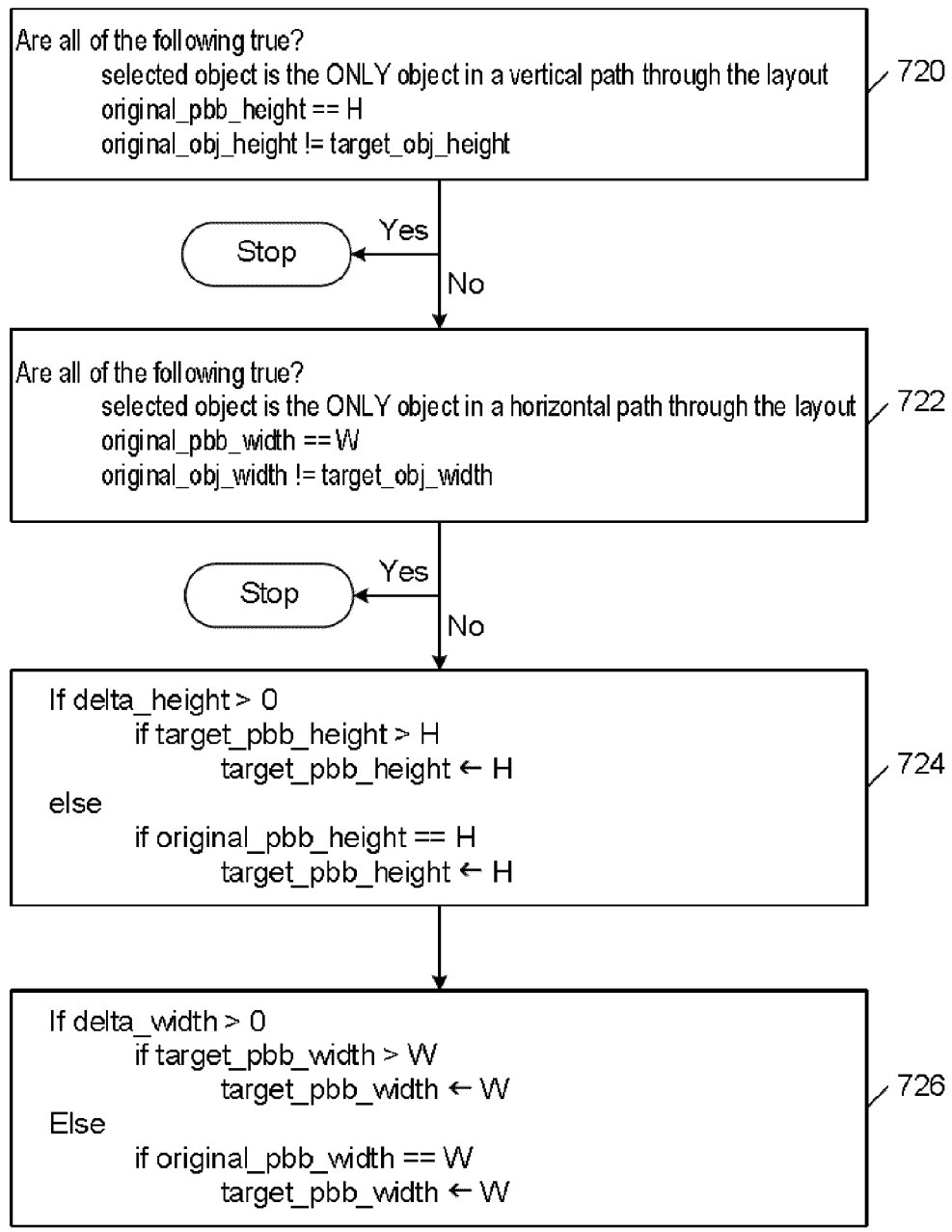
FIG. 20 is a flow diagram of an embodiment of a method of determining target dimensions of a principal bounding box.

FIG. 20 shows an embodiment of a method of translating the target dimensions of the text block presentation to the target dimensions of the root bounding box (FIG. 18, block 704). In the illustrated embodiment:
- the "original_obj_height" is the height of the text block presentation;
- the "original_obj_width" is the width of the text block presentation;
- the "target_obj_height" is the target height of the text block presentation;
- the "target_obj_width" is the target width of the text block presentation;
- the "original_pbb_height" is the height of the principal bounding box;
- the "original_pbb_width" is the width of the principal bounding box;
- "H" is the height of the usable area or canvas;
- "W" is the width of the usable area or canvas;
- delta_height=target_obj_height−original_obj_height;
- delta_width=target_obj_width−original_obj_width;
- target_pbb_height=original_pbb_height+delta_height; and
- target_pbb_width=original_pbb_width+delta_width.

In accordance with the embodiment of FIG. 20, if all of the following conditions are true, then the process terminates (FIG. 20, block 720):
- the text block presentation is the only object in a vertical path through the layout;
- the original_pbb_height equals H; and
- the original_obj_height does not equal the target_obj_height.

In this case, the text block is already as tall as it can be on the canvas, so increasing its height any more is impossible.

Similarly, if all of the following conditions are true, then the process terminates (FIG. 20, block 720):
- the text block presentation is the only object in a horizontal path through the layout;
- the original_pbb_width equals W; and the original_obj_width does not equal the target_obj_width.

In this case, the text block is already as wide as it can be on the canvas, so increasing its width any more is impossible.

If delta_height is greater than zero and the target_pbb_height is greater than the page height H, then the target pbb_height is set equal to H; else if the original_pbb_height equals the page height H, the target_pbb_height is set equal to H (FIG. 20, block 724). Similarly, if delta_width is greater than zero and the target_pbb_width is greater than the page width W, then the target pbb_width is set equal to W; else if the original_pbb_width equals the page width W, the target_pbb_width is set equal to W (FIG. 20, block 726).

Figure 21:
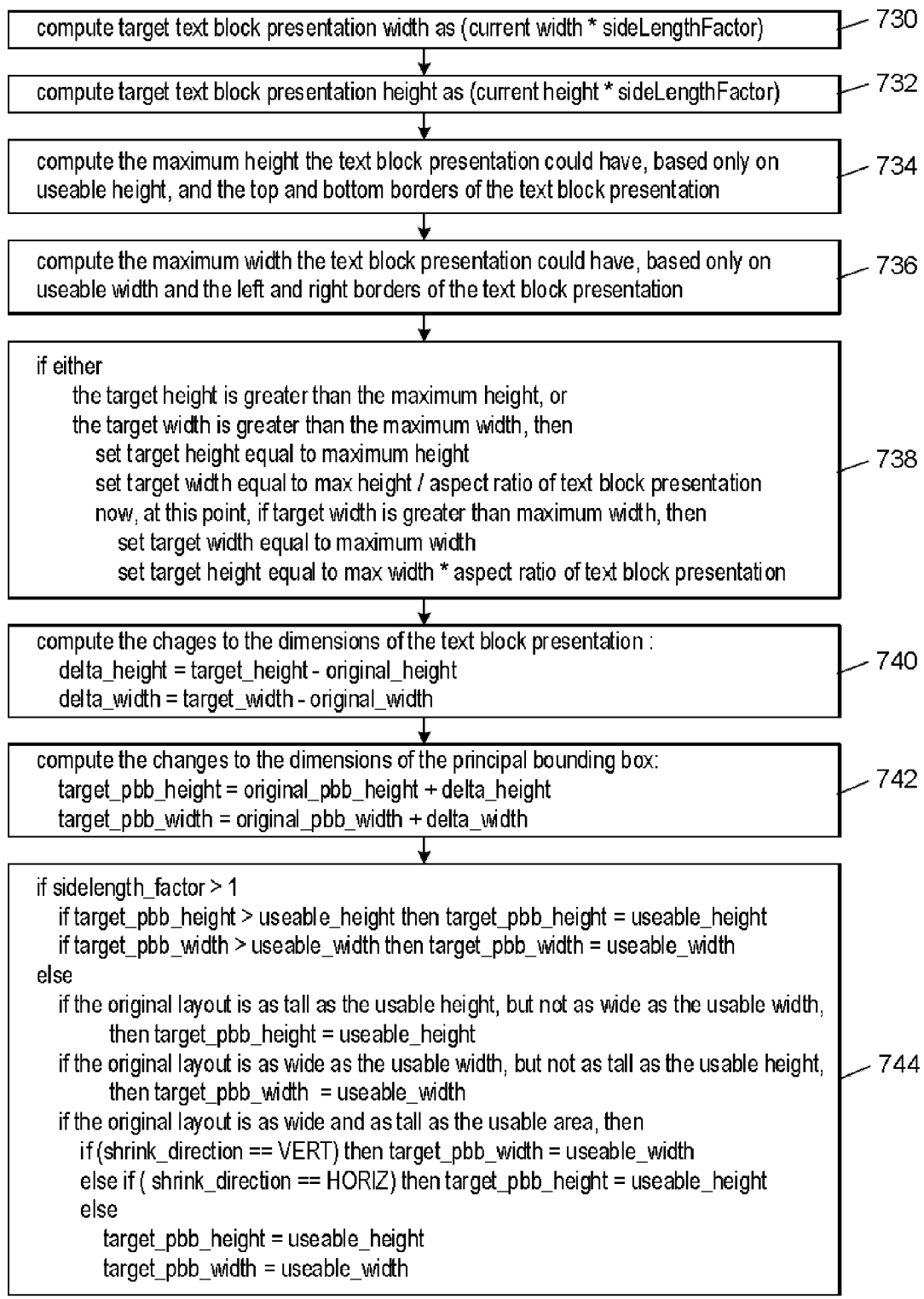
FIG. 21 is a flow diagram of an embodiment of the method of determining target dimensions of a principal bounding box.

FIG. 21 shows an embodiment of the method of FIG. 20 for translating the target dimensions of the text block presentation to the target dimensions of the root bounding box (FIG. 1818, block 704).

In accordance with the method of FIG. 21, the page layout generator module computes the target text block presentation width (target_width) as the product of the current width of the text block presentation and the sideLenthFactor (FIG. 21, block 730). The page layout generator module also computes the target text block presentation height (target_height) as the product of the current height of the text block presentation and the sideLenthFactor (FIG. 21, block 732).

The page layout generator module computes the maximum height that the text block presentation could have, based only on the usable height on the page and the top and bottom borders of the text block presentation (FIG. 21 block 734). The page layout generator module also computes the maximum width that the text block presentation could have, based only on the usable width on the page and the left and right borders of the text block presentation (FIG. 21, block 736).

If either (i) the target height is greater than the maximum height or (ii) the target width is greater than the maximum width: then the page layout generator module sets the target height equal to maximum height and sets the target width equal to maximum height divided by the aspect ratio of text block presentation; and if target width is greater than maximum width, then the page layout generator module sets the target width equal to maximum width and sets the target height equal to the product of the maximum width and the aspect ratio of text block presentation (FIG. 21, block 738).

The page layout generator module computes the changes to the dimensions of the text block presentation as follows (FIG. 21, block 740):

$$\text{delta\_height} = \text{target\_height} - \text{original\_height} \quad (39)$$

$$\text{delta\_width} = \text{target\_width} - \text{original\_width} \quad (40)$$

The page layout generator module computes the changes to the dimensions of the principal bounding box as follows (FIG. 21, block 742):

$$\text{target\_pbb\_height} = \text{original\_pbb\_height} + \text{delta\_height} \quad (41)$$

$$\text{target\_pbb\_width} = \text{original\_pbb\_width} + \text{delta\_width} \quad (42)$$

The page layout generator module then determines the target dimensions of the principal bounding box as shown in block 744 of FIG. 21. In this process, if the sidelength_factor>1 and the target_pbb_height>useable_height, then the page layout generator module sets the target_pbb_height equal to the useable_height. If the sidelength_factor>1 and the target_pbb_width>useable_width, then the page layout generator module sets the target_pbb_width equal to the useable_width.

Otherwise the sideLength Factor≦1. In this case, the following three cases are considered. Case 1: If the original_pbb_height equals the usable height, but original_pbb_width is less than the usable width, the page layout generator module sets the target_pbb_height equal to the useable_height. Case 2: if original_pbb_width is equal to the usable width, but original_pbb_height is less than the usable height, then the page layout generator module sets the target_pbb_width equal to the useable_width. Case 3: if the original_pbb_width and original_pbb_height equal the usable width and height respectively, then we resort to a design parameter called shrink_direction, which can have one of three values: VERT, HORIZ, or NEITHER. If (shrink_direction==VERT) then the page layout generator module sets target_pbb_width equal to the useable_width; else if (shrink_direction==HORIZ) then the page layout generator module sets the target_pbb_height equal to the useable_height; else the page layout generator module sets the target_pbb_height equal to the useable_height and sets the target_pbb_width equal to the useable_width.

At this point the page layout generator module has determined the target dimensions for the text block presentation and the principal bounding box; now it only remains to determine target dimensions for all the other graphic objects. The slicing structure framework described above in connection with brick style layouts is especially convenient in the process of determining the dimensions of the other graphic objects because it allows the process of determining new heights for the graphic objects to be separated from the process of determining new widths for the graphic objects. These two steps of determining are identical; for illustrative purposes, the following description focuses on determining heights.

In the illustrated embodiments, the page layout generator module determines new heights for the graphic objects in such a way that no single graphic object height shrinks or grows disproportionately compared to those of the other graphic objects. For example, the page layout generator module avoids the situation in which a single graphic object frame takes up all the required expanding or contracting; instead, the page layout generator module ensures that all the graphic objects are adjusted to absorb the required adjustments. In these embodiments, the heights of the graphic objects in the current layout are used as proportions for determining the heights of the photos in the adjusted layout. The selected graphic object is treated as a fixed distance since its target dimensions are already known. The actual mechanism for solving for the heights subject to the proportions of the current heights is to construct a system of N−1 linear equations in N−1 unknowns, where the variables are the adjusted graphic object heights. Here, N is the number of graphic objects including the selected graphic object.

The process begins by constructing a lookup table with the nodes of the tree in one column, and a vertical path through the corresponding bounding box in the other column. This is accomplished by submitting the root node of the tree to the recursion shown in FIG. 22A. Next, a system of (N−1) linear constraints in (N−1) unknowns is constructed, where the variables are the target heights of the non-selected objects. This system can be expressed as $B*h'=y$, where B is a matrix of dimensions (N−1)×(N−1), h' is a vector of the target heights of non-selected objects (h without a prime superscript denotes heights in the current layout), and y is a vector of dimension (N−1). An embodiment of a method of building this system of equations is described below in connection with FIG. 22B. The heights of the non-selected objects then are computed by evaluating $h'=inv(B)*y$.

In the following embodiments, the path_direction is the direction of the paths to be determined. In particular, the path_direction is horizontal if determining graphic object widths, whereas the path_direction is vertical if determining graphic object heights. The selected graphic object is the text block frame whose size needs to be adjusted in order to accommodate the target text block size.

Figure 22A:
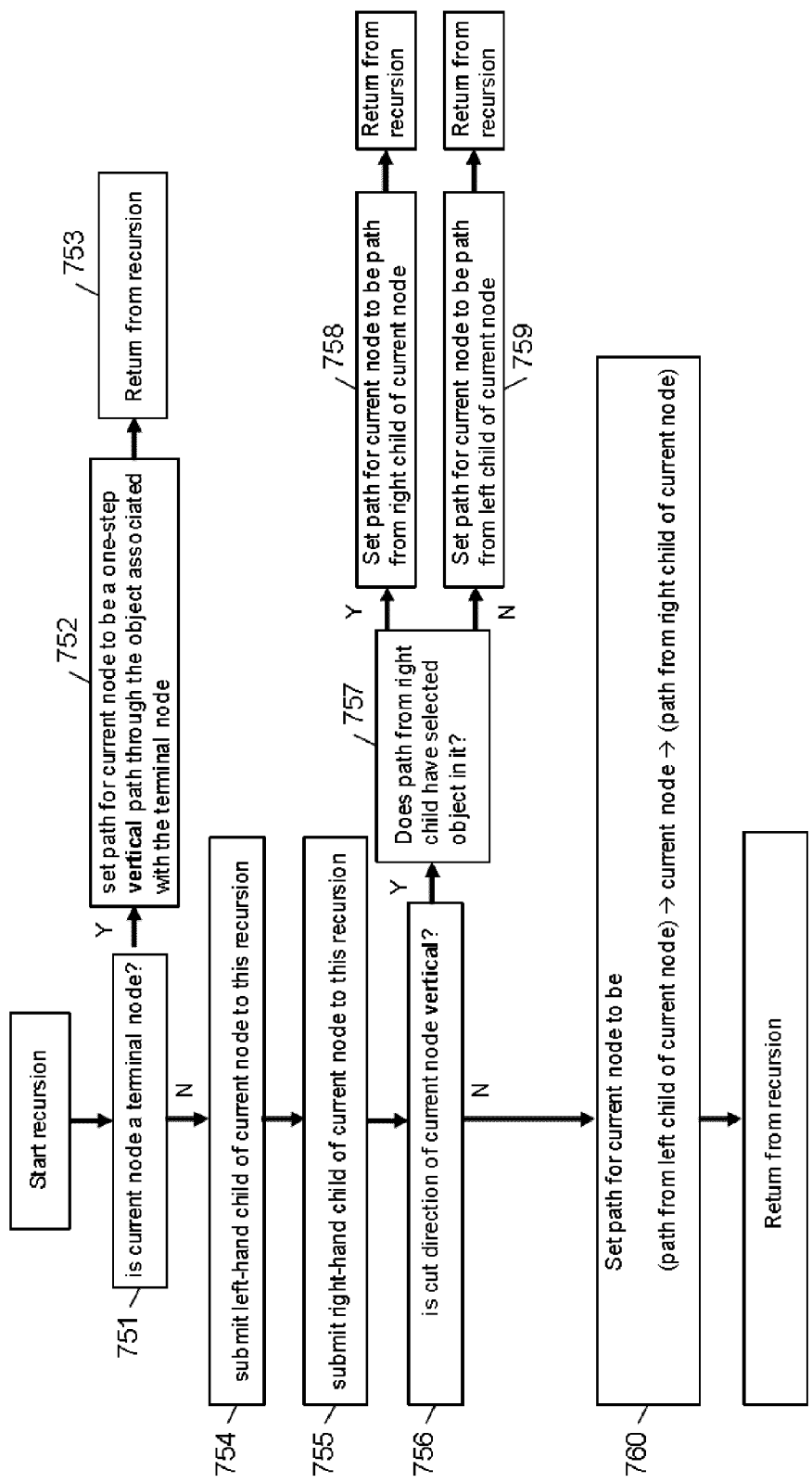
FIG. 22A is a flow diagram of an embodiment of a method of constructing a lookup table in a process of determining dimensions of graphic objects based on the target dimensions of a text block presentation.

In accordance with the recursive method of FIG. 22A, if the current node is a terminal node (FIG. 22A, block 751), the page layout generator module sets Path to equal currentNode; adds the pair (currentNode, Path) as a new row in the lookup table (FIG. 22A, block 752); and returns (FIG. 22A, block 753). Otherwise, the page layout generator module submits the left child of the current node to the recursion of FIG. 22A (FIG. 22A, block 754). The page layout generator module then submits the right child of the current node to the recursion of FIG. 22A (FIG. 22A, block 755). If the cut direction of the current node is parallel to the path_direction (FIG. 22A, block 756): if path from right child has the selected graphic object in it (FIG. 22A, block 757), then the page layout generator module sets the Path to equal the right path (FIG. 22A, block 758); otherwise, the page layout generator module sets Path to equal the left path (FIG. 22A, block 759). If the cut direction of the current node is not parallel to the path_direction (FIG. 22A, block 756), the page layout generator module sets Path to equal to [(path for left child), current node, (path for right child)] (FIG. 22A, block 760). The page layout generator module adds the pair (currentNode, Path) as a new row in the lookup table and returns.

Figure 22B:
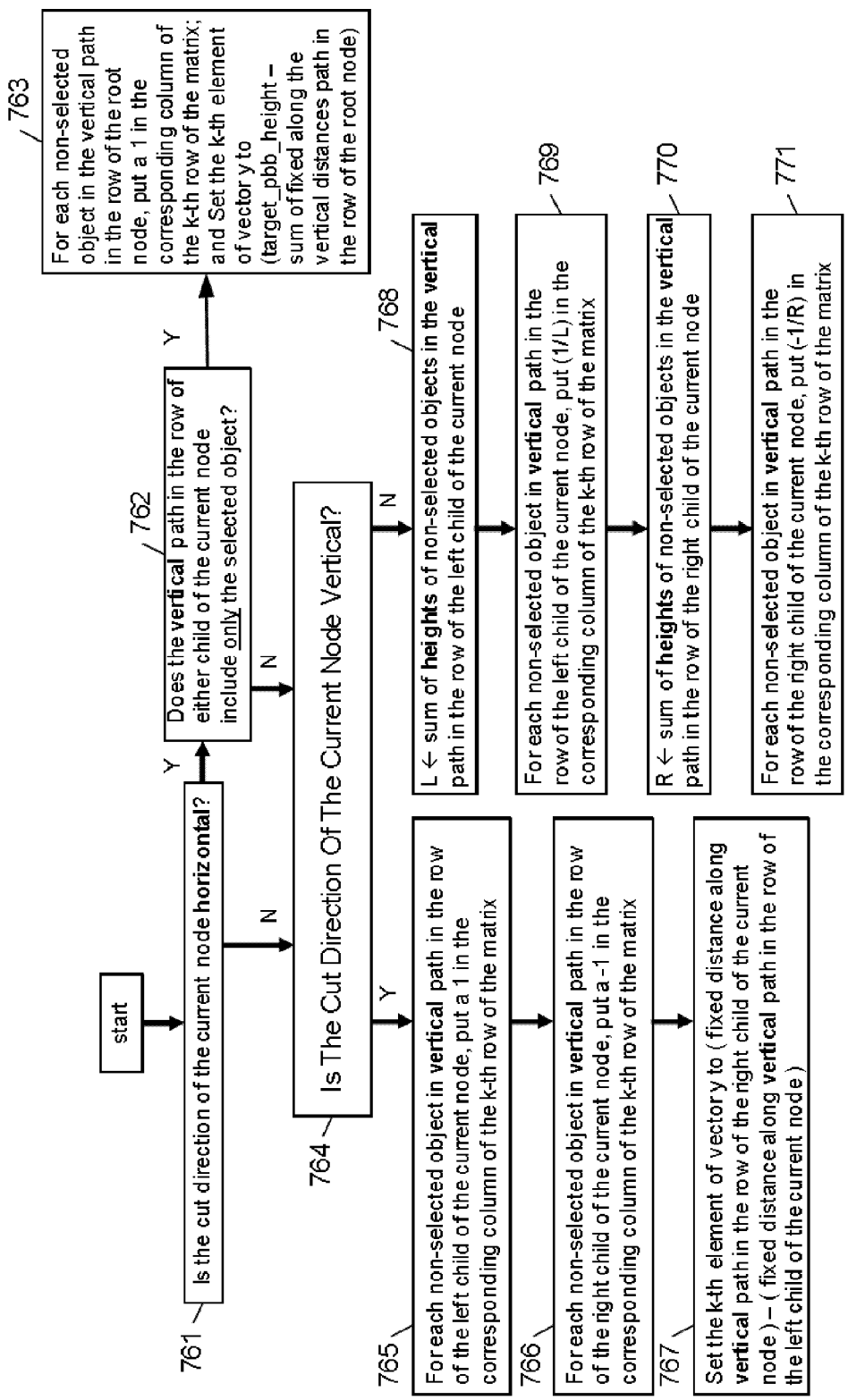
FIG. 22B is a flow diagram of an embodiment of a method of generating coefficients for a row of a matrix-vector equation in a process of determining dimensions of graphic objects based on the target dimensions of a text block presentation.

FIG. 22B shows an embodiment by which the page layout generator module adds a row to the matrix-vector equation B*h'=y described above. To begin, the matrix of dimensions (N−1)×(N−1) and vector of dimensions (N−1) typically is initialized to zero. For a tree with N terminal nodes, there are (N−1) interior nodes, so running through the process of FIG. 22B once for each interior node is sufficient to fill completely the matrix-vector equation. For the purpose of this description each interior node is associated with a unique number between 1 and (N−1) inclusive. Thus, the process of FIG. 22B is executed once for each value of k in $\{1, 2, \ldots, N-1\}$.

For the k-th interior node, the node is designated to be currentNode, and the following operations are performed: the row corresponding to currentNode is retrieved from the table; and the rows corresponding to the right- and left-hand children of currentNode are retrieved from the table.

If path_direction is perpendicular to the cut direction of the current node (FIG. 22B, block 761) and if the path of one child node only includes the selected graphic object (FIG. 22B, block 762), then the page layout generator module makes a constraint from the path corresponding to the root node (such that the path length=target principal bounding box dimension) (FIG. 22B, block 763). In this process, for each graphic object in the path corresponding to the root node (not including the selected graphic object), the page layout generator module puts a 1 in the corresponding column of the k-th row of B, and sets the k-th element of vector y to equal (target principal bounding box dimension−fixed distance in path).

Otherwise, either the path direction equals the cut direction of the current node, or the directions are perpendicular but the paths of the child nodes both contain at least one non-selected object. If path_direction is equal to the cut direction of the current node (FIG. 22B, block 764): for each graphic object in the path from the left child (not including the selected graphic object), the page layout generator module puts a 1 in the corresponding column in the k-th row of B (FIG. 22B, block 765); for each graphic object in the path from the right child (not including the selected photo), the page layout generator module puts a −1 in the corresponding column in the k-th row of B (FIG. 22B, block 766); and the page layout generator module sets the k_th element of vector y to equal (fixed distance in path from right child)−(fixed distance in path from left child) (FIG. 22B, block 767). If path_direction is not equal to the cut direction of the current node (FIG. 22B, block 764): the page layout generator module sets L to equal to the sum of the dimensions of graphic objects in the path from left child (not including the selected graphic object) (FIG. 22B, block 768); for each non-selected graphic object in the path from the left child, the page layout generator module puts a (1/L) in the corresponding column in the k-th row of B (FIG. 22B, block 769); the page layout generator module sets R_to equal the sum of the dimensions of photos in path from right child (not including the selected photo) (FIG. 22B, block 770); and for each non-selected graphic object in the path from the right child, the page layout generator module puts a (−1/R) in the corresponding column in the k-th row of B (FIG. 22B, block 771).

The page layout generator module then solves for the constraint variables in order to determine the target dimensions of the other graphic objects in the layout that accommodate the changes to the dimensions of the selected graphic object (e.g., a selected one of the text block presentations in the layout). The page layout generator module can use any of a wide variety of linear algebraic techniques for solving this system of N−1 linear equations in N−1 unknowns.

V. EXEMPLARY EMBODIMENTS OF THE USER INTERFACE MODULE

Figure 23:
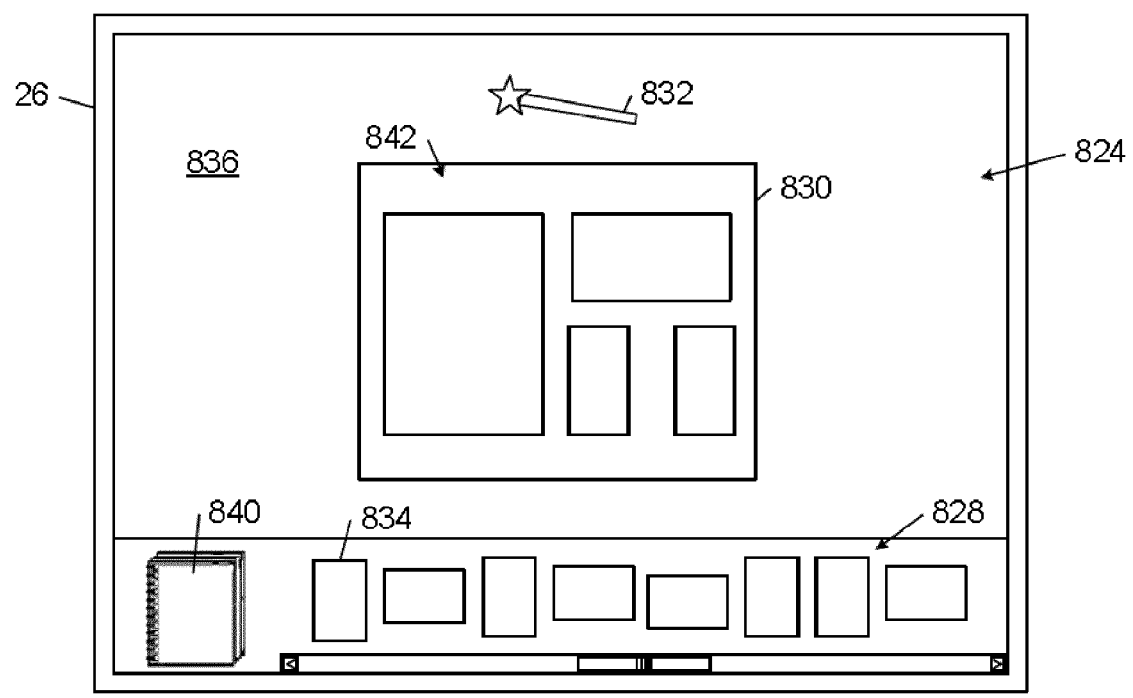
FIG. 23 is a block diagram of an embodiment of a user interface presented on a display.

FIG. 23 shows an exemplary embodiment 800 of the graphical user interface 24 that is generated by the user interface module 18 (FIG. 1). The user interface 800 includes a catalog area 828, a collage mock-up area 830 (which corresponds to a page), and a mode select interface control 832. The collage mock-up area 830 and the mode select interface control 832 typically are superimposed on a background 836. The mode select interface control 832 is operable to select an operational state of the user interface 822.

In the catalog area 828, the user interface module 18 shows thumbnails 834 of respective image-based ones of the graphic objects 12. In the illustrated embodiment, the thumbnails 834 are reduced-resolution versions of a collection of the image-based graphic objects that are grouped into an album that is represented by an album icon 840 in the catalog area 828. The images in the collection may be selected by a user or they may be selected automatically by the graphic object arrangement system 10. In some embodiments, the thumbnails 834 are generated by a thumbnail generation process that involves down sampling (e.g., average down sampling) of the images in the collection. In some embodiments, the thumbnails 34 are generated in accordance with one or more of the methods described in U.S. application Ser. No. 11/607,181, which was filed on Dec. 1, 2006.

The graphic object arrangement system 10 presents a layout 842 of a subset of the graphic objects in the collage mock-up area 830. The subset of the graphic objects may be selected manually by the user or automatically by the graphic object arrangement system 10, or a combination of both manual and automatic selection.

The graphic object arrangement system 10 receives an instance of a respective one of multiple types of user input gestures with respect to a target object that is displayed in the user interface 824. Exemplary types of user input includes point-and-click, drag-and-drop, and scroll gestures which may be input via any type of input device (e.g., a computer mouse, a joystick, a trackball, a touch pad, and a touch screen). The target object is an instance of a respective one of multiple object types, including persistent interface objects (e.g., the mock-up area 830 and the model select interface control 832) and variable interface objects (e.g., the thumbnails 834, the album icon 840, and any of the images in the layout 842). The graphic object arrangement system 10 performs a context-dependent action that depends on the type of user input gesture, the type of object towards which the user input gesture is directed, and the operational mode of the user interface 824. For example, in response to the receipt of the user input gesture instance and a determination that the user interface 824 is in a first operational state, the graphic object arrangement system 10 performs an instance of a first action type based on the type of the received user input gesture and the object type of the target object. In response to the receipt of the user input gesture instance and a determination that the user interface 824 is in a second operational state, graphic object arrangement system 10 performs an instance of a second action type based on the type of the received user input gesture and the object type of the target object.

In the illustrated embodiments, the mode select interface control 832 allows the user to select between a basic operational mode that provides access to a set of basic image collage authoring functions, and an enhanced operational mode that provides access to more complex enhanced functions. The basic functions tend to be more intuitive manual type of functions, whereas the enhanced functions tend to be more directed or automated functions. The separation of the basic and enhanced interface functions into two discreet operational modes allows the user to easily compartmentalize the two sets of functions in his or her mind and thereby readily and intuitively comprehend and remember a larger set of interface tools than would be possible if the functions were not separated in this way.

Additional details regarding the construction and operations of the user interface 824 are described in U.S. application Ser. No. 12/366,616, filed Feb. 5, 2009.

Figure 24:
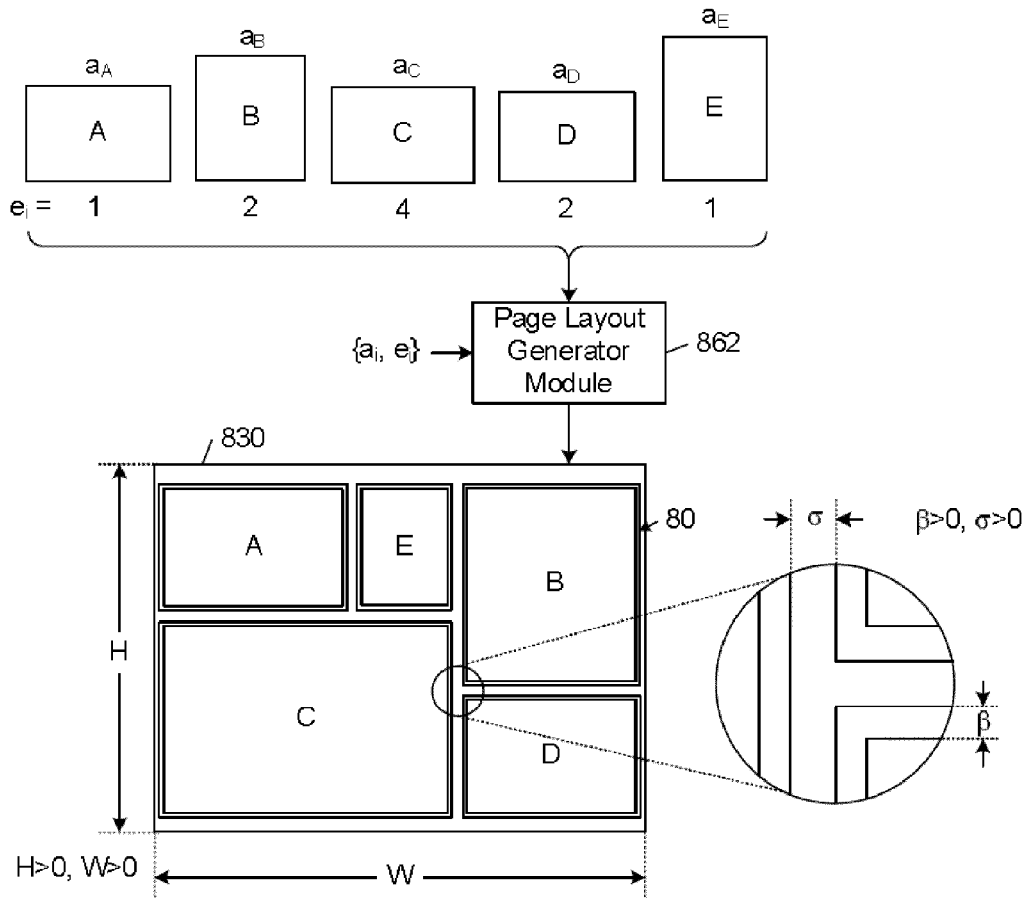
FIG. 24 is a diagrammatic view of an embodiment of a page layout generator module generating a layout of graphic objects on a page.

FIG. 24 shows an exemplary embodiment 862 of the page layout generator module 64 (see FIG. 4). In general, the page layout generator module 862 may use any of a wide variety of different image layout processes, subject to any number of layout criteria. I n some embodiments the page layout generator module 862 arranges images on a rectangular page (also referred to herein as a "canvas") subject to the following primary criteria:

(a) Image aspect ratios are respected (b) Image borders ($\beta$) and spacing ($\sigma$) between adjacent image borders are precisely specified Criterion (a) reflects the assumption that that process should not impose overlap or other hiding of image content unless specifically directed to do so; while criterion (b) provides accommodation for image borders or other features of graphic design going into the final presentation. The page layout generator module 862 creates a new layout also based on the following secondary criteria:

(c) Image areas should be proportional to positive relative area values supplied with the images (d) Images should occupy a maximum of the collage mock-up area 30

As shown in FIG. 8, the page layout generator module 862 produces a graphic object layout 880 in the collage mock-up area 830. Because of the primary criteria, pairs of adjacent images and blocks of images in the layout 880 have equal heights or widths. As long as the borders and spacing are not so thick that they take up the entire canvas in either dimension (a weak restriction), any set of images will fit together in this way. However, it cannot be guaranteed that the secondary criteria will be satisfied. Considering criterion (c), each graphic object except the text block graphic objects has a respective aspect ratio and is associated with a respective nominal size that is set to a value based on a target goal of matching a ratio of the respective nominal size to a respective amount of area on the page that is occupied by the graphic object in the first layout to an identical target constant value for all the graphic objects except the text block graphic objects. Thus, the nominal size is an ideal goal, but the page layout generator module 862 might not meet the constraints exactly. For example, in FIG. 8, notice that image C, which has a suggested nominal size of 4, does not have area exactly four times that of either of the image A and E, which have suggested relative areas of 1. Considering criterion (d), although all the images are large enough to be easily visible, the composite does not completely fill the collage mockup area 830 in the vertical (height) direction.

Figure 25:
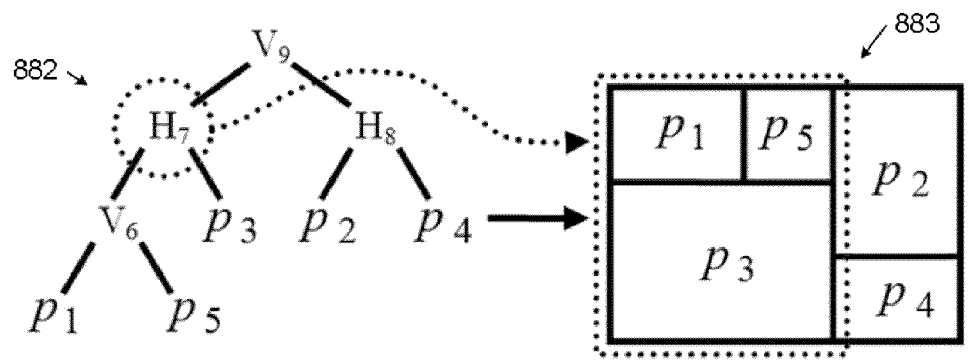
FIG. 25 is a diagrammatic view of a tree structure and an image collage generated from the tree structure in accordance with an embodiment of an image collage generation process.
Figure 26:
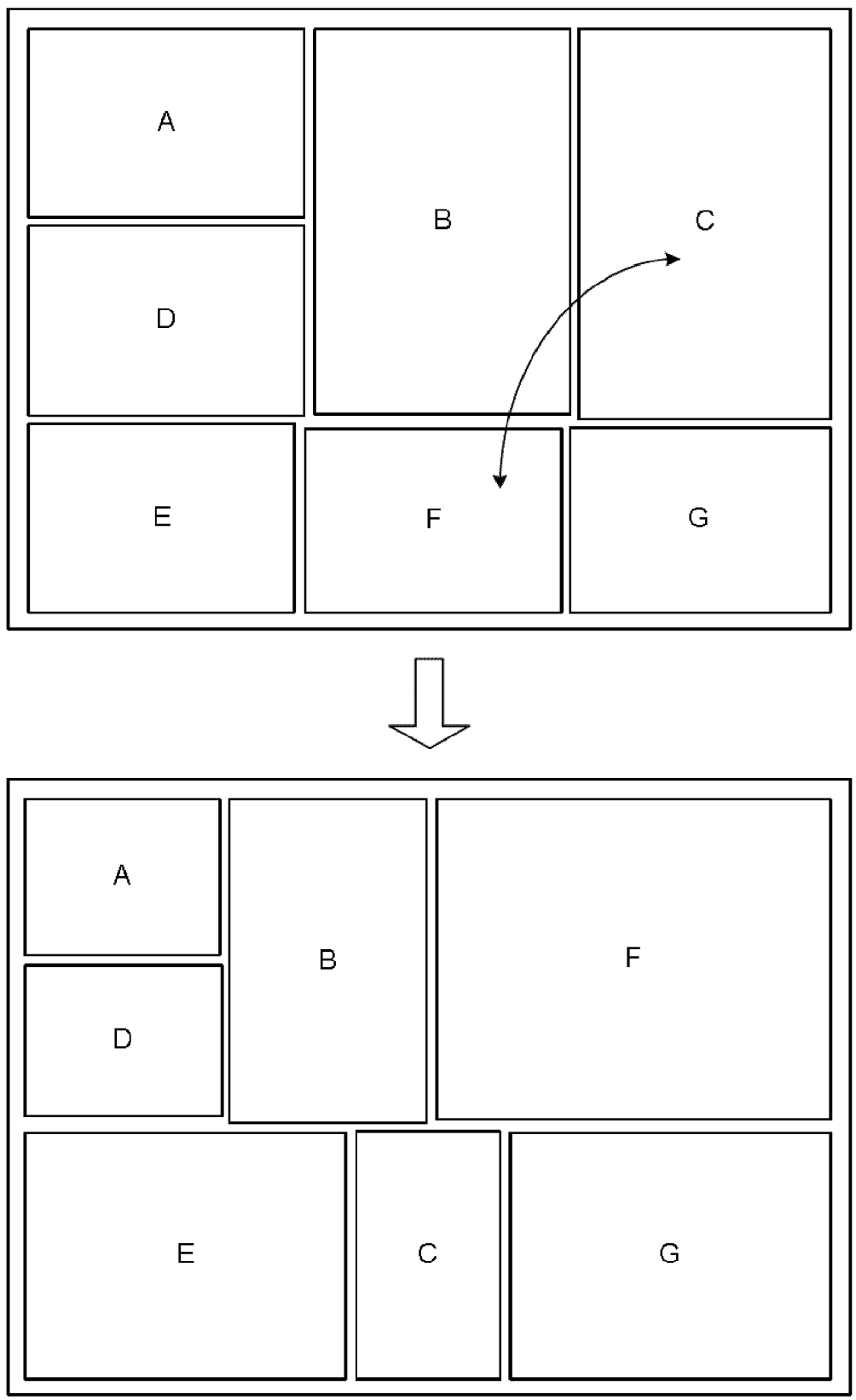
FIG. 26 is a diagrammatic view of a first image collage and a second image collage that is generated by swapping two images in the first image collage in accordance with an embodiment of an image collage generation process.

In these embodiments, the page layout generator module 862 encodes the composite as a binary tree 882 that induces a recursive partition of the canvas as illustrated in FIG. 25. In the tree 882, each terminal node corresponds to a respective image ($p_1, \ldots, p_4$). Each interior node corresponds to a "bounding box" on the collage mock-up area 830, and its designation as either a horizontal ("H") cut or a vertical ("V") cut divides the box into two smaller boxes. The following table shows the bounding box dimensions for the exemplary layout 883 shown in FIG. 25. In this example, for $n \leq 5$, $h_n$, and $w_n$, denote respectively the height and width for an image; but for $n > 5$, $h_n$ and $w_n$ denote the dimensions of a complete bounding box, including all borders and spacings contained therein (see, e.g., the bounding box 885 corresponding to node $H_7$). Generally, a table like this can be constructed quickly in a single depth-first traversal of the tree.

TABLE 3

Bounding box dimensions for layout 883 in FIG. 25.

| NODE LABEL | BOUNDING BOX HEIGHT | BOUNDING BOX WIDTH |
|---|---|---|
| n = 1, . . . , 5 | $h_n + 2\beta$ | $w_n + 2\beta$ |
| 6 | $h_1 + 2\beta$ | $w_1 + w_5 + \sigma + 4\beta$ |
| 7 | $h_6 + h_3 + \sigma + 2\beta$ | $w_6$ |
| 8 | $h_2 + h_4 + \sigma + 4\beta$ | $w_2 + 2\beta$ |
| 9 | $h_8$ | $w_7 + w_8 + \sigma$ |

The page layout generator module 862 associates each tree having the form illustrated in FIG. 25 with a unique layout that satisfies the primary criteria and defines a precise area and position in the collage mock-up area 830 for each image. The page layout generator module 862 computes the image areas subject to the primary criteria. This is accomplished by solving a system of N linear equations in N unknowns, where the variables are the image widths as described above. Referring to the tree, we obtain one equation from each of the N−1 interior nodes, by equating dimensions of the bounding boxes of its two children. For example, in FIG. 25, the constraint furnished by node $H_7$ would be $W_6 = W_3$. There are two alternative N-th constraints: one equating height of the root bounding box to the height of the canvas, and another for the width. Generally, only one of the two N-th constraints will yield a solution that fits on the canvas.

The aspect ratio of a graphic object is its height divided by its width. In this case, the coefficients in the linear system are all either 0, ±1, aspect ratios, or negated aspect ratios. As a result, the layout is "continuous"; a small change to the aspect of an image results in a small change to the layout. For this reason, the process of determining a new layout from a tree structure that has been modified in response to a command from the user is referred to as "reflow."

The layout component 860 creates layouts and reflows layouts very quickly, permitting interactive editing and preview. A summary of the commands supported by the layout component 860 is given in Table 4. These commands include commands for adding, deleting, replacing, cropping and swapping images. FIG. 25 shows an example of the swap operations while also illustrating reflow. In the remainder of this section, we sketch out the processes for creating alternate layouts, and for changing the size of an image.

TABLE 4

Commands supported by the page layout generator module 862.

| COMMAND | LAYOUT MODULE RESPONSE |
| --- | --- |
| Add or delete an image | Create a new layout |
| Replace an image | Replace terminal node in tree; reflow |
| Crop an image in layout | Change aspect ratio of terminal node in tree; reflow |
| Swap positions of two images | Swap terminal nodes in tree; reflow |
| Create an alternate layout | Obtain a new set of image relative areas; create a new layout |
| Change size of image in layout | Modify layout to accommodate new image size |

As indicated by FIG. 24, the inputs to the page layout generator module 862 are an aspect ratio ($a_i$) and a suggested relative area ($e_i$) for each image i. Our approach to obtaining a different (or alternate) layout is to submit the images to the page layout generator module 862 again, but with different suggested relative areas. As described above, in some embodiments, the page layout generator module 862 offers at most three different arrangements. In one arrangement, graphic objects are assigned default relative areas of 1.0, indicating that the page layout generator module 862 should endeavor to find a layout in which all graphic objects have equal area. In a second arrangement, graphic objects with faces are given higher relative areas, and in a third, graphic objects estimated to be of higher overall quality are given higher relative areas. For the sake of simplicity, no check is made to verify that the resulting output is different from the preceding composite. For a vast majority of composites, alternate layouts constructed as described here are different.

Figure 27:
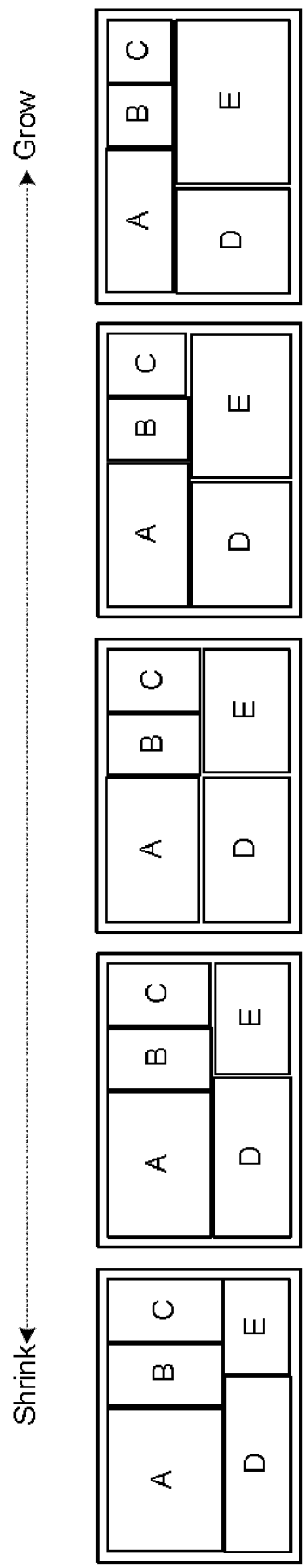
FIG. 27 is a diagrammatic view of a series of image collages generated from a common set of images in accordance with an embodiment of an image collage generation process in response to user input changing the size of a selected one of the images

A graphic object can be made larger or smaller in the context of a layout by manipulating the aspect ratios of all the other graphic objects, as described above and illustrated in FIG. 27. As explained above, in order to change the size of a graphic object, the user interface 822 identifies the selected graphic object and supplies a positive side-length factor. Values greater (less) than one cause the layout component 862 to grow (shrink) the selected graphic object. The side-length factor is applied to the height (H) and width (W) of the selected graphic object to preserve the aspect ratio. The page layout generator module 862 determines target dimensions for the selected graphic object by multiplying the current height and width by the side-length factor. Changes to the dimensions of the selected graphic object are translated into target dimensions for the root bounding box. The page layout generator module 862 can now determine new heights and widths for the remaining graphic objects such that target dimensions for both selected graphic object and root bounding box will be realized upon reflow. For example, in the case of growing, graphic objects that are separated from the selected graphic object by a horizontal (vertical) cut will have their aspect ratios reduced (increased).

Figure 28:
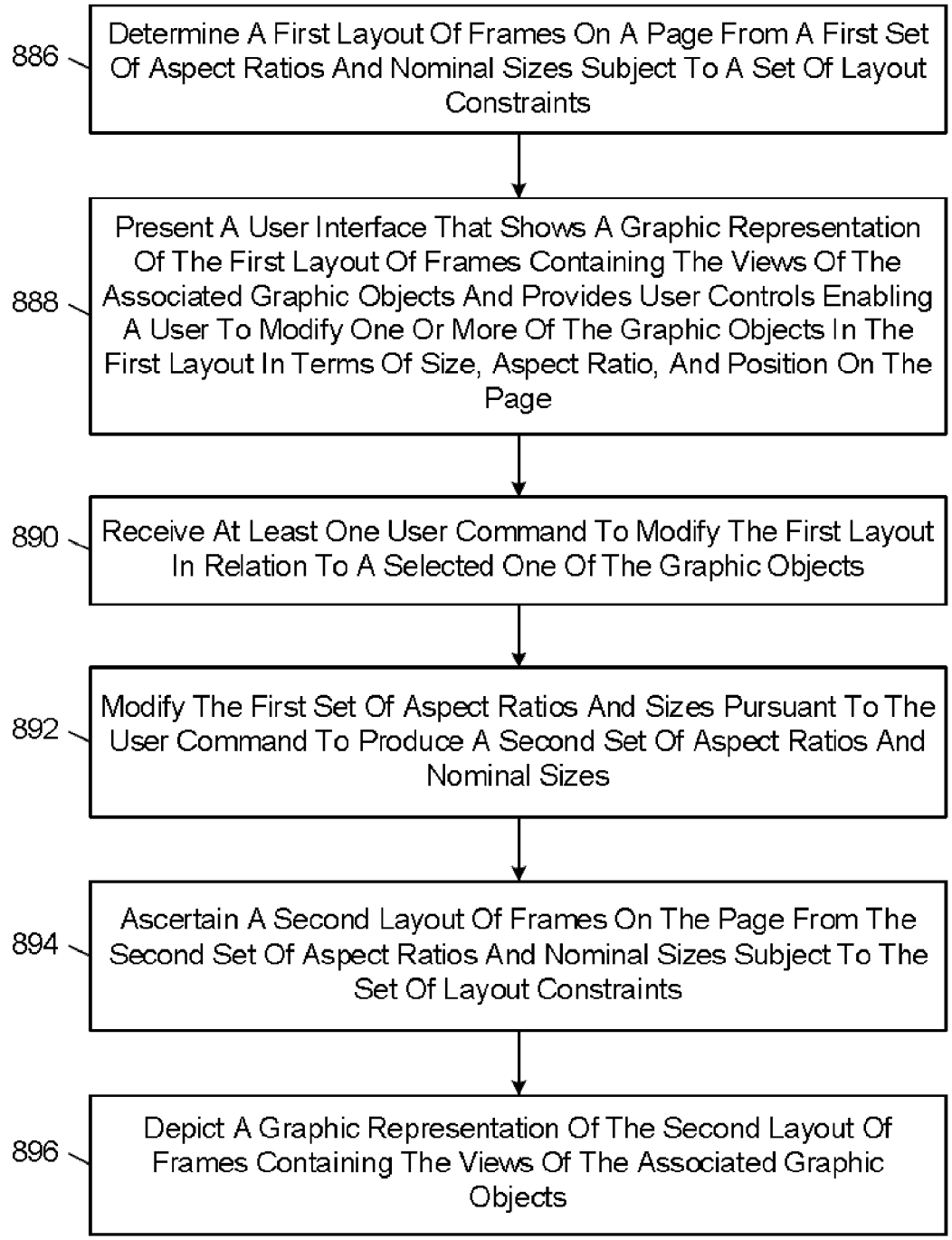
FIG. 28 is a flow diagram of an embodiment of a method of arranging graphic objects on a page with text.

FIG. 28 shows an embodiment of a process of generating a layout of graphic objects (including at least one text block) in the user interface 824 that is performed by an exemplary embodiment of the graphic object arrangement system 60 that includes the page layout generator module 862.

In accordance with the method of FIG. 28, the page layout generator module 862 determines a first layout of frames on a page from a first set of aspect ratios and nominal sizes subject to a set of layout constraints (FIG. 28, block 886). The frames in the first layout define respective sizes and positions of respective views of graphic objects that respectively are associated with the aspect ratios and nominal sizes in the first set, wherein at least one of the graphic objects is a block of text and the frame of the text block in the first layout has size dimensions that accommodates an output text rendering style.

On the display 24, the user interface module 18 presents a user interface that shows a graphic representation of the first layout of frames containing the views of the associated graphic objects and provides user controls enabling a user to modify one or more of the graphic objects in the first layout in terms of size, aspect ratio, and position on the page (FIG. 28, block 888).

Via the user interface, the page layout generator module 862 receives at least one user command to modify the first layout in relation to a selected one of the graphic objects (FIG. 28, block 890).

The page layout generator module 862 modifies the first set of aspect ratios and sizes pursuant to the user command to produce a second set of aspect ratios and nominal sizes (FIG. 28, block 892).

The page layout generator module 862 ascertains a second layout of frames on the page from the second set of aspect ratios and nominal sizes subject to the set of layout constraints (FIG. 28, block 894). The frames in the second layout define respective sizes and positions of respective views of graphic objects that respectively are associated with the aspect ratios and nominal sizes in the second set, and the size dimensions of the frame of the text block in the second layout accommodate the output text rendering style.

On the display 26, the user interface module 18 depicts a graphic representation of the second layout of frames containing the views of the associated graphic objects (FIG. 28, block 896).

V. EXEMPLARY OPERATING ENVIRONMENT

Embodiments of the graphic object arrangement system 10 may be implemented by one or more discrete modules (or data processing components) that are not limited to any particular hardware, firmware, or software configuration. In the illustrated embodiments, these modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components.

The various modules of the graphic object arrangement system 10 and the display 24 may be co-located on a single apparatus or they may be distributed across multiple apparatus; if distributed across multiple apparatus, the page layout generator module, the user interface module, and the display may communicate with each other over local wired or wireless connections, or they may communicate over global network connections (e.g., communications over the internet).

In some implementations, process instructions (e.g., machine-readable code, such as computer software) for implementing the methods that are executed by the embodiments of the graphic object arrangement system 10, as well as the data it generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

In general, embodiments of the graphic object arrangement system 10 may be implemented in any one of a wide variety of electronic devices, including desktop computers, workstation computers, and server computers.

Figure 29:
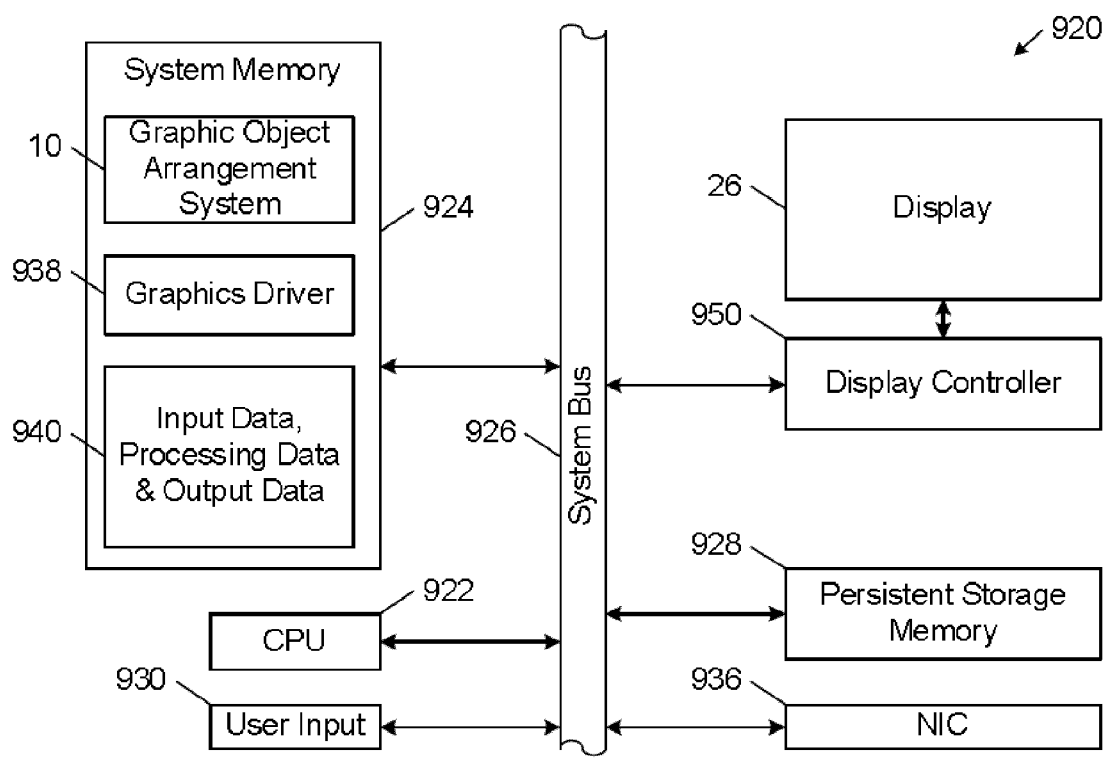
FIG. 29 is a block diagram of an embodiment of a computer system that implements an embodiment of the graphic object arrangement system of FIG. 1.

FIG. 29 shows an embodiment of a computer system 920 that can implement any of the embodiments of the graphic object arrangement system 10 that are described herein. The computer system 920 includes a processing unit 922 (CPU), a system memory 924, and a system bus 926 that couples processing unit 922 to the various components of the computer system 920. The processing unit 922 typically includes one or more processors, each of which may be in the form of any one of various commercially available processors. The system memory 924 typically includes a read only memory (ROM) that stores a basic input/output system (BIOS) that contains start-up routines for the computer system 920 and a random access memory (RAM). The system bus 926 may be a memory bus, a peripheral bus or a local bus, and may be compatible with any of a variety of bus protocols, including PCI, VESA, Microchannel, ISA, and EISA. The computer system 920 also includes a persistent storage memory 928 (e.g., a hard drive, a floppy drive, a CD ROM drive, magnetic tape drives, flash memory devices, and digital video disks) that is connected to the system bus 926 and contains one or more computer-readable media disks that provide non-volatile or persistent storage for data, data structures and computer-executable instructions.

A user may interact (e.g., enter commands or data) with the computer 920 using one or more input devices 930 (e.g., a keyboard, a computer mouse, a microphone, joystick, and touch pad). Information may be presented through the user interface, which is displayed to the user on the display 26 (implemented by, e.g., a display monitor), which is controlled by a display controller 950 (implemented by, e.g., a video graphics card). The computer system 920 also typically includes peripheral output devices, such as speakers and a printer. One or more remote computers may be connected to the computer system 920 through a network interface card (NIC) 936.

As shown in FIG. 29, the system memory 924 also stores the graphic object arrangement system 10, a graphics driver 938, and processing information 940 that includes input data, processing data, and output data. In some embodiments, the graphic object arrangement system 10 interfaces with the graphics driver 938 (e.g., via a DirectX® component of a Microsoft Windows® operating system) to present the user interface on the display 26 for managing and controlling the operation of the graphic object arrangement system 10.

VI. CONCLUSION

The embodiments that are described herein provide a fully automatic method for arranging an arbitrary number of graphic objects, including one or more image-based graphic objects and one or more text blocks of arbitrary length, on a page. In this way, graphic object layout can be created that reserves an appropriate amount of space for one or more text blocks. The amount of space reserved is determined on the fly based on the length of the text block and the output text rendering parameters that are associated with the text block. As a result in the final layout small text blocks (e.g., text blocks with a small point size, or relatively little text) take up relatively little space on a page, whereas large text blocks occupy a greater fraction of the page.

Other embodiments are within the scope of the claims.

The invention claimed is:

1. A method performed by a physical computing system comprising a display, the method comprising:
   on the display, presenting a user interface responsive to user input requesting a layout of graphic objects on a page, wherein at least one of the graphic objects is a text block;
   determining a text block presentation corresponding to an arrangement of a block of text that has a text layout and target size dimensions that accommodate an output text rendering style;
   determining respective aspect ratios of the presentation and the other graphic objects;
   ascertaining a candidate layout of frames on the page, wherein the frames define respective size dimensions and positions of respective views of the graphic objects on the page, and the ascertaining comprises ascertaining the candidate layout based on the determined aspect ratios;
   in response to a determination that the target size dimensions are not accommodated by the size dimensions of the frame of the text block presentation, modifying the candidate layout by changing the size dimensions of the frame of the text block presentation to accommodate the target size dimensions and adjusting the size dimensions of the other frames in the candidate layout based on the changed size dimensions of the frame of the text block presentation; and
   on the display, rendering the modified candidate layout in the user interface.

2. The method of claim 1, wherein the determining comprises determining the size dimensions of the presentation based on one or more text rendering parameter values.

3. The method of claim 1, wherein the ascertaining comprises setting the size dimensions of the frames such that the frame of the text block presentation and the other frames have aspect ratios that respectively match the aspect ratios of the presentation and the other graphic objects.

4. The method of claim 3, wherein the modifying comprises adjusting the aspect ratios of the other frames to accommodate the changed size dimensions of the frame of the text block presentation.

5. The method of claim 4, wherein the adjusting comprises reducing height dimensions without changing width dimensions of one or more of the other frames in response to an increase in the height dimension of the presentation.

6. The method of claim 4, wherein the adjusting comprises reducing width dimensions without changing height dimensions of one or more of the other frames in response to an increase in the width dimension of the presentation.

7. The method of claim 1, wherein, for each of the adjusted frames, the rendering comprises rendering a respective view of a cropped version of the respective graphic object through the modified frame.

8. The method of claim 1, wherein the rendering comprises rendering each of the views of the presentation and the other graphic objects through their respective frames in the modified candidate layout.

9. A method performed by a physical computing system comprising a display, the method comprising:
   on the display, presenting a user interface responsive to user input requesting at of graphic objects on a page, wherein at least one of the graphic objects is a text block;
   determining a text block presentation corresponding to an arrangement of a block of text that has a text layout and target size dimensions that accommodate an output text rendering style;
   ascertaining a candidate layout of frames on the page, wherein the frames define respective size dimensions and positions of respective views of the graphic objects on the page;
   in response to a determination that the target size dimensions are not accommodated by the size dimensions of the frame of the text block presentation, modifying the candidate layout by changing the size dimensions of the frame of the text block presentation to accommodate the target size dimensions and adjusting the size dimensions of the other frames in the candidate layout based on the changed size dimensions of the frame of the text block presentation;
   on the display rendering the modified candidate layout in the user interface; and
   further comprising
      determining a range of width values, and
      ascertaining a set of different presentations of the text block, wherein each of the text block presentations in the set has a respective frame with a different respective width value in the range of width values and a respective height value that accommodates the output text rendering style for the respective width value;
   wherein the determining of the text block presentation comprises selecting a respective one of the different text block presentations.

10. The method of claim 9, wherein the width ($W_i$) of each presentation (i) in the set is given by $$W_i = W_{max} \cdot \left(\frac{W_{lower}}{W_{max}}\right)^{i/(n1-1)}$$

wherein $W_{max}$ is an upper bound of the range of width values, $W_{lower}$ is a lower bound of the range of width values, n1 is a number of text block presentations in the set, and n1>1.

11. The method of claim 9, wherein the ascertaining further comprises:
   determining a range of height values; and
   generating a second set of different presentations of the text block, wherein each of the presentations in the second set has a respective frame with a respective width value equal to a lower bound of the range of width values and a different respective height value in the range of height values.

12. A method performed by a physical computing system comprising a display, the method comprising:
   on the display, presenting a user interface responsive to user input requesting at of graphic objects on a page, wherein at least one of the graphic objects is a text block;
   determining a text block presentation corresponding to an arrangement of a block of text that has a text layout and target size dimensions that accommodate an output text rendering style;
   ascertaining a candidate layout of frames on the page, wherein the frames define respective size dimensions and positions of respective views of the graphic objects on the page;
   in response to a determination that the target size dimensions are not accommodated by the size dimensions of the frame of the text block presentation, modifying the candidate layout by changing the size dimensions of the frame of the text block presentation to accommodate the target size dimensions and adjusting the size dimensions of the other frames in the candidate layout based on the changed size dimensions of the frame of the text block presentation;
   on the display, rendering the modified candidate layout in the user interface;
   wherein the determining comprises determining at least one other text block presentation corresponding to an arrangement of the block of text that has a respective text layout and target size dimensions that accommodate the output text rendering style;
   wherein the ascertaining comprises for each of the at least one other text block presentation, ascertaining another candidate layout of frames on the page, wherein the frame of the other text block presentation defines size dimensions and a position of a view of the other text block presentation on the page, and the other frames define respective size dimensions and positions of respective views of the other graphic objects on the page;
   further comprising selecting one of the candidate layouts; and
   wherein the changing, the modifying, and the rendering are performed on the selected candidate layout.

13. At least one non-transitory computer-readable medium having computer-readable program code embodied therein, the computer-readable program code adapted to be executed by a computer to implement a method comprising:
   on a display, presenting a user interface responsive to user input requesting a layout of graphic objects on a page, wherein at least one of the graphic objects is a text block;
   determining a text block presentation corresponding to an arrangement of a block of text that has a text layout and target size dimensions that accommodate an output text rendering style;
   determining respective aspect ratios of the presentation and the other graphic objects;
   ascertaining a candidate layout of frames on the page, wherein the frames define respective size dimensions and positions of respective views of the graphic objects on the page, and the ascertaining comprises ascertaining the candidate layout based on the determined aspect ratios;
   in response to a determination that the target size dimensions are not accommodated by the size dimensions of the frame of the text block presentation, modifying the candidate layout by changing the size dimensions of the frame of the text block presentation to accommodate the target size dimensions and adjusting the size dimensions of the other frames in the candidate layout based on the changed size dimensions of the frame of the text block presentation; and
   on the display, rendering the modified candidate layout in the user interface.

14. Apparatus, comprising:

a memory storing computer-readable instructions; and a data processing unit coupled to the memory, operable to execute the instructions, and based at least in part on the execution of the instructions operable to perform operations comprising on a display, presenting a user interface responsive to user input requesting a layout of graphic objects on a page, wherein at least one of the graphic objects is a text block;

determining a text block presentation corresponding to an arrangement of a block of text that has a text layout and target size dimensions that accommodate an output text rendering style;

determining respective aspect ratios of the presentation and the other graphic objects;

ascertaining a candidate layout of frames on the page, wherein the frames define respective size dimensions and positions of respective views of the graphic objects on the page, and the ascertaining comprises ascertaining the candidate layout based on the determined aspect ratios;

in response to a determination that the target size dimensions are not accommodated by the size dimensions of the frame of the text block presentation, modifying the candidate layout by changing the size dimensions of the frame of the text block presentation to accommodate the target size dimensions and adjusting the size dimensions of the other frames in the candidate layout based on the changed size dimensions of the frame of the text block presentation; and on the display, rendering the modified candidate layout in the user interface.

15. A method performed by a physical computing system comprising a display, the method comprising:

determining a first layout of frames on a page from a first set of aspect ratios and nominal sizes subject to a set of layout constraints, wherein the frames in the first layout define respective sizes and positions of respective views of graphic objects that respectively are associated with the aspect ratios and nominal sizes in the first set, wherein at least one of the graphic objects is a block of text and the frame of the text block in the first layout has size dimensions that accommodate an output text rendering style;

on the display, presenting a user interface that shows a graphic representation of the first layout of frames containing the views of the associated graphic objects and provides user controls enabling a user to modify one or more of the graphic objects in the first layout in terms of size, aspect ratio, and position on the page;

via the user interface receiving at least one user command to modify the first layout in relation to a selected one of the graphic objects;

modifying the first set of aspect ratios and sizes pursuant to the user command to produce a second set of aspect ratios and nominal sizes;

ascertaining a second layout of frames on the page from the second set of aspect ratios and nominal sizes subject to the set of layout constraints, wherein the frames in the second layout define respective sizes and positions of respective views of graphic objects that respectively are associated with the aspect ratios and nominal sizes in the second set, and the size dimensions of the frame of the text block in the second layout accommodate the output text rendering style; and on the display, depicting a graphic representation of the second layout of frames containing the views of the associated graphic objects.

16. The method of claim 15, wherein the determining comprises determining a binary tree structure having at least one node and a respective leaf for each of the graphic objects, each node specifies a respective partition of the page, each leaf defines a relative location of a respective one of the graphic objects on the page, and each graphic object except the text block graphic object has a respective aspect ratio and is associated with a respective nominal size that is set to a value based on a target goal of matching a ratio of the respective nominal size to a respective amount of area on the page that is occupied by the graphic object in the first layout to an identical target constant value for all the graphic objects except the text block graphic object.

17. The method of claim 16, wherein:

the receiving comprises receiving a user command to replace the selected graphic object with a replacement graphic object;

the modifying comprises replacing the aspect ratio and the nominal size that are associated with the selected graphic object in the first set with an aspect ratio and a nominal size that are associated with the replacement graphic object to produce the second set; and the ascertaining comprises recursively partitioning the page in accordance with the partitions specified by the nodes of the binary tree structure and allocating respective areas of the page to the graphic objects in the second layout based on the aspect ratios and nominal sizes in the second set.

18. The method of claim 16, wherein:

the receiving comprises receiving a user command to crop the selected graphic object;

the modifying comprises replacing the aspect ratio and the nominal size that are associated with the selected graphic object in the first set with an aspect ratio and a nominal size that are associated with the cropped graphic object to produce the second set; and the ascertaining comprises recursively partitioning the page in accordance with the partitions specified by the nodes of the binary tree structure and allocating respective areas of the page to the graphic objects in the second layout based on the aspect ratios and nominal sizes in the second set.

19. The method of claim 16, wherein:

the receiving comprises receiving a user command to swap positions of the selected graphic object with a target one of the other graphic objects in the first layout;

the modifying comprises swapping the aspect ratios and nominal sizes that respectively are associated with the selected graphic object and the target graphic object in the first set to produce the second set; and the ascertaining comprises recursively partitioning the page in accordance with the partitions specified by the nodes of the binary tree structure and allocating respective areas of the page to the graphic objects in the second layout based on the aspect ratios and nominal sizes in the second set.

20. The method of claim 16, wherein:

the receiving comprises receiving a user command to change the size of the frame of the selected graphic object to a target size;

the modifying comprises modifying the aspect ratios that respectively are associated with all the graphic objects except the selected graphic object to produce the second set; and the ascertaining comprises recursively partitioning the page in accordance with the partitions specified by the nodes of the binary tree structure and allocating respective areas of the page to the graphic objects in the second layout based on the aspect ratios and nominal sizes in the second set that are respectively associated all the graphic objects except the selected graphic object while maintaining the target size of the selected object fixed.

21. The method of claim 15, wherein each of the determining and the ascertaining comprises:
ascertaining a candidate layout of frames on the page, wherein the frames define respective size dimensions and positions of respective views of the graphic objects on the page; and
in response to a determination that the target size dimensions of the text block are not accommodated by the size dimensions of the frame of the text block, modifying the candidate layout to produce the respective one of the first and second layouts, wherein the modifying comprises changing the size dimensions of the frame of the text block to accommodate the size dimensions of the text block and modifying the size dimensions of the other frames in the candidate layout based on the changed size dimensions of the frame of the text block.

22. The method of claim 15, wherein the determining comprises determining the first layout in accordance with a recursive partitioning of the page that positions each of the frames of the first layout in a different respective non-overlapping location on the page, and the ascertaining comprises determining the second layout in accordance with a recursive partitioning of the page that positions each of the frames of the second layout in a different respective non-overlapping location on the page.

23. The method of claim 15, wherein the determining is performed by a computer processor in executing a first instance of a layout process, and the ascertaining is performed by the computer processor in executing a second instance of a layout process.

24. At least one non-transitory computer-readable medium having computer-readable program code embodied therein, the computer-readable program code adapted to be executed by a computer to implement a method comprising:
determining a first layout of frames on a page from a first set of aspect ratios and nominal sizes subject to a set of layout constraints, wherein the frames in the first layout define respective sizes and positions of respective views of graphic objects that respectively are associated with the aspect ratios and nominal sizes in the first set, wherein at least one of the graphic objects is a block of text and the frame of the text block in the first layout has size dimensions that accommodate an output text rendering style;
on a display, presenting a user interface that shows a graphic representation of the first layout of frames containing the views of the associated graphic objects and provides user controls enabling a user to modify one or more of the graphic objects in the first layout in terms of size, aspect ratio, and position on the page;
via the user interface receiving at least one user command to modify the first layout in relation to a selected one of the graphic objects;
modifying the first set of aspect ratios and sizes pursuant to the user command to produce a second set of aspect ratios and nominal sizes;
ascertaining a second layout of frames on the page from the second set of aspect ratios and nominal sizes subject to the set of layout constraints, wherein the frames in the second layout define respective sizes and positions of respective views of graphic objects that respectively are associated with the aspect ratios and nominal sizes in the second set, and the size dimensions of the frame of the text block in the second layout accommodate the output text rendering style; and
on the display, depicting a graphic representation of the second layout of frames containing the views of the associated graphic objects.

25. Apparatus, comprising:
a memory storing computer-readable instructions; and
a data processing unit coupled to the memory, operable to execute the instructions, and based at least in part on the execution of the instructions operable to perform operations comprising
determining a first layout of frames on a page from a first set of aspect ratios and nominal sizes subject to a set of layout constraints, wherein the frames in the first layout define respective sizes and positions of respective views of graphic objects that respectively are associated with the aspect ratios and nominal sizes in the first set, wherein at least one of the graphic objects is a block of text and the frame of the text block in the first layout has size dimensions that accommodate an output text rendering style;
on a display, presenting a user interface that shows a graphic representation of the first layout of frames containing the views of the associated graphic objects and provides user controls enabling a user to modify one or more of the graphic objects in the first layout in terms of size, aspect ratio, and position on the page;
via the user interface receiving at least one user command to modify the first layout in relation to a selected one of the graphic objects;
modifying the first set of aspect ratios and sizes pursuant to the user command to produce a second set of aspect ratios and nominal sizes;
ascertaining a second layout of frames on the page from the second set of aspect ratios and nominal sizes subject to the set of layout constraints, wherein the frames in the second layout define respective sizes and positions of respective views of graphic objects that respectively are associated with the aspect ratios and nominal sizes in the second set, and the size dimensions of the frame of the text block in the second layout accommodate the output text rendering style; and
on the display, depicting a graphic representation of the second layout of frames containing the views of the associated graphic objects.

\* \* \* \* \*

UNITED STATES PATENT AND TRADEMARK OFFICE
CERTIFICATE OF CORRECTION

PATENT NO. : 8,161,384 B2
APPLICATION NO. : 12/428599
DATED : April 17, 2012
INVENTOR(S) : C. Brian Atkins et al.

It is certified that error appears in the above-identified patent and that said Letters Patent is hereby corrected as shown below:

In column 41, line 8, in Claim 9, after "requesting" delete "at" and insert -- a layout --, therefor.

In column 41, line 27, in Claim 9, delete "display" and insert -- display, --, therefor.

In column 41, line 62, in Claim 12, after "requesting" delete "at" and insert -- a layout --, therefor.

In column 45, line 6, in Claim 20, after "associated" insert -- with --.

Signed and Sealed this
Eleventh Day of December, 2012

David J. Kappos
*Director of the United States Patent and Trademark Office*